US012801560B2

(12) United States Patent
Takahashi et al.

(10) Patent No.: US 12,801,560 B2
(45) Date of Patent: Nov. 17, 2026

(54) COMMUNICATION DEVICE, COMMUNICATION METHOD, AND PROGRAM

(71) Applicant: Sony Semiconductor Solutions Corporation, Kanagawa (JP)

(72) Inventors: Hiroo Takahashi, Kanagawa (JP); Noriyuki Natsukawa, Kanagawa (JP); Takayuki Hirama, Tokyo (JP); Makoto Nariya, Kanagawa (JP)

(73) Assignee: Sony Semiconductor Solutions Corporation, Kangawa (JP)

( * ) Notice: Subject to any disclaimer, the term of this patent is extended or adjusted under 35 U.S.C. 154(b) by 433 days.

(21) Appl. No.: 17/928,491

(22) PCT Filed: Jun. 25, 2021

(86) PCT No.: PCT/JP2021/024078
§ 371 (c)(1),
(2) Date: Nov. 29, 2022

(87) PCT Pub. No.: WO2022/009691
PCT Pub. Date: Jan. 13, 2022

(65) Prior Publication Data

US 2023/0205723 A1 Jun. 29, 2023

(30) Foreign Application Priority Data

Jul. 10, 2020 (JP) ................................ 2020-119546

(51) Int. Cl.
*G06F 13/42* (2006.01)
*G06F 13/40* (2006.01)

(52) U.S. Cl.
CPC ...... *G06F 13/4282* (2013.01); *G06F 13/4022* (2013.01); *G06F 13/4068* (2013.01)

(58) Field of Classification Search
None
See application file for complete search history.

(56) References Cited

U.S. PATENT DOCUMENTS 12,182,042 B2 * 12/2024 Takahashi .............. G06F 13/24
2005/0141534 A1 6/2005 Kawabata
(Continued)

FOREIGN PATENT DOCUMENTS

EP 0306900 B1 4/1995
JP 2000134229 A 5/2000
(Continued)

OTHER PUBLICATIONS

International Search Report (PCT/ISA/210), International Application No. PCT/JP2021/024078, dated Sep. 7, 2021.
(Continued)

*Primary Examiner* — Henry Tsai
*Assistant Examiner* — Christopher A Bartels
(74) *Attorney, Agent, or Firm* — Michael Best & Friedrich LLP

(57) ABSTRACT

The present disclosure relates to a communication device, a communication method, and a program for offering adaptability to a wider variety of applications and enhancing reliability of communications.

With a CCI protocol implemented as an upper layer, a physical layer transmits and receives data including an extended header and an extended footer to and from another communication device. A CCI-FS processing section compares a Destination ID included in the extended header with an ID (Source ID) given to the communication device, and determines whether or not the data is for accessing the communication device. The physical layer is MIPI A-PHY that has an asymmetrical upper layer of a point-to-point topology and is designed to allow high-speed data transmis- (Continued)

sion, control data, and electric power to share one physical wire. The present technology is applicable to a communication system that is used for connection in an in-vehicle camera, for example.

20 Claims, 75 Drawing Sheets

(56) References Cited

U.S. PATENT DOCUMENTS

| | | | | |
|---|---|---|---|---|
| 2006/0184976 | A1 | 8/2006 | Lee | |
| 2008/0170686 | A1 | 7/2008 | Nemoto | |
| 2010/0226315 | A1 | 9/2010 | Das | |
| 2014/0320608 | A1* | 10/2014 | Muukki | G06F 13/4282 348/47 |
| 2017/0041423 | A1 | 2/2017 | Kitazato | |
| 2017/0104733 | A1* | 4/2017 | Thanigasalam | G06F 13/1673 |
| 2018/0365188 | A1* | 12/2018 | Srivastava | G06F 13/4045 |
| 2019/0041458 | A1* | 2/2019 | Koki | G01R 31/3171 |
| 2019/0306134 | A1* | 10/2019 | Shanbhogue | H04L 63/123 |
| 2020/0021633 | A1* | 1/2020 | Sengoku | G06F 13/4291 |
| 2021/0132769 | A1* | 5/2021 | Parikh | G06F 1/1677 |
| 2021/0149441 | A1* | 5/2021 | Bartscherer | G06F 1/1616 |
| 2021/0216494 | A1* | 7/2021 | Ballantyne | G06F 13/374 |
| 2021/0306445 | A1* | 9/2021 | Takahashi | G06F 13/10 |
| 2021/0365707 | A1* | 11/2021 | Mao | H04N 23/683 |
| 2022/0006883 | A1* | 1/2022 | Srivastava | H04L 69/18 |
| 2022/0111839 | A1* | 4/2022 | Jiang | G06T 7/593 |
| 2022/0114126 | A1* | 4/2022 | Nelson | G06F 1/3293 |
| 2022/0114946 | A1* | 4/2022 | Howard | G09G 3/2096 |
| 2022/0114985 | A1* | 4/2022 | Howard | G09G 5/006 |
| 2022/0303056 | A1* | 9/2022 | Miyazaki | H04L 12/2803 |
| 2023/0205723 | A1* | 6/2023 | Takahashi | H04L 69/28 710/306 |
| 2025/0023663 | A1* | 1/2025 | Hyakudai | H04L 1/0063 |

FOREIGN PATENT DOCUMENTS

| | | | |
|---|---|---|---|
| JP | 2002175269 | A | 6/2002 |
| JP | 2017211864 | A | 11/2017 |
| JP | 2018522484 | A | 8/2018 |
| WO | 2020129685 | A1 | 6/2020 |

OTHER PUBLICATIONS

"Draft MIPI Alliance Specification for Camera Serial Interface 2 (CSI-2) "In: "DRAFT MIPI Alliance Specification for Camera Serial Interface 2 (CSI-2)", Apr. 2, 2009 (Apr. 2, 2009) , p. 1-180, XP055165978.

Anonymous: "Autonomous Vehicle Technology", The Trusted Source for New Mobility Technology, Apr. 30, 2020 (Apr. 30, 2020), pp. 15-18, vol. 4, Issue 4, XP093205546.

* cited by examiner

FIG. 58

| bit assign | Name | Description | Remarks |
|---|---|---|---|
| ePH0[31:24] | eVC | extended Virtual Channel | ·eVC IN EXTENDED C-PHY/D-PHY HEADER<br>·NOT USED IN CCI-FS (FIXED TO 0) |
| ePH0[23:16] | eDT | extended Data Type | ADD CCI-FS (I2C, I3C) |
| ePH0[15] | eCONT | Control Code Indicator | 1'b0: NORMAL DATA TRANSFER<br>1'b1: INDICATES I2C/I3C CONTROL CODE.<br>·INDICATES S/Sr/ACK/NACK/P, ETC., IN I2C.<br>·USED IN Clock Stretch |
| ePH0[14:10] | Reserved | Reserved for future definition | Reseved |
| ePH0[9:8] | ePFEN | extended Packet Footer (ePF) Enable bitmap | field FOR EXTENSION OF 32b/64b Footer |
| ePH0[7:0] | ePHEN | extended Packet Header (ePH) Enable bitmap | field FOR EXTENSION OF extended Packet Header |

| bit assign | Name | Description | Remarks |
|---|---|---|---|
| ePH1[31:16] | Source ID | Source ID. Device ID in which the packet is generated | |
| ePH1[15:0] | Packet Length | Length of Packet Data (unit:Byte) | LENGTH OF DATA PACKET |

| bit assign | Name | Description | Remarks |
|---|---|---|---|
| ePH2[31:24] | Security Descriptor | Security Descriptor | ADDED WHEN Security IS USED<br>default: 0 SETTING |
| ePH2[23:16] | Reserved | Reserved for future definition | Reseved |
| ePH2[15:0] | Message Counter | Message Counter | ·16bit ROUNDING COUNTER. COUNTED UP FOR EACH PACKET HAVING First extended Packet Header. INITIAL VALUE IS 0.<br>·IN C/D-PHY COMMUNICATION HAVING VC, INDEPENDENT Message COUNTER IS USED. |

FIG.59

| bit assign | Name | Description | Remarks |
|---|---|---|---|
| ePH3[31:25] | Destination ID | Destination ID. Device ID in which the packet is received finally | ADD Destination ID (CCI-FS)<br>CORRESPONDING TO Slave Address (TO FINAL DESTINATION) |
| ePH3[24] | Read/Write flag | Read/Write flag in which the packet is received finally | INDICATES Read: 1, Write: 0 (CCI-FS) |
| ePH3[23:8] | Destination Address | Destination Address is to access register address finally. | STORE REGISTER ADDRESS VALUE IN<br>FINAL DESTINATION |

FIG. 60

| eDT | Description |
|---|---|
| 0x00 to 0x07 | synchronization Short Packet Data Types |
| 0x08 to 0x0F | Generic Short Packet Data Types |
| 0x10 to 0x17 | Generic Long Packet Data Types |
| 0x18 to 0x1F | YUV Data |
| 0x20 to 0x26 | RGB Data |
| 0x27 to 0x2F | RAW Data |
| 0x30 to 0x37 | User Defined Byte-based Data |
| 0x38 | USL Command |
| 0x39 to 0x3D | Reserved for future use |
| 0x3E | Extended Packet mode(Use in PH only. Do not use in ePH) |
| 0x3F | For CSI-2 over C-PHY:Reserved for future use<br>For CSI-2 over D-PHY:Reserved for future use |
| 0x40 to 0xBF | Reserved for future use |
| 0xC0 to 0xCF | User Defined Byte-based Data<br>0xC0:For I2C<br>0xC1:For I3C |

FIG. 66

| Addr | bit assign | initial Value | Setting Data | Attribute | Detail | Remarks |
|---|---|---|---|---|---|---|
| 0x000 | [0] | 1'b1 | CCI-FS Capability Register | RO | 1'b0: WITHOUT CCI-FS FUNCTION<br>1'b1: WITH CCI-FS FUNCTION | |
| 0x001 | [7:0] | 8'h10 | CCI-FS Version | RO | Ver1.0 | |
| 0x002 | [0] | 1'b0 | CCI-FS Enable | RW | SWITCH ON/OFF OF CCI-FS FUNCTION | ·USABLE BY SWITCHING IN A-PHY DIRECT CONNECTION CONFIGURATION<br>·1'b1 IS PREVIOUSLY SET WHEN USED IN A-PHY SerDes CONFIGURATION |
| 0x010 | [7:0] | 8'h0 | eVC | RW | ePH0 INFORMATION | |
| 0x011 | [7:0] | 8'h0 | eDT | RW | | |
| 0x012 | [1:0] | 2'h0 | ePFEN | RW | | |
| 0x013 | [7:0] | 8'h0 | ePHEN | RW | | |
| 0x020 | [7:1] | 7'h0 | Source ID | RO | ePH1 INFORMATION | INDICATING ID OF Device ITSELF<br>·RO: REGISTER UNIQUE VALUE WHEN IMPLEMENTED<br>·RW: REGARD THAT 7'h0 INDICATES THAT DESTINATION IS DEVICE ITSELF. SETTING IN AP, IMAGE SENSOR SETTING IS PERFORMED FROM FROM AP SIDE |
| | [0] | 1'h0 | Read/Write Source | RW | ePH1 INFORMATION | Reserved |
| 0x030 | [7:1] | 7'h0 | Destination ID | RW | ePH3 INFORMATION | |
| | [0] | 1'h0 | Read/Write Dest | RW | ePH3 INFORMATION | |
| 0x031 | [7:0] | 8'h0 | Destination Address[7:0] | RW | ePH3 INFORMATION | |
| 0x032 | [7:0] | 8'h0 | Destination Address[15:8] | RW | ePH3 INFORMATION | |
| 0x033 | [7:0] | 8'h0 | payload Length[7:0] | RW | ePH3 INFORMATION | |
| 0x034 | [15:8] | 8'h0 | payload Length[15:0] | RW | ePH4 INFORMATION | |
| 0x102 | [7:0] | 8'h0 | Read Data Length[7:0] | RW | | (BASICALLY, RESTRICTION WITHIN A-PHY PAYLOAD IS IMPOSED) |
| 0x103 | [7:0] | 8'h0 | Read Data Length[15:8] | RW | | |
| 0x104 | [0] | 1'h0 | CMD Exec | RW | AUTOMATICALLY CLEARED AFTER EXECUTION IS COMPLETED | 1'b1:Read not Ready<br>1'b0:Read ready |
| 0x105 | [0] | 1'h0 | Read CMD Status | RO | 1'b1:Read Ready<br>1'b0:Read not ready | |
| 0x106 | [7:0] | 8'h0 | Read Data[7:0] | RO | | EXTENDABLE CONFIGURATION |
| 0x107 | [7:0] | 8'h0 | Read Data[15:8] | RO | | EXTENDABLE CONFIGURATION |
| 0x108 | [7:0] | 8'h0 | Read Data[23:16] | RO | | EXTENDABLE CONFIGURATION |
| 0x109 | [7:0] | 8'h0 | Read Data[31:24] | RO | | EXTENDABLE CONFIGURATION |

FIG. 67

| Addr | bit assign | initial Value | Setting Data Attribute | | Detail | Remarks |
|---|---|---|---|---|---|---|
| WHEN Bridge IS CONFIGURED: (REGISTER CONFIGURATION Compatible WITH CONVENTIONAL CCI BY SERDES CONFIGURATION, ETC.) | | | | | | |
| 0x110 | [7:1] | 7'h0 | Destination SID (CONNECTION DESTINATION) | RW | P2P CONNECTION INFORMATION | #1 LOWER DEVICE<br>-> DISCARD PACKET OR PERFORM ERROR DETECTION IF DESTINATION REGISTRATION HAS NOT BEEN MADE (IN CASE OF End DEVICE, NOT USED BECAUSE Source ID IS TRANSFERRED IN RESPONSE) |
| | [0] | 1'h0 | Read/Write | RW | P2P CONNECTION INFORMATION | WHEN CCI-FS IS Enabled, 1-Write IS INVALID |
| 0x111 | [7:0] | 8'h0 | Address Register[15:8] (CONNECTION DESTINATION) | RW | P2P CONNECTION INFORMATION | |
| 0x112 | [7:0] | 8'h0 | Address Register[7:0] (CONNECTION DESTINATION) | RW | P2P CONNECTION INFORMATION | |
| 0x113 | [7:0] | 8'h0 | Attribution (CONNECTION DESTINATION) | RW | P2P CONNECTION INFORMATION | 0: I2C<br>1: I3C<br>2: A-PHY<br>OTHERS: Reserved |
| 0x114 | [7:0] | 8'h0 | Timeout_No1[15:8] | RW | | TIME SETTING FOR ACCESS TIMEOUT |
| 0x115 | [7:0] | 8'h10 | Timeout_No1[7:0] | RW | | ↑ |
| 0x120 | [7:1] | 8'h0 | Destination ID(CONNECTION DESTINATION) | RW | P2P CONNECTION INFORMATION | #2 LOWER DEVICE |
| | [0] | 1'h0 | Read/Write | RW | P2P CONNECTION INFORMATION | |
| 0x121 | [7:0] | 8'h0 | Address Register[15:8] (CONNECTION DESTINATION) | RW | P2P CONNECTION INFORMATION | |
| 0x122 | [7:0] | 8'h0 | Address Register[7:0] (CONNECTION DESTINATION) | RW | P2P CONNECTION INFORMATION | |
| 0x123 | [7:0] | 8'h0 | Attribution (CONNECTION DESTINATION) | RW | P2P CONNECTION INFORMATION | 0: I2C<br>1: I3C<br>2: A-PHY<br>OTHERS: Reserved |
| 0x124 | [7:0] | 8'h00 | Timeout_No2[15:8] | RW | | TIME SETTING FOR ACCESS TIMEOUT |
| 0x125 | [7:0] | 8'h10 | Timeout_No2[7:0] | RW | | ↑ |
| | | | | | | #3 LOWER DEVICE... |

FIG. 68

| Addr | bit assign | initial Value | Setting Data | Attribute | Detail | Remarks |
|---|---|---|---|---|---|---|
| Error-RELATED REGISTER | | | | | | |
| 0x200 | [0] | 1'h0 | Error Register[0] (CRC) | RW1C | | |
| | [1] | 1'h0 | Error Register[1] (Security) | RW1C | | |
| | [2] | 1'h0 | Error Register[2] (Routing) | RW1C | | |
| | [3] | 1'h0 | Error Register[3] (Timeout) | RW1C | | WHEN Timeout CONFIGURATION IS ADDED.<br>(COMBINATION USE OR NON-USE IS OK WHEN CHECK IS PERFORMED BY POLLING) |
| | [4] | 1'h0 | Error Register[4] (MC) | RW1C | | |
| | [5] | 1'h0 | T. B. D. | RW1C | | |
| Error-RELATED REGISTER (debug) | | | | | | |
| 0x300 | | | | RO | STORE ERROR HEADER-RELATED INFORMATION (first Error) | ALSO ADD Footer (ONLY ePH AND ePF IS USED, AND Payload MAY BE OMITTED), AND INITIALIZATION IS PERFORMED WHEN Error Register IS CLEARED BY 1-Write |
| | | | | | | |
| | | | | | | |
| 0x400 | | | | RO | STORE ERROR HEADER-RELATED INFORMATION (Last Error) | ALSO ADD Footer (ONLY ePH AND ePF IS USED, AND Payload MAY BE OMITTED), AND INITIALIZATION IS PERFORMED WHEN Error Register IS CLEARED BY 1-Write |
| Error Injection-RELATED REGISTER (debug) | | | | | | |
| 0x800 | | | Error Injection Enable[0] (ePH0:3) | RW | Enable INSERTION OF Error INTO ePH0 | |
| | | | Error Injection Enable[0] (ePH0:2) | RW | | |
| | | | Error Injection Enable[0] (ePH0:1) | RW | | |
| | | | Error Injection Enable[0] (ePH0:0) | RW | | |

COMMUNICATION DEVICE, COMMUNICATION METHOD, AND PROGRAM

TECHNICAL FIELD

The present disclosure relates to a communication device, a communication method, and a program, and specifically, relates to a communication device, a communication method, and a program that can offer adaptability to a wider variety of applications and can enhance the reliability of communications.

BACKGROUND ART

CSI (Camera Serial Interface)-2 ver4.0, standardization of which is currently being promoted, has two types, i.e., a type having a packet structure in which C-PHY is used for a physical layer and a type having a packet structure in which D-PHY is used for a physical layer.

Further, in recent years, the CSI-2 standards are used not only for mobile apparatuses but also for a variety of applications including automotive use and IoT (Internet of Things) use, for example. As a result of this, it is considered that the existing packet structures are not adaptable to these applications. Therefore, in order to offer adaptability to a variety of applications, the MIPI (Mobile Industry Processor Interface) alliance has been conducting a study on extension of a packet header and a packet footer of the existing packet structure.

PTL 1 proposes a system in which the number of data buses can be reduced in a case where a processing device is connected to multiple image sensors according to the CSI-2 standard.

Meanwhile, the conventional standard such as a CCI (Camera Control Interface) standard or an I2C (Inter-Integrated Circuit) standard is a communication system which was developed for the market of mobile apparatuses, and is insufficient in an error detection function. In contrast, CIS (CMOS Image Sensors) for automotive use have been required to achieve reliability as high as that of onboard communications. For example, in order to support ISO26262 (Functional Safety), such CIS have been required to have an error detection function such as CRC or MessageCount.

PTL 2 discloses a technology of adding CRC to an I2C protocol and performing communication.

CITATION LIST

Patent Literature

[PTL 1]
Japanese Patent Laid-open No. 2017-211864
[PTL 2]
Japanese Patent Laid-open No. 2002-175269

SUMMARY

Technical Problems

However, when CRC is simply added to an I2C protocol as disclosed in PTL 2 mentioned above in order to enhance the reliability of communications, compatibility with the existing CCI standards is impaired. Accordingly, an existing CCI circuit is assumed to recognize that CRC added to the final stage is data to be written into a register. As a result of this, error detection is impossible, and further, an unintended operation occurs in a case where an improper value is written to an improper register address, so that the system may come to a deadlock.

In addition, as described above, the study has been conducted for extending a packet structure of a CSI-2 standard packet, and with regard to the study, adaptability to a variety of applications is required while compatibility to the existing CSI-2 standard is maintained and large amounts of information can be transmitted. In this case, it is necessary to avoid violating the regulation of prohibiting a change in a packet on a transmission path.

The present disclosure has been made in view of the above circumstances, and is provided to offer adaptability to a wider variety of applications and enhance the reliability of communications.

Solution to Problems

A communication device according to one aspect of the present disclosure includes a physical layer that, with a CCI (Camera Control Interface) protocol implemented as an upper layer, transmits and receives data including an extended header and an extended footer to and from another communication device, and a CCI-FS processing section that compares a Destination ID included in the extended header with an ID (Source ID) given to the communication device and determines whether or not the data is for accessing the communication device.

A communication method or program according to the one aspect of the present disclosure includes causing a communication device to transmit and receive data including an extended header and an extended footer to and from another communication device through a physical layer with a CCI (Camera Control. Interface) protocol implemented as an upper layer, and causing the communication device to compare a Destination ID included in the extended header with an ID (Source ID) given to the communication device and determine whether or not the data is for accessing the communication device.

In the one aspect of the present disclosure, through the physical layer with a CCI (Camera Control Interface) protocol mounted as an upper layer, data including an extended header and an extended footer is transmitted and received to and from another communication device, a Destination ID included in the extended header is compared with an ID (Source ID) given to the communication device, and whether or not the data is for accessing the communication device is determined.

BRIEF DESCRIPTION OF DRAWINGS

FIG. 58 is a diagram depicting the details of an extended packet header ePH0, an extended packet header ePH1, and an extended packet header ePH2.

FIG. 59 is a diagram depicting the details of an extended packet header ePH3.

FIG. 60 is a diagram depicting the details of extended DT in an extended packet header ePH.

FIG. 66 is a diagram depicting a register configuration example.

FIG. 67 is a diagram depicting a register configuration example when Bridge is configured.

FIG. 68 is a diagram depicting a register configuration example of an Error-related register.

DESCRIPTION OF EMBODIMENTS

Hereinafter, specific embodiments to which the present technology is applied will be explained in detail with reference to the drawings.

<Configuration Examples of Communication System>

Figure 1:
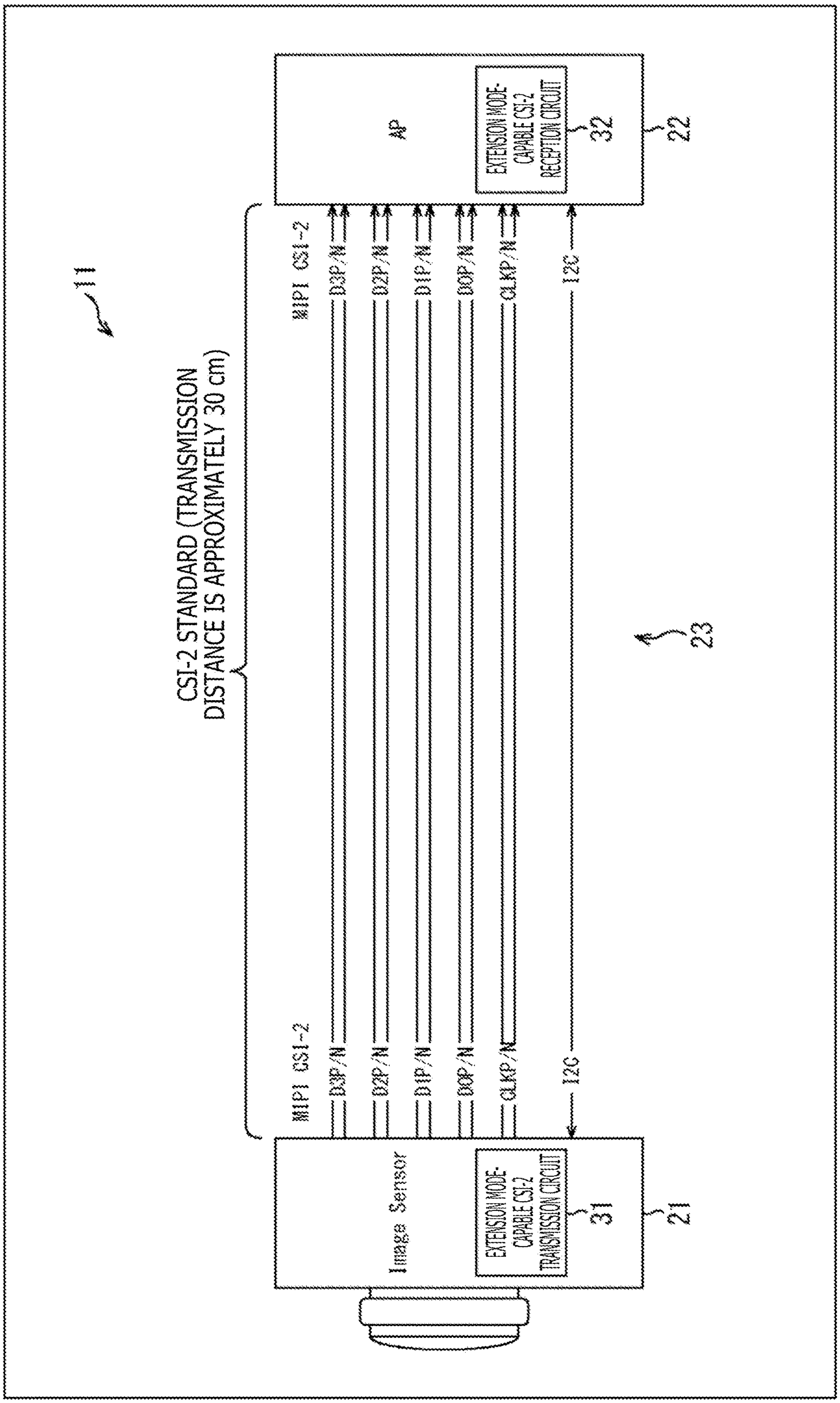
FIG. 1 is a block diagram depicting a configuration example of a first embodiment of a communication system to which the present technology is applied.

FIG. 1 is a block diagram depicting a configuration example of a first embodiment of a communication system to which the present technology is applied.

A communication system 11 includes an image sensor 21 and an application processor 22 connected to each other via a bus 23, as depicted in FIG. 1. For example, the communication system 11 is used for CSI-2 connection in an existing mobile apparatus such as what is generally called a smartphone.

An extension mode-capable CSI-2 transmission circuit 31 as well as a lens, an imaging element (not depicted), etc., is installed in the image sensor 22. For example, the image sensor 21 transmits image data regarding an image captured by an imaging element to the application processor 22 through the extension mode-capable CSI-2 transmission circuit 31.

An extension mode-capable CSI-2 reception circuit 32 as well as LSI (Large Scale Integration) that performs a process according to various types of applications executed in the mobile apparatus including the communication system 11 is installed in the application processor 22. For example, in the application processor 22, the extension mode-capable CSI-2 reception circuit 32 receives image data transmitted from the image sensor 21, and the LSI performs, on the image data, a process according to an application.

The bus 23 is a communication path through which a signal is transmitted in conformity with a CSI-2 standard, and a transmission distance up to which signal transmission is possible with the bus 23 is approximately 30 cm. Further, the bus 23 connects the image sensor 21 and the application processor 22 to each other with multiple signal lines (I2C, CLKP/N, D0P/N, D1P/N, D2P/N, D3P/N) as depicted in FIG. 1.

The extension mode-capable CSI-2 transmission circuit 31 and the extension mode-capable CSI-2 reception circuit 32 are adapted to extension mode communications in which the CSI-2 standard is extended, and can transmit and receive signals to and from each other. It is to be noted that the detailed configurations of the extension mode-capable CSI-2 transmission circuit 31 and the extension mode-capable CSI-2 reception circuit 32 will be explained later with reference to FIGS. 9 and 10.

Figure 2:
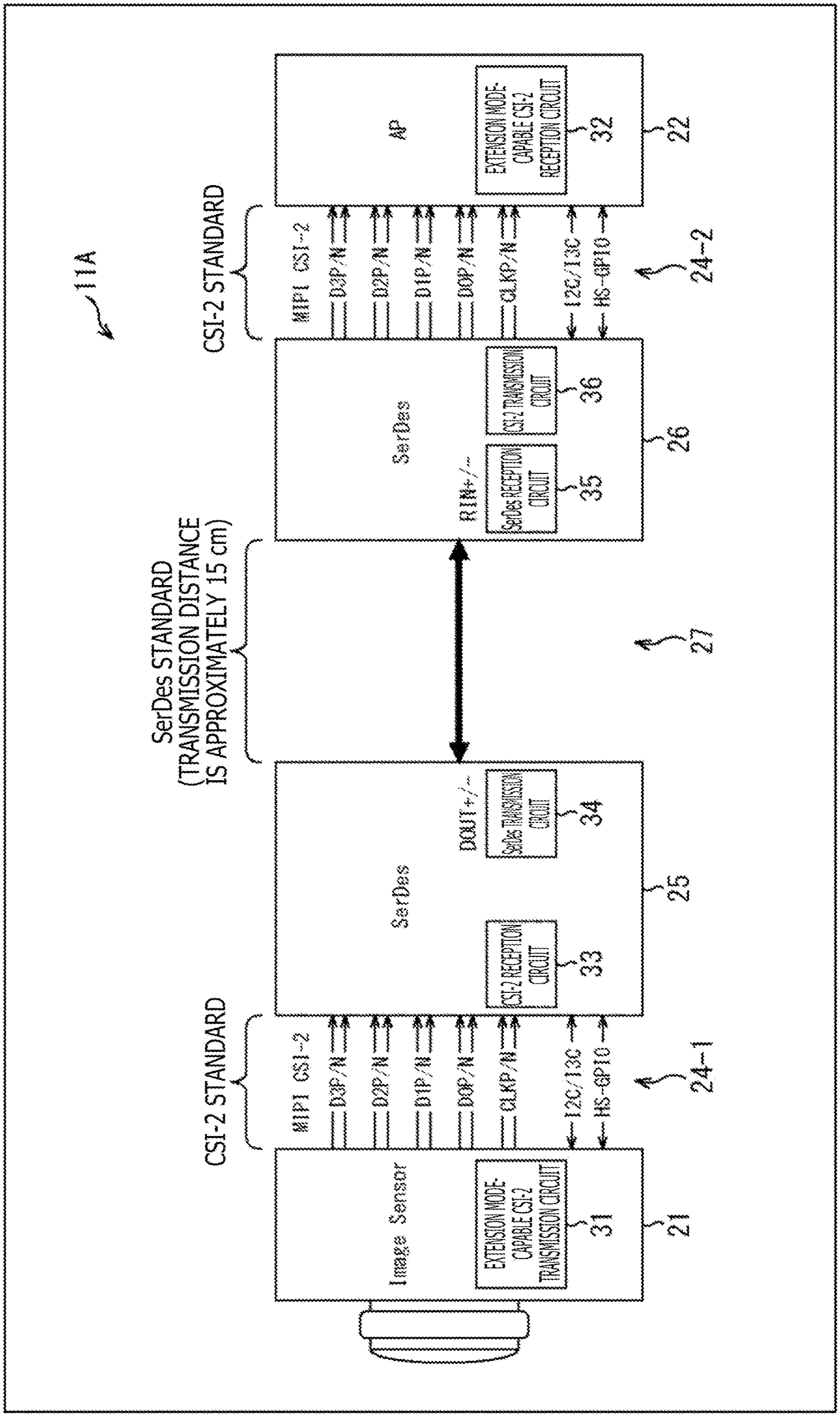
FIG. 2 is a block diagram depicting a configuration example of a second embodiment of the communication system to which the present technology is applied.

FIG. 2 is a block diagram depicting a configuration example of a second embodiment of the communication system to which the present technology is applied.

In a communication system 11A, the image sensor 21 and a SerDes device 25 are connected to each other via a bus 24-1, the application processor 22 and a SerDes device 26 are connected to each other via a bus 24-2, and the SerDes device 25 and the SerDes device 26 are connected to each other via a bus 27, as depicted in FIG. 2. For example, the communication system 11A is used for connection in an existing in-vehicle camera.

Here, the image sensor 21 and the application processor 22 have configurations similar to those of the image sensor 21 and the application processor 22 in FIG. 1, respectively, and thus, a detailed explanation thereof will be omitted.

Analogous to the bus 23 in FIG. 1, the buses 24-1 and 24-2 are communication paths through which signals are transmitted in conformity with a CSI-2 standard, and each include multiple signal lines (HS-GPIO, I2C/I3C, CLKP/N, D0P/N, D1P/N, D2P/N, D3P/N), as depicted in FIG. 2.

The SerDes device 25 includes a CSI-2 reception circuit 33 and a SerDes (Serializer Deserializer) transmission circuit 34. For example, the CSI-2 reception circuit 33 performs communication conforming to the normal CSI-2 standard with the extension mode-capable CSI-2 transmission circuit 31, so that the SerDes device 25 acquires a bit-parallel signal transmitted from the image sensor 21. Then, the SerDes device 25 converts the acquired signal into a serial bit stream, and the SerDes transmission circuit 34 performs communication with the SerDes reception circuit 35 by one lane, so that the signal is transmitted to the SerDes device 26.

The SerDes device 26 includes a SerDes reception circuit 35 and a CSI-2 transmission circuit 36. For example, the SerDes reception circuit 35 performs communication with the SerDes transmission circuit 34 by one lane, so that the SerDes device 26 acquires a bit-serial signal transmitted through the communication. Then, the SerDes device 26 converts the acquired signal to a bit-parallel signal, and the CSI-2 transmission circuit 36 performs communication conforming to the normal CSI-2 standard with the extension mode-capable CSI-2 reception circuit 32, so that the signal is transmitted to the application processor 22.

The bus 27 is a communication path through which a signal is transmitted in conformity with such a standard as A-PHY or FPD (Flat Panel Display)-LINK III, and a transmission distance up to which a signal can be transmitted through the bus 27 is approximately 15 cm.

With these physical layer interfaces capable of performing long-distance transmission, the automotive industry can use advanced driver-assistance systems (ADAS), automated driving systems (ADS), and any other surround sensor applications including cameras and in-vehicle infotainment (IVI) displays. MIPI A-PHY has an asymmetric datalink layer (asymmetric upper layer) of a point-to-point topology, and allows high-speed data transmission, control data, and electric power to share one physical wire. A function as a base of an end-to-end system that is designed to simply integrate a camera, a sensor, and a display can be implemented, and simultaneously, functional safety and security can be incorporated.

Each of the communication systems 11 and 11A having the above configurations can transmit and receive data by using a packet having an extended packet structure which will be explained later, through the extension mode-capable CSI-2 transmission circuit 31 and the extension mode-capable CSI-2 reception circuit 32. Accordingly, the communication system 11 and 11A are adaptable to a wider variety of applications including, for example, RAW24, Smart ROI (Region of Interest), GLD (Graceful Link Degradation), and the like which will be explained later.

<First Structure Example of Packet Structure>

With reference to FIGS. 3 to 8, an explanation will be given of a first structure example of a packet structure of a packet that is used for communication between the extension mode-capable CSI-2 transmission circuit 31 and the extension mode-capable CSI-2 reception circuit 32.

Figure 3:
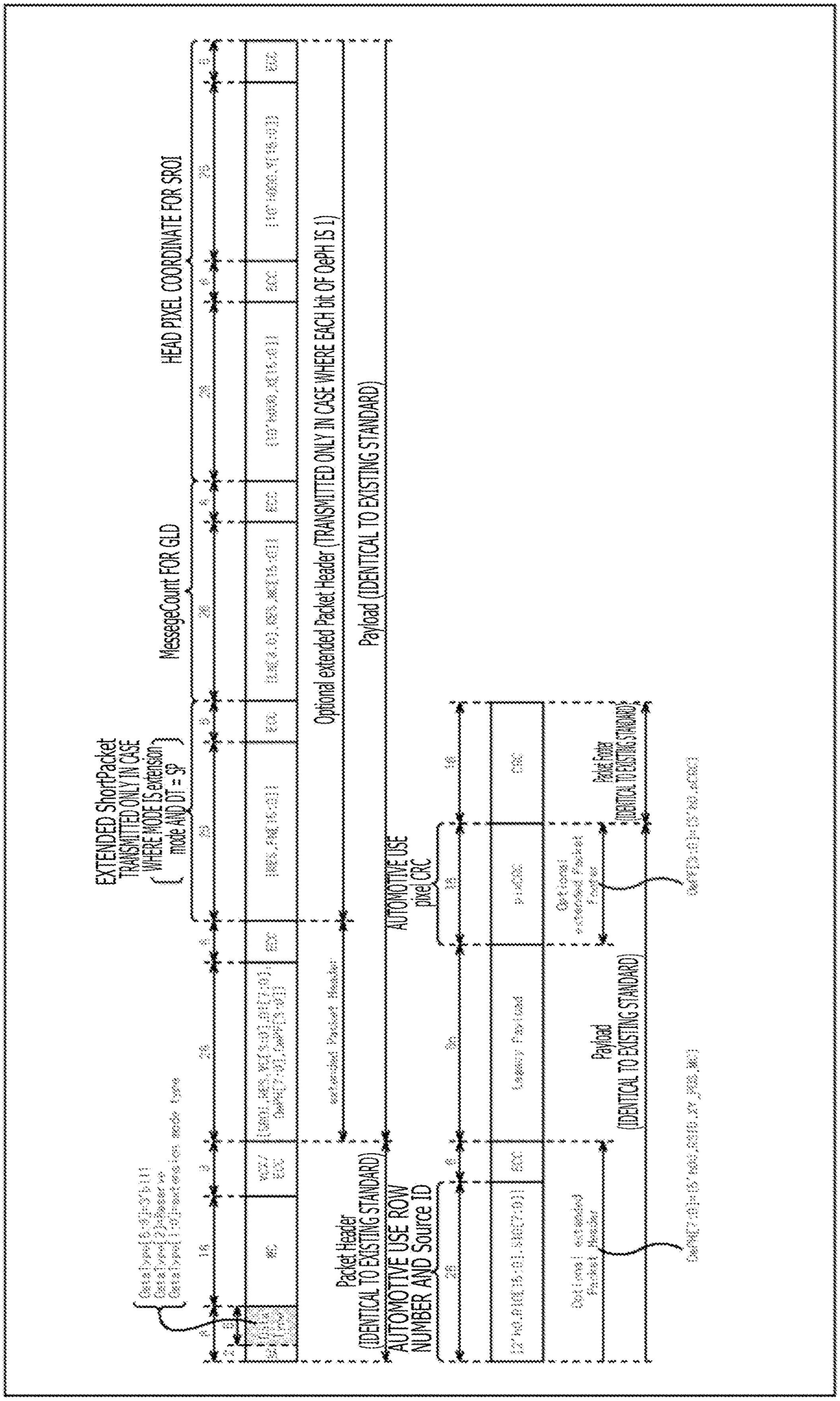
FIG. 3 is a diagram depicting a first structure example of the entire packet structure or an extended D-PHY packet.

FIG. 3 depicts the entire packet structure of a packet (hereinafter, referred to as an extended D-PHY packet) that is used in a CSI-2 extension mode in a case where a physical layer is D-PHY.

As depicted in FIG. 3, an extended D-PHY packet has a packet structure including a packet header and a packet footer identical to those of the existing CSI-2 standard packet structure. For example, a VC (VirtualChannel) which indicates the number of lines in a virtual channel, a data type (DataType) which indicates the type of data, a WC (WordCount) which indicates the length of a payload, and a VCX/ECC are stored in the packet header. In addition, CRC (Cyclic Redundancy Check) is stored in the packet footer.

Here, in a data type that is transmitted in a packet header in accordance with the existing CSI-2 standard, 0x3B to 0x3F are defined as reserve. Thus, in the extended D-PHY packet, setting information for allowing a reception side to identify an extension mode is additionally defined with use of the data type which indicates reserve in the existing packet.

For example, the data type is defined as follows.

DataType [5:3]=3'b111 which indicates an extension mode

DataType[2]=Reserve (RES: Reservation for future extension)

DataType[1:0]=extension mode type (four extension modes are prepared)

Specifically, in the existing CSI-2 standard, among 0x38 to 0x33F for which data type=Reserve is defined, DataType [5:3] is defined as extension mode setting information, and DataType[1:0] is defined as extension type setting information, for example. The extension mode setting information indicates whether or not the mode is an extension mode. For example, DataType[5:3]=3'b111 indicates that the mode is an extension mode. In addition, when four types, i.e., an extension mode 0, an extension mode 1, an extension mode 2, and an extension mode 3 are prepared as the types of the extension mode, the extension type setting information indicates any one of these types. For example, DataType[1:0]=2'b00 indicates that the type of the extension mode is the extension mode 0.

Then, in the extension mode 0 (DataType [1:0]=2'b00), a packet structure in which a payload is divided into four is defined. That is, in the extension mode 0, a payload is sectioned into an extended packet header (ePH), an optional extended packet header (OePH), a legacy payload (Legacy Payload), and an optional extended packet footer (OePF), as depicted in FIG. 3. It is to be noted that the extended packet header may be repeatedly transmitted.

The extended packet header is located at the head which corresponds to a payload in the existing CSI-2 standard, and is necessarily transmitted in an extension mode. For example, as depicted in FIG. 3, the extended packet header includes setting information including a SROI identification flag, an extended VC (VirtualChannel), an extended DataType, an OePH selection flag, and an OePF selection flag. Here, due to the extended VC, a VC for which 4 bits are used in the existing CSI-2 standard is extended to 8 bits. Due to the extended DataType, the DataType for which 4 bits are used in the existing CSI-2 standard is extended to 8 bits.

For example, in a D-PHY packet, a 4-bit VC in an existing packet header is already present. An extended VC in the extended packet header is defined as 4 bits, so that 8 bits are used in total. Specifically, OePH[7:0]={5'h00,RSID,XY-_POS,MC} and OePF[3:0]={3'h0,pCRC} can be defined, and the ON/OFF of packet transmission necessary for each application can be controlled.

The optional extended packet header and the optional extended packet footer are selectively transmitted according to an application.

The legacy payload corresponds to a payload identical to that in the existing CSI-2 standard.

When the extended packet header, the optional extended packet header, and the optional extended packet footer are defined in the above-described manner if needed, data adaptable to a variety of applications can be transmitted. In addition, it is assumed that data to be transmitted in the extended packet header, the optional extended packet header, and the optional extended packet footer is a 26-bit+6-bit ECC (Error Correction Code). In this case, an existing packet header circuit can be used to suppress upsizing of the circuit and to improve the error resistance.

Figure 4:
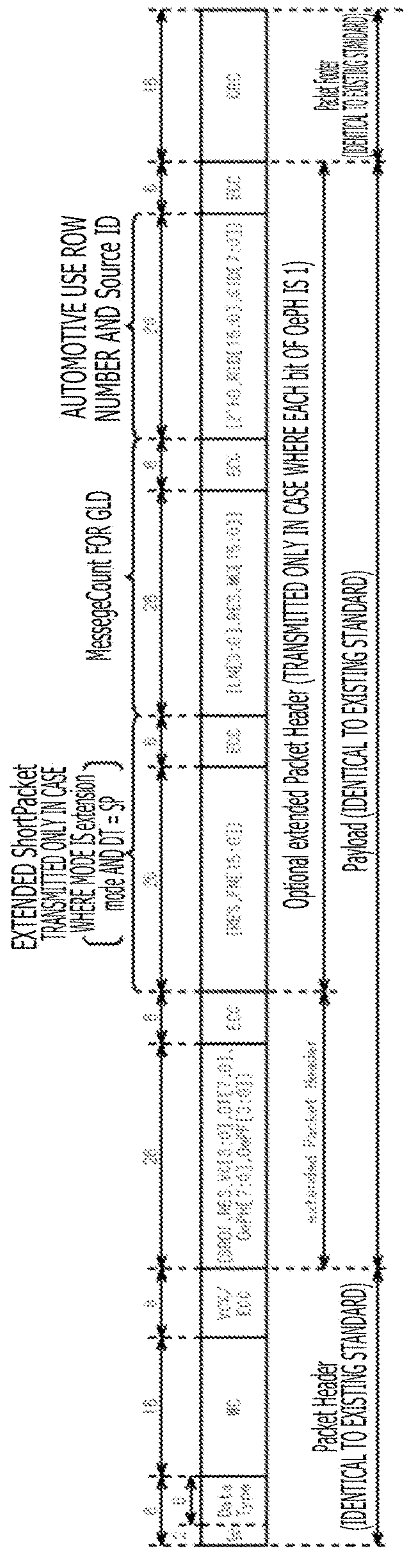
FIG. 4 is a diagram depicting a first structure example of a packet structure of an extended D-PHY short packet.
Figure 5:
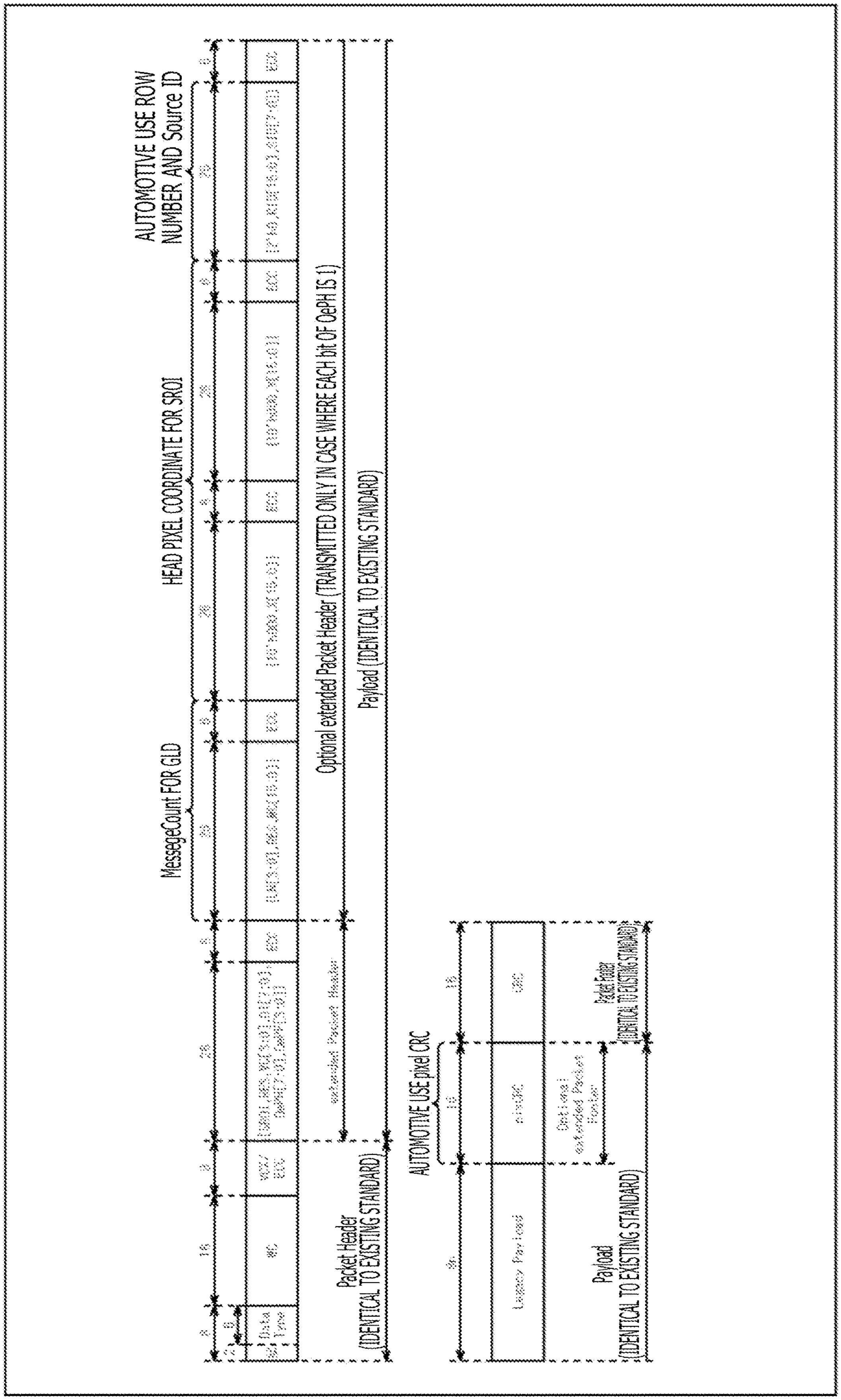
FIG. 5 is a diagram depicting a first structure example of a packet structure of an extended D-PHY long packet.

As a specific application example of such an extended D-PHY packet, FIG. 4 depicts a packet structure of a short packet (hereinafter, referred to as an extended D-PHY short packet) that is used in the CSI-2 extension mode in a case where the physical layer is D-PHY. Likewise, FIG. 5 depicts a packet structure of a long packet (hereinafter, referred to as an extended D-PHY long packet) that is used in a CSI-2 extension mode in a case where the physical layer is D-PHY.

In the extended D-PHY short packet depicted in FIG. 4, extension type setting information in the data type stored in the packet header indicates that the extension mode type is the extension mode (DT[5:0]=0x10C (5'b111_0_0)). Further, short packet setting information in the data type stored in the extended packet header indicates that the packet is a short packet (DT[7:0]=0x00 (Frame Start Code(Short Packet))).

In a case where an extension mode is set and the data type stored in the extended packet header is DT[7:0]=0x00 to 0x0F, data necessarily including a Short Packet Data Field of an extended short packet in the optional extended packet header is transmitted as the extended short packet. The Short Packet Data Field is identical to that defined by the existing CSI-2 standard.

It is to be noted that, when the extended short packet is transmitted, MC (MessageCount for GLD) and RSID (automotive use row number and Source ID) in the optional extended packet header may be transmitted, but the legacy payload and pCRC are prohibited from being transmitted because the legacy payload and pCRC are unnecessary. In a case where the legacy payload and pCRC are transmitted by mistake, they are ignored by the reception side.

Further, compared to an extended short packet conforming to the existing CSI-2 standard, an extended short packet having such a packet structure as that depicted in FIG. 4, in which the bit width of the data type and the virtual channel can be extended, is adaptable to a variety of applications defined in the optional extended packet header. In addition, in a case where these functions are unnecessary, an extended short packet conforming to the existing CSI-2 standard may be transmitted together with an extended long packet.

In an extended D-PHY long packet depicted in FIG. 5, extension type setting information in a data type stored in a packet header indicates that an extension mode type is an extension mode 0 (DT[5:0]=0x1C (5'b111_0_0). In addition, short packet setting information in the data type stored in the extended packet header indicates that the packet is other than a short packet (DT[7:0] is other than 0x00 to 0x0F (=extended LongPackt)). Therefore, data including Short Packet Data Field is not transmitted in an extended long packet.

In addition, an optional extended packet header, a legacy payload, and an optional extended packet footer are stored in a payload of the existing CSI-2 standard according to a setting in the extended packet header, and then are transmitted. Since they are stored in the existing payload and transmitted as described above, the existing SerDes transmission circuit 34 and the SerDes reception circuit 35 (FIG. 2) recognize the payload similarly to image data that is transmitted in the existing payload, and transmits the payload as it is to the later stage.

Then, the application processor 22 in the final stage determines that the mode is an extension mode, from data type DT[5:0] in the packet header. Therefore, the application processor 22 can interpret the contents of the payload sequentially from the extended packet header and extract data for a desired extension mode.

Figure 6:
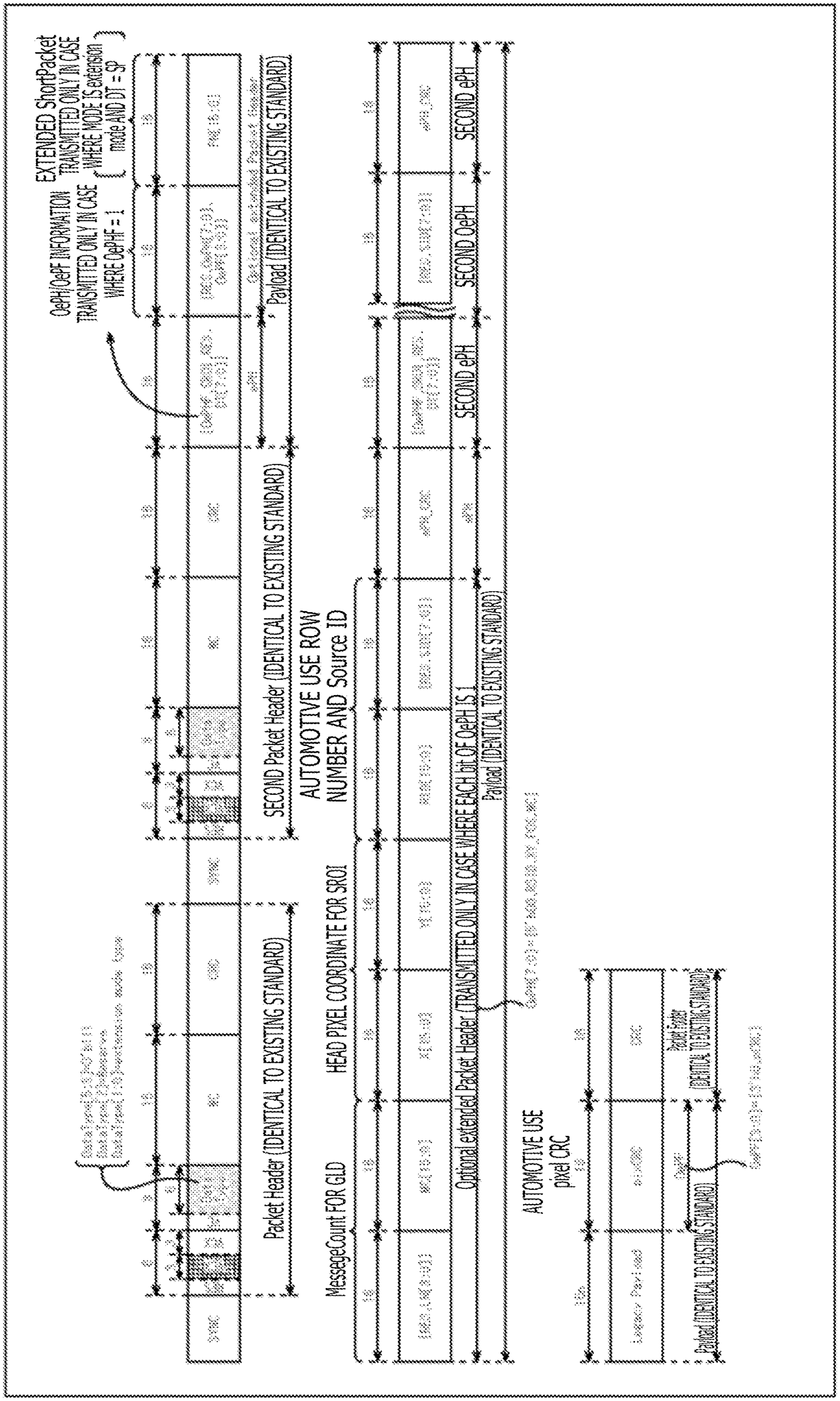
FIG. 6 is a diagram depicting a first structure example of the entire packet structure of an extended C-PHY packet.

FIG. 6 depicts an entire packet structure of a packet thereinafter, referred to as an extended C-PHY packet) that is used in a CSI-2 extension mode in a case where the physical layer is C-PHY. It is to be noted that an explanation of a configuration in the extended C-PHY packet depicted in FIG. 6 common to that in the extended D-PHY packet in FIG. 3 will be omitted. An explanation of the difference will be given.

Analogous to those in the extended e-PHY packet in FIG. 3, the data type in the extended C-PHY packet identifies an extension mode, for example. Data, in the extended C-PHY packet, corresponding to an application which is executed in the application processor 22 is fully extended in the payload, and is transmitted.

In the extended C-PHY packet depicted in FIG. 6, two packet headers are transmitted, and units of 16-bit data are arranged as in a C-PHY packet conforming to the existing CSI-2 standard because 16 bits are converted into 7 symbols in C-PHY. In addition, an extended packet header is located at the head of the payload. With regard to the virtual channel, the head of the existing packet header is Reserve therefor in C-PHY, and thus, no virtual channel is stored in the extended packet header. It goes without saying that a virtual channel may be stored in an extended packet header, as in the extended D-PHY packet.

In addition, a flag OePHF is prepared because the bit number of the optional extended packet header and the bit number of the optional extended packet footer are large, and OePH/OePF information is subsequently transmitted in a case where the flag indicates 1. Subsequent to the ePH information and the OePH information, CRC is transmitted as an extended packet header, and two packet headers each having a similar configuration is repeatedly transmitted. In such a manner, the structure which is the same as that of the existing mechanism of transmitting two packet headers is adopted, so that both circuit reusability and error resistance can be achieved.

Figure 7:
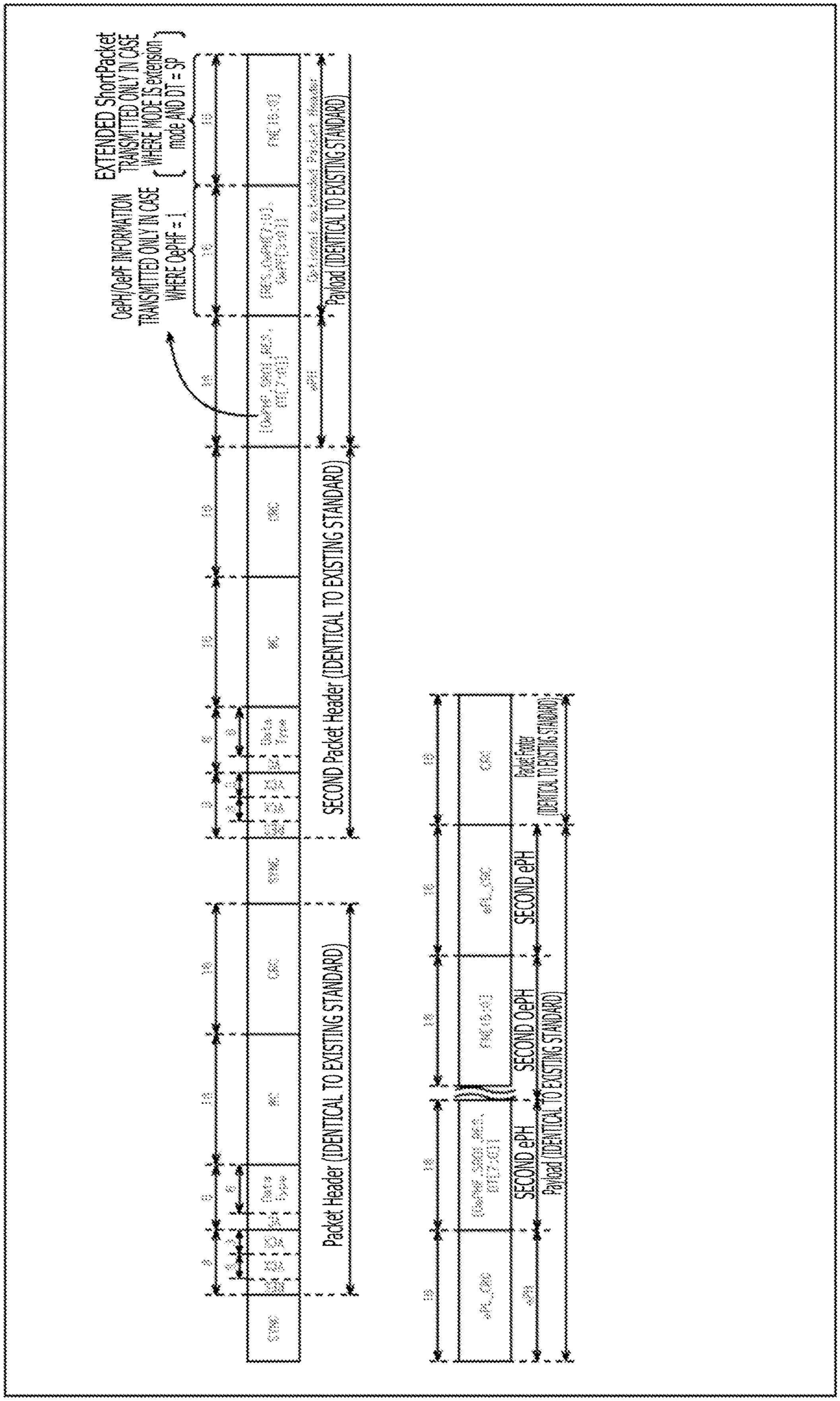
FIG. 7 is a diagram depicting a first structure example of a packet structure of an extended C-PHY short packet.

As a specific application example of such an extended C-PHY packet, FIG. 7 depicts a packet structure of a short packet (hereinafter, referred to as an extended C-PHY short packet) that is used in a CSI-2 extension mode in a case where the physical layer is C-PHY. Likewise, FIG. 8 depicts a packet structure of a long packet (hereinafter, referred to as an extended C-PHY long packet) that is used in a CSI-2 extension mode in a case where the physical layer is C-PHY.

Figure 8:
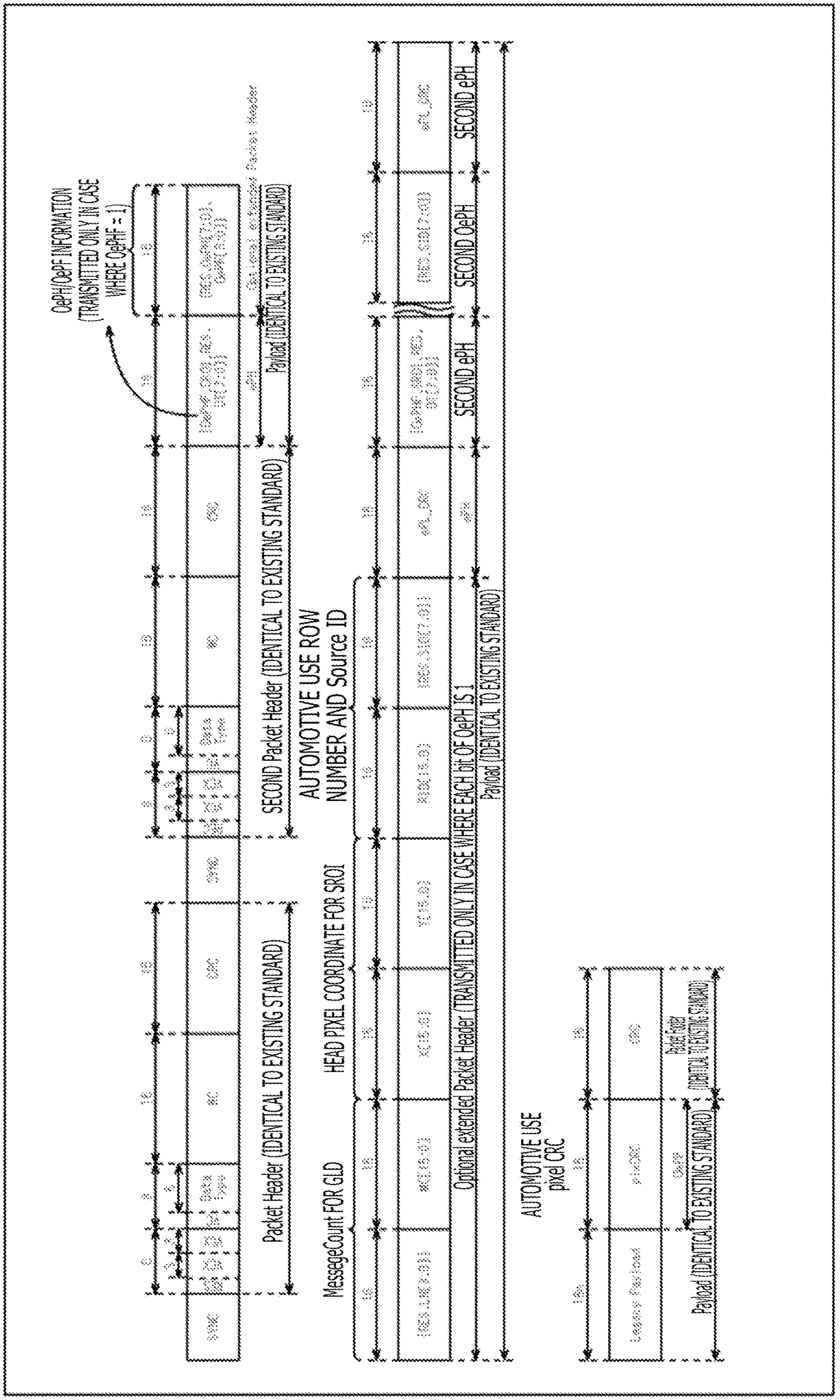
FIG. 8 is a diagram depicting a first structure example of a packet structure of an extended C-PHY long packet.

It is to be noted that the extended C-PHY short packet depicted in FIG. 7 is not largely different in the packet structure from the extended D-PHY short packet depicted in FIG. 4, and the extended C-PHY long packet depicted in FIG. 8 is not largely different in the packet structure from the extended D-PHY long packet depicted in FIG. 5.

<Configuration Example of Image Sensor and Application Processor>

Figure 9:
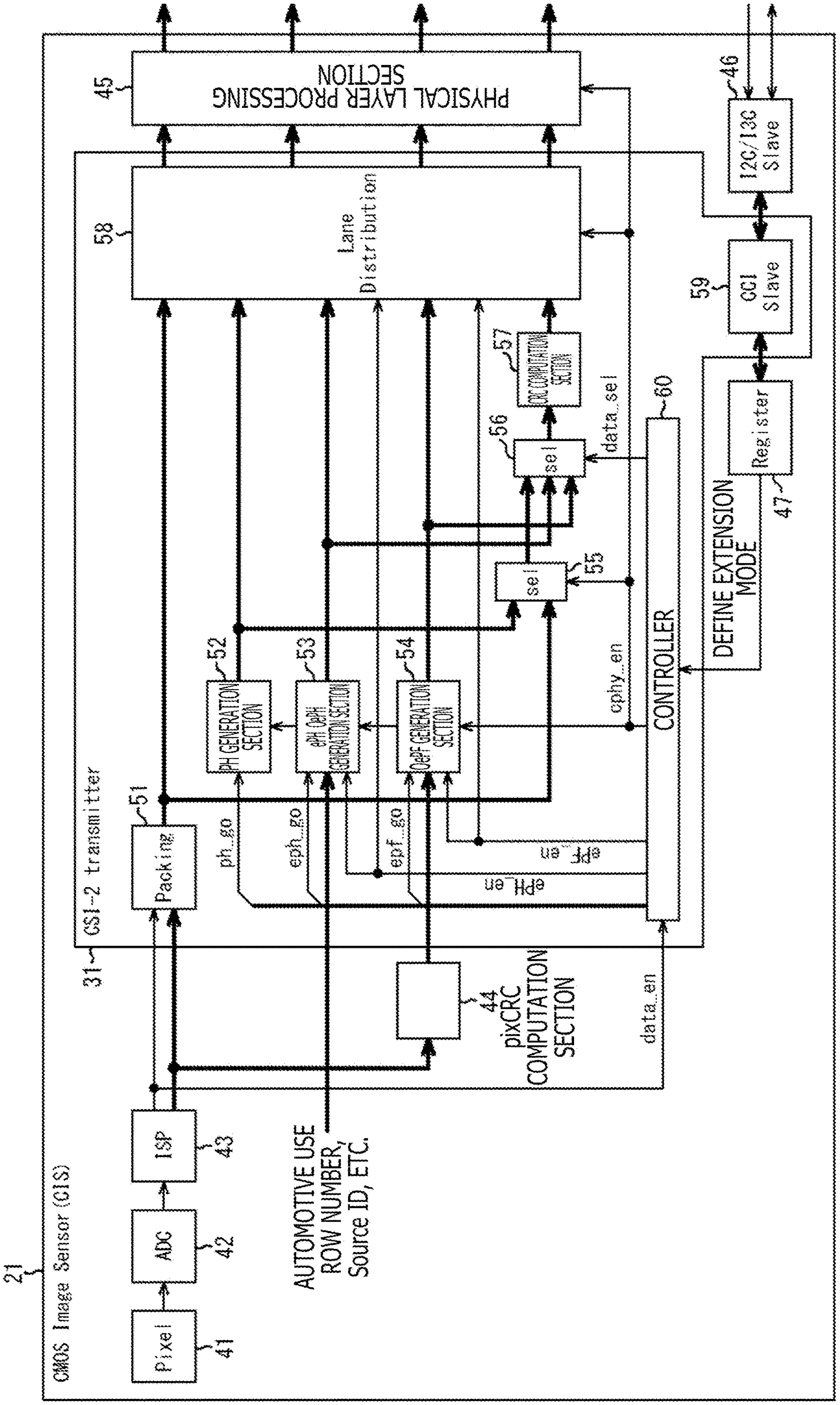
FIG. 9 is a block diagram depicting a configuration example of an image sensor.

FIG. 9 is a block diagram depicting a configuration example of the image sensor 21 including an extension mode-capable CSI-2 transmission circuit 31.

As depicted in FIG. 9, the image sensor 21 includes a pixel 41, an AD converter 42, an image processing section 43, a pixel CPC computation section 44, a physical layer processing section 45, an I2C/I3C slave 46, and a register 47, in addition to the extension mode-capable CSI-2 transmission circuit 31. Further, the extension mode-capable CSI-2 transmission circuit 31 includes a packing section 51, a packet header generation section 52, an extended packet header generation section 53, an extended packet footer generation section 54, selection sections 55 and 56, a CRC computation section 57, a lane distribution section 58, a CCI slave 59, and a controller 60.

The pixel 41 outputs an analog pixel signal corresponding to the light amount of received light. The AD converter (ADC: Analog-to-Digital Converter) 42 performs digital conversion on the pixel signal outputted from the pixel 41, and supplies the converted signal to the image processing section 43. The image processing section (ISP: Image Signal Processor) 43 supplies, to the pixel CRC computation section 44 and the packing section 51, image data obtained by performing various types of image processing on an image based on the pixel signal. In addition, the image processing section 43 supplies, to the packing section 51 and the controller 60, a data enable signal data_en which indicates whether or not the image data is enabled or not.

The pixel CRC computation section 44 obtains CPC for each pixel in the image data supplied from the image processing section 43, and supplies the obtained CRC to the extended packet footer generation section 54.

The physical layer processing section 45 can execute physical layer processing for both C-PHY and D-PHY. For example, in a case where a C-layer enable signal cphy_en supplied from the controller 60 is valid, the physical layer processing section 45 executes physical layer processing for C-PHY. In a case where the C-layer enable signal cphy_en is invalid, the physical layer processing section 45 executes physical layer processing for D-PHY. Then, the physical layer processing section 45 transmits, to the application processor 22, packets divided into four lanes by the lane distribution section 58.

The I2C/I3C slave 46 performs communication under the initiative of an I2C/I3C master 72 (FIG. 10) of the application processor 22 in accordance with the I2C (Inter-Integrated Circuit) or I3C (Improved Inter Integrated Circuits) standard.

Various settings transmitted from the application processor 22 are written into the register 47 via the I2C/I3C slave 46 and the CCI slave 59. Examples of the settings to be written into the register 47 include a communication setting conforming to the CSI-2 standard, an extension mode setting which indicates whether or not to use an extension mode, and a fixed communication setting necessary for extension mode communication.

The packing section 51 executes packing processing for storing the image data supplied from the image processing section 43 into a payload of a packet, and supplies the payload to the selection section 55 and the lane distribution section 56.

When receiving a command to generate a packet header according to a packet header generation command signal ph_go supplied from the controller 60, the packet header generation section 52 generates a packet header, and supplies the packet header to the selection section 55 and the lane distribution section 58.

That is, in accordance with the existing CSI-2 standard, the packet header generation section 52 generates setting information which indicates a condition set for data to be transmitted by the packet. For example, the information is a packet header in which a data type which indicates the type of the data is stored. In addition, in an unused area in a data type that is setting information indicating the type of data to be transmitted by the packet, the unused area being defined to be unused in the existing CSI-2 standard, the packet header generation section 52 stores extension mode setting information which indicates whether or not the mode is an extension mode that uses an extended header. Further, in the unused area, the packet header generation section 52 stores extension type setting information which indicates the type of the extension mode among the multiple prepared extension mode types.

The extended packet header generation section 53 generates an extended packet header and an optional extended packet header according to an extended packet header generation command signal eph_go and an extended packet header enable signal ePH_en supplied from the controller 60, and supplies the extended packet header and the optional extended packet header to the selection section 56 and the lane distribution section 58. In addition, an automotive use row number, a source ID (identification), etc., are supplied to the extended packet header generation section 53 according to the application of the image sensor 21, and are stored in the extended packet header or the optional extended packet header, if needed.

That is, separately from the packet header generated by the packet header generation section 52, the extended packet header generation section 53 generates an extended packet header that stores such setting information as that depicted in FIG. 3, for example. Further, in case of transmitting an optional extended packet header, the extended packet header generation section 53 stores, in the extended packet header, optional extended packet header setting information which indicates that the extended packet header generation section 53 transmits the optional extended packet header, as optional extended packet header setting information (OePH[7:0]) for indicating whether or not to transmit an optional extended packet header, and generates the optional extended packet header subsequent to the extended packet header.

The extended packet footer generation section 54 generates an optional extended packet footer according to an extended packet footer generation command signal epf_go and an extended packet header enable signal ePF_en supplied from the controller 60, and supplies the optional extended packet footer to the selection section 56 and the lane distribution section 58.

That is, the extended packet footer generation section 54 generates an optional extended packet footer that is located to follow the legacy payload that stores data which has been transmitted as a payload in the existing CSI-2 standard, in a case where a packet to be transmitted in an extension mode is an extended long packet that stores the data.

In addition, a C-layer enable signal cphy_en is supplied from the controller 60 to the packet header generation section 52, the extended packet header generation section 53, and the extended packet footer generation section 54. Further, in a case where the C-layer enable signal cphy_en is valid, the packet header generation section 52, the extended packet header generation section 53, and the extended packet footer generation section 54 generate a C-PHY packet header, an extended C-PHY packet header and an optional extended packet header, and a C-PHY optional extended packet footer, respectively. On the other hand, in a case where the C-layer enable signal cphy_en is invalid, the packet header generation section 52, the extended packet header generation section 53, and the extended packet footer generation section 54 generate a D-PHY packet header, an extended D-PHY packet header and an optional extended packet header, and a D-PHY optional extended packet footer, respectively.

According to a C-layer enable signal cphy_en supplied from the controller 60, the selection section 55 selects the packet header supplied from the packet header generation section 52, in a case where the C-layer enable signal cphy_en is valid, and supplies the packet header to the selection section 56. On the other hand, the selection section 55 selects the payload supplied from the packing section 51, in a case where the C-layer enable signal cphy_en is invalid, and supplies the payload to the selection section 56.

According to a data selection signal data_sel supplied from the controller 60, the selection section 56 selects any one of the packet header or the payload selectively supplied via the selection section 55, the extended packet header and the optional extended packet header supplied from the extended packet header generation section 53, and the optional extended packet footer supplied from the extended packet footer generation section 54, and supplies the selected one to the CPC computation section 57.

The CRC computation section 57 obtains CRC of the packet header, the payload, the extended packet header, the optional extended packet header, or the optional extended packet footer selectively supplied via the selection section 56, and supplies the obtained CRC to the lane distribution section 58.

Under control of the controller 60, the lane distribution section 58 distributes the payload supplied from the packing section 51, the packet header supplied from the packet header generation section 52, the extended packet header and the optional extended packet header supplied from the extended packet header generation section 53, the optional extended packet footer supplied from the extended packet footer generation section 54, and the CRC supplied from the CRC computation section 57, to four lanes in conformity with the CSI-2 standard, and supplies them to the physical layer processing section 45.

The CCI (Camera Control Interface) slave 59 performs communication in accordance with the CSI-2 standard and under the initiative of a CCI master 88 (FIG. 10) of the application processor 22.

The controller 60 reads out various settings stored in the register 47, and performs control on the blocks constituting the extension mode-capable CSI-2 transmission circuit 31 according to the settings. For example, according to the contents of data to be transmitted, the controller 60 controls switching between transmission of a packet having a packet structure conforming to the existing CSI-2 standard and transmission of a packet having a packet structure for an extension mode.

The image sensor 21 has the above-mentioned configuration. The image sensor 21 is capable of generating an extended packet having the packet structure explained with reference to FIGS. 3 to 8, and transmitting the extended packet to the application processor 22.

Figure 10:
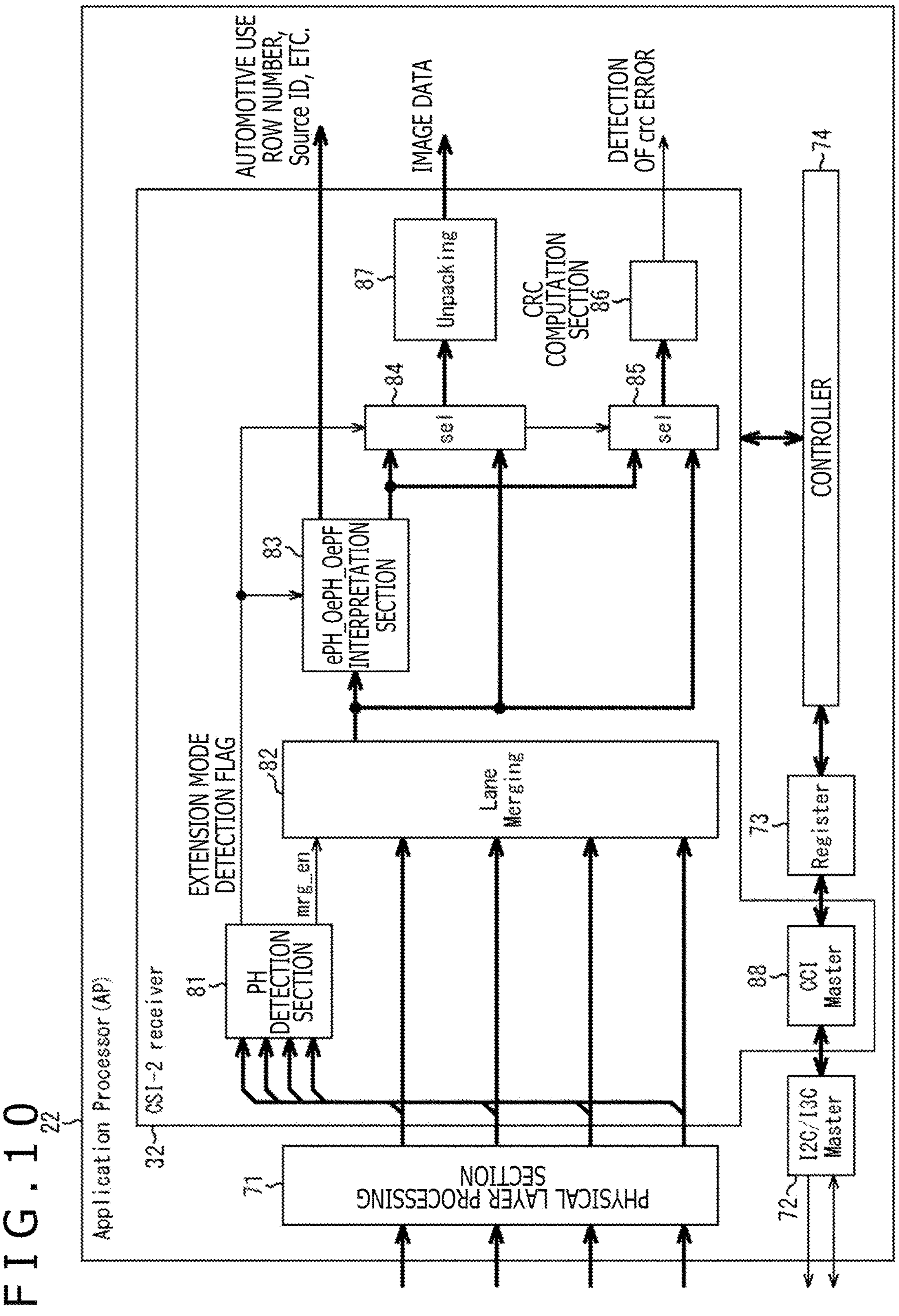
FIG. 10 is a block diagram depicting a configuration example of an application processor.

FIG. 10 is a block diagram depicting a configuration example of the application processor 22 including the extension mode-capable CSI-2 reception circuit 32.

As depicted in FIG. 10, the application processor 22 includes a physical layer processing section 71, an I2C/I3C master 72, a register 73, and a controller 74, in addition to the extension mode-capable CSI-2 reception circuit 32. Further, the extension mode-capable CSI-2 reception circuit 32 includes a packet header detection section 81, a lane merging section 82, an interpretation section 83, selection sections 84 and 85, a CRC computation section 86, an unpacking section 87, and a CCI master 88.

The physical layer processing section 71 can execute physical layer processing for both C-PHY and L-PHY. As previously explained, the physical layer processing section 45 of the image sensor 21 executes physical layer processing for either C-PHY or D-PHY. The physical layer processing section 71 executes processing for a physical layer identical to that processed by the physical layer processing section 45.

The I2C/I3C master 72 takes an initiative in communicating with the I2C/I3C slave 46 (FIG. 9) of the image sensor 21 in accordance with the I2C or I3C standard.

Various settings to be written into the register 47 of the image sensor 21 by the controller 74 are recorded in the register 73.

The controller 74 performs control on the blocks constituting the application processor 22.

The packet header detection section 81 detects a packet header in a packet supplied from the physical layer processing section 71, and checks a data type stored in the packet header. Then, in a case where the data type in the packet header indicates that extension mode setting information indicates that the mode is an extension mode (DataType[5:3]=3'b111), the packet header detection section 81 supplies an extension mode detection flag indicating the extension mode to the interpretation section 83, the selection section 84, and the selection section 85. In addition, on the basis of the packet header, the packet header detection section 81 supplies, to the lane merging section 82, a merging enable signal mrg_en indicating whether or not to enable merge of four divided lanes.

That is, the packet header detection section 81 detects a packet header that stores setting information (data type, etc.) indicating a condition set for data to be transmitted by the packet in accordance with the existing CSI-2 standard. At this time, the packet header detection section 81 outputs the extension mode detection flag according to extension mode setting information which indicates whether or not the mode is an extension mode using an extended header and which is stored in an unused area in a data type that is setting information indicating the type of data to be transmitted by the packet, the unused area being defined to be unused in the existing CSI-2 standard, so that switching between reception of a packet having a packet structure conforming to the existing CSI-2 standard and reception of a packet having a packet structure for the extension mode is performed. Further, the packet header detection section 81 recognizes the type of the extension mode among the multiple prepared extension mode types, according to the extension mode setting information stored in an area, in the data type, defined as an unused area in the existing CSI-2 standard.

In a case where a merging enable signal mrg_en supplied from the packet header detection section 81 is valid, the lane merging section 82 merges packets divided to four lanes and supplied from the physical layer processing section 71. Then, the lane merging section 82 supplies the packet by one lane to the interpretation section 63, the selection section 84, and the selection section 85.

In a case where an extension mode detection flag supplied from the packet header detection section 81 indicates that the mode is an extension mode, the interpretation section 83 reads out an extended packet header, an optional extended packet header, and an optional extended packet footer from the packet supplied from the lane merging section 82, on the basis of the packet structure of the extension mode. Thereafter, the interpretation section 83 interprets setting information stored in the extended packet header, the optional extended packet header, and the optional extended packet footer.

That is, the interpretation section 83 receives, as an extended header, the extended packet header located at the head of the payload conforming to the existing CSI-2 standard, and interprets setting information stored in the extended packet header. In addition, in a case where optional extended packet header setting information stored in the extended packet header indicates that an optional extended packet header which is selectively transmitted according to an application is transmitted, the interpretation section 83 receives the optional extended packet header subsequent to the extended packet header, and interprets setting information stored in the optional extended packet header. Moreover, in a case where a packet to be transmitted in the extension mode is an extended long packet that stores data which has been transmitted in a payload in the existing CSI-2 standard, the interpretation section 93 receives the optional extended packet footer located next to the legacy payload in which data is stored, and interprets the optional extended packet footer.

Then, for example, the interpretation section 93 reads out an automotive use row number, a source ID, etc., stored in the optional extended packet header, and outputs the automotive use row number and the source ID to LSI (not depicted) in the later stage.

It is to be noted that, in a case where the extension mode detection flag supplied from the packet header detection section 81 does not indicate that the mode is an extension mode, that is, in a case where a packet having a packet structure of an existing packet is supplied, the interpretation section 83 comes to a halt without executing the above-mentioned processing.

According to the extension mode detection flag supplied from the packet header detection section 81, the selection section 84 selectively supplies data to the unpacking section 87 on the basis of a packet structure of an existing packet or a packet structure of an extended packet.

According to the extension mode detection flag supplied from the packet header detection section 81, the selection section 85 selectively supplies data to the CPC computation section 86 on the basis of a packet structure of an existing packet or a packet structure of an extended packet.

The CRC computation section 86 computes CRC of the packet header, the payload, the extended packet header, the optional extended packet header, or the optional extended packet footer selectively supplied via the selection section 85. Then, in a case where a CRC error is detected, the CRC computation section 86 outputs, to LSI (not depicted) in the later stage, a crc error detection signal indicating that the CRC error is detected.

The unpacking section 87 executes unpacking processing for extracting image data stored in the payload selectively supplied via the selection section 84, and outputs the obtained image data to LSI (not depicted) in the later stage.

The CCI master 88 takes an initiative in communicating with the CCI slave 59 (FIG. 9) of the image sensor 21 on the basis of the CSI-2 standard.

The application processor 22 has the above-mentioned configuration, and is capable of acquiring image data by receiving an extended packet transmitted from the image sensor 21 and interpreting setting information stored in an extended packet header, an optional extended packet header, and an optional extended packet footer.

<Communication Process>

A communication process that is performed by the image sensor 21 and the application processor 22 will be explained with reference to FIGS. 11 to 14.

Figure 11:
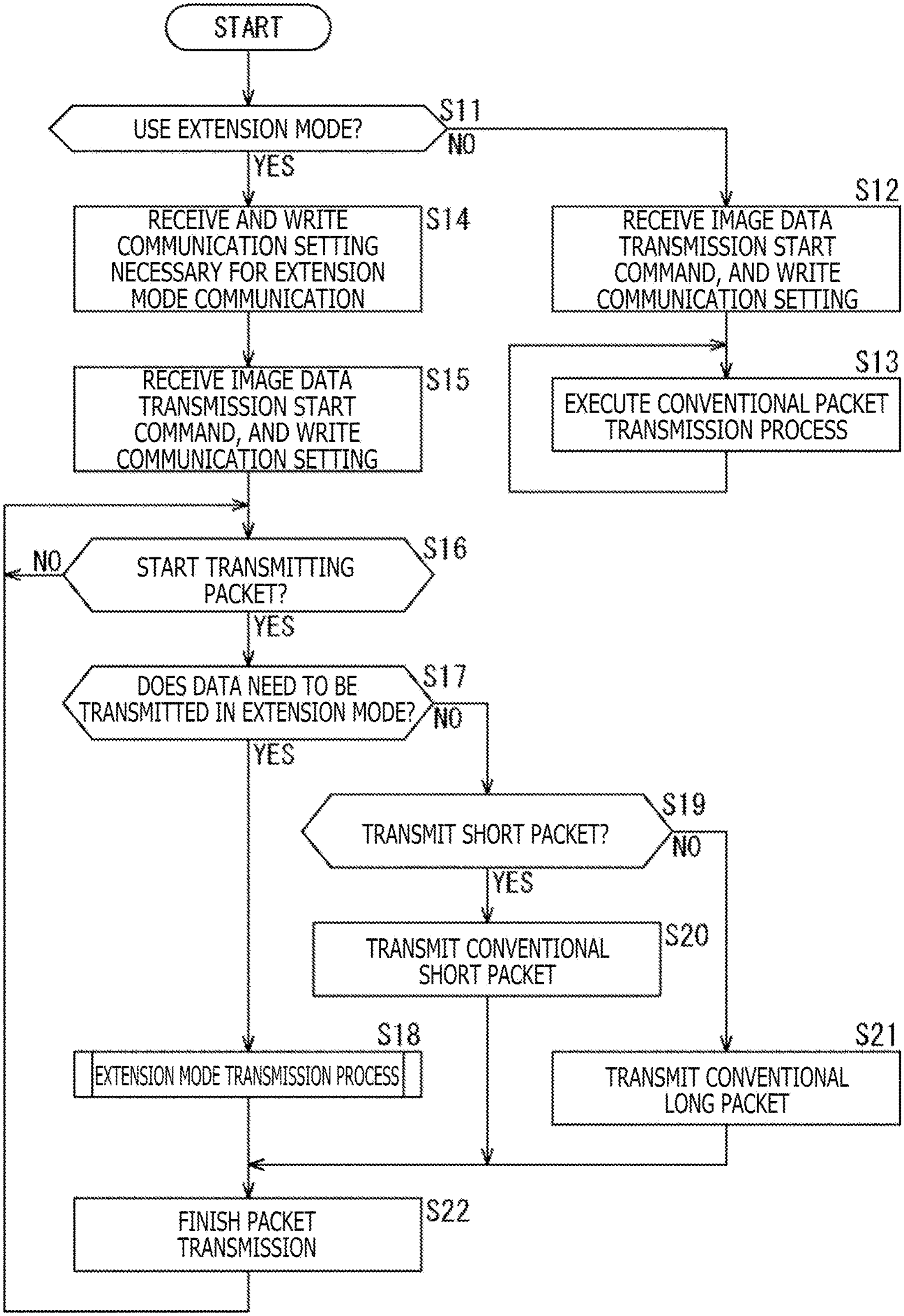
FIG. 11 is a flowchart for explaining a process in which the image sensor transmits a packet.

FIG. 11 is a flowchart for explaining a process in which the image sensor 21 transmits a packet.

For example, when the image sensor 21 is connected to the application processor 22 via the bus 23, the process is started. In step S11, the controller 60 determines whether or not to use an extension mode when starting communication with the application processor 22. For example, the controller 60 checks an extension mode setting stored in the register 47, and determines to use an extension mode in a case where an extension mode setting written by the application processor 22 indicates that an extension mode is to be used.

In a case where the controller 60 determines, in step S11, to refrain from using an extension mode, the process proceeds to step S12.

In step S12, the I2C/I3C slave 46 receives an image data transmission start command transmitted from the application processor 22 (step S54 in FIG. 13 which will be explained later). Further, the I2C/I3C slave 46 receives a communication setting which conforms to the CSI-2 standard and which is transmitted together with the transmission start command, and writes the communication setting into the register 47 via the CCI slave 59.

In step S13, in the image sensor 21, a conventional packet transmission process of transmitting a packet having a packet structure conforming to the existing CSI-2 standard to the application processor 22 is executed on the basis of the communication setting stored in the register 47.

On the other hand, in a case where the controller 60 determines, in step S11, to use an extension mode, the process proceeds to step S14.

In step S14, the I2C/I3C slave 46 receives a fixed communication setting (e.g., a lane-based copy of PH/PF when GLD occurs) which is necessary for extension mode communication, and writes the fixed communication setting into the register 47 via the CCI slave 59.

In step S15, the I2C/I3C slave 46 receives an image data transmission start command transmitted from the application processor 22 (step S57 in FIG. 13 which will be explained later). Further, the I2C/I3C slave 46 receives a communication setting which conforms to the CSI-2 standard and which is transmitted together with the transmission start command, and writes the communication setting into the register 47 through the CCI slave 59.

In step S16, the controller 60 determines whether or not to start transmitting a packet, and suspends the process until determining to start transmitting a packet.

In a case where start of transmission of a packet is determined in step S16, the process proceeds to step S17 in which the controller 60 determines whether or not data is to be transmitted in an extension mode. Here, the controller 60 determines that the data should be transmitted in an extension mode according to the contents of the data. For example, the controller 60 determines that the data should be transmitted in an extension mode in a case where the data is to be transmitted in use cases such as application examples described later.

In a case where the controller 60 determines, in step S17, that the data should be transmitted in an extension mode, the process proceeds to step S18 in which an extension mode transmission process (see FIG. 12) of transmitting an extended packet corresponding to the extension mode is executed.

On the other hand, in a case where the controller 60 determines, in step S17, that the data should not be transmitted in an extension mode, the process proceeds to step S19.

In step S19, the controller 60 determines whether or not to transmit a short packet. For example, the controller 60 determines to transmit a short packet at the start of a frame or the end of a frame.

In a case where the controller 60 determines, in step S19, to transmit a short packet, the process proceeds to step S20. In step S20, the packet header generation section 52 generates a packet header, and transmits a short packet having a conventional packet structure to the application processor 22.

On the other hand, in a case where the controller 60 determines, in step S19, to refrain from transmitting a short packet (or to transmit a long packet), the process proceeds to step S21. In step S21, the packing section 51 stores image data in a payload, and the CRC computation section 57 obtains CPC, so that a long packet having a conventional packet structure is generated, and is transmitted to the application processor 22.

The process in Step S18, step S20, or step S21 is followed by step S22 in which the controller 60 finishes the packet transmission process. Thereafter, the process returns to step S16, and then, the similar packet transmission process is repeated for the next packet.

Figure 12:
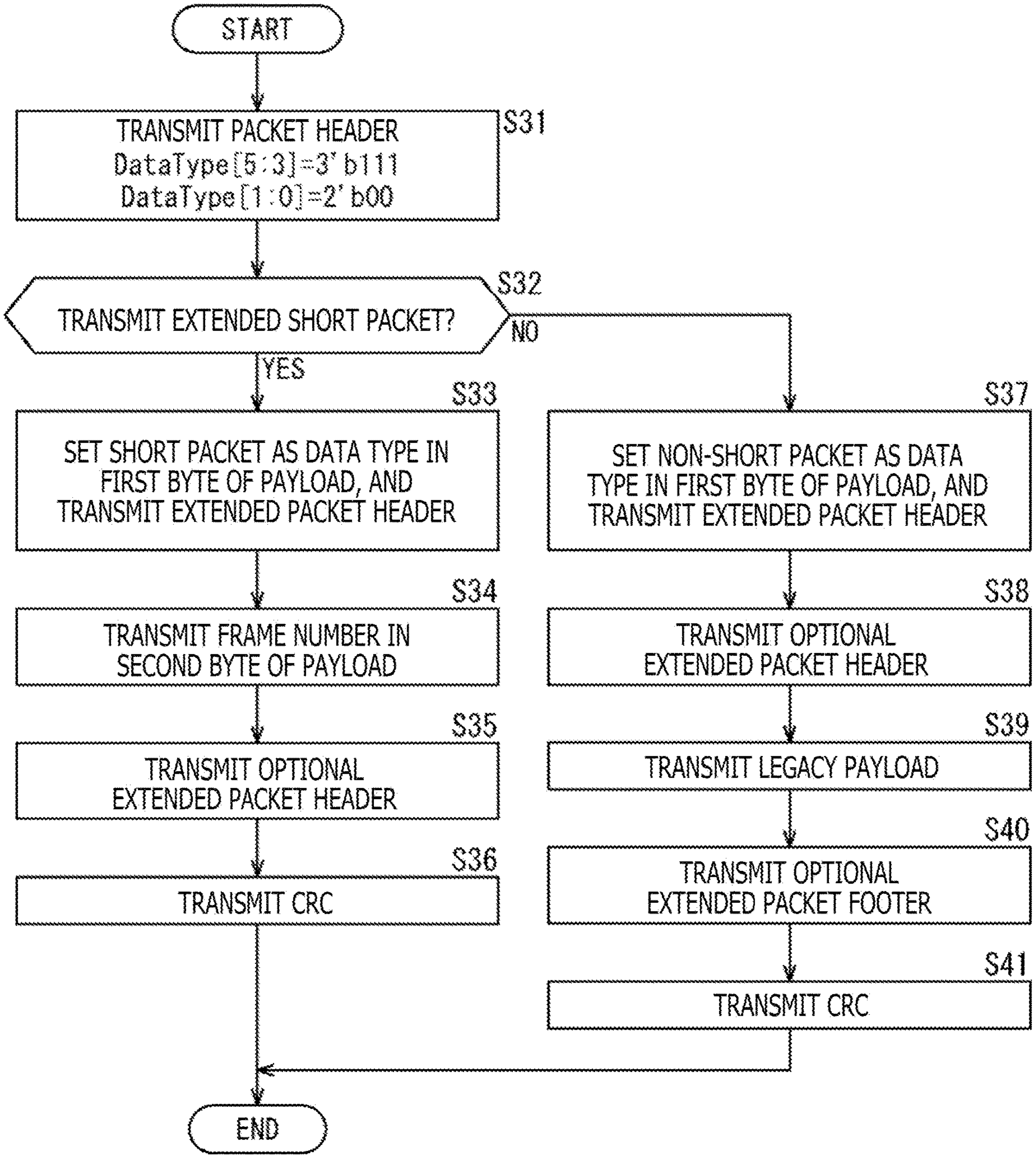
FIG. 12 is a flowchart for explaining an extension mode transmission process.

FIG. 12 is a flowchart for explaining the extension mode transmission process which is executed in step S18 in FIG. 11.

In step S31, the packet header generation section 52 generates a packet header that stores a VC, a data type, a WC, etc., and transmits the packet header to the application processor 22. Here, the packet header generation section 52 writes, into the data type in the packet header, extension mode setting information (DataType[5:3]=3'b111) indicating that the mode is an extension mode and extension type setting information (DataType[1:0]=2'b00) for identifying that the mode setting of the extension mode is an extension mode 0.

In step S32, the application processor 22 determines whether or not to transmit an extended short packet. For example, the controller 60 determines to transmit an extended short packet at the start of a frame or the end of a frame.

In a case where the application processor 22 determines, in step S32, to transmit an extended short packet, the process proceeds to step S33.

In step S33, the extended packet header generation section 53 transmits, in the first byte of the payload, an extended packet header for setting the data type (DataType[7:0]) to a short packet. At this time, the extended packet header generation section 53 makes various settings (e.g., OePH[7:0], OePF[3:0]) to be stored in the extended packet header.

In step S34, the extended packet header generation section 53 transmits a frame number (FN: FrameNumber) stored in the second byte of the payload.

In step S35, the extended packet header generation section 53 generates such an optional extended packet header as that depicted in FIG. 4, according to the setting (OePH[7:0]) made in step S33, and transmits the optional extended packet header.

In step S36, the CRC computation section 57 obtains CRC, and transmits the CRC as a packet footer.

On the other hand, in a case where the application processor 22 determines, in step S32, to refrain from transmitting an extended short packet for to transmit a long packet), the process proceeds to step S37.

In step S37, the extended packet header generation section 53 transmits, in the first byte of the payload, an extended packet header for setting the data type (DataType[7:0]) to a non-short packet. At this time, the extended packet header generation section 53 makes various settings (e.g., OePH[7:0], OePF[3:0], etc.) to be stored in the extended packet header.

In step S38, the extended packet header generation section 53 generates such an optional extended packet header as that depicted in FIG. 5, according to the setting (OePH[7:0]) made in step S37, and transmits the optional extended packet header.

In step S39, the packing section 51 packs the image data supplied from the image processing section 43, generates a legacy payload, and transmits the legacy payload.

In step S40, the extended packet footer generation section 54 generates such an optional extended packet footer as that depicted in FIG. 4, according to the setting (OePF[3:0]) made in step S37, and transmits the optional extended packet footer.

In step S41, the CRC computation section 57 obtains CRC, and transmits the CRC as a packet footer.

Then, after the process in step S36 or S41 is executed, the extension mode transmission process is finished.

In the manner explained so far, the image sensor 21 can generate and transmit an extended short packet or an extended long packet.

Figure 13:
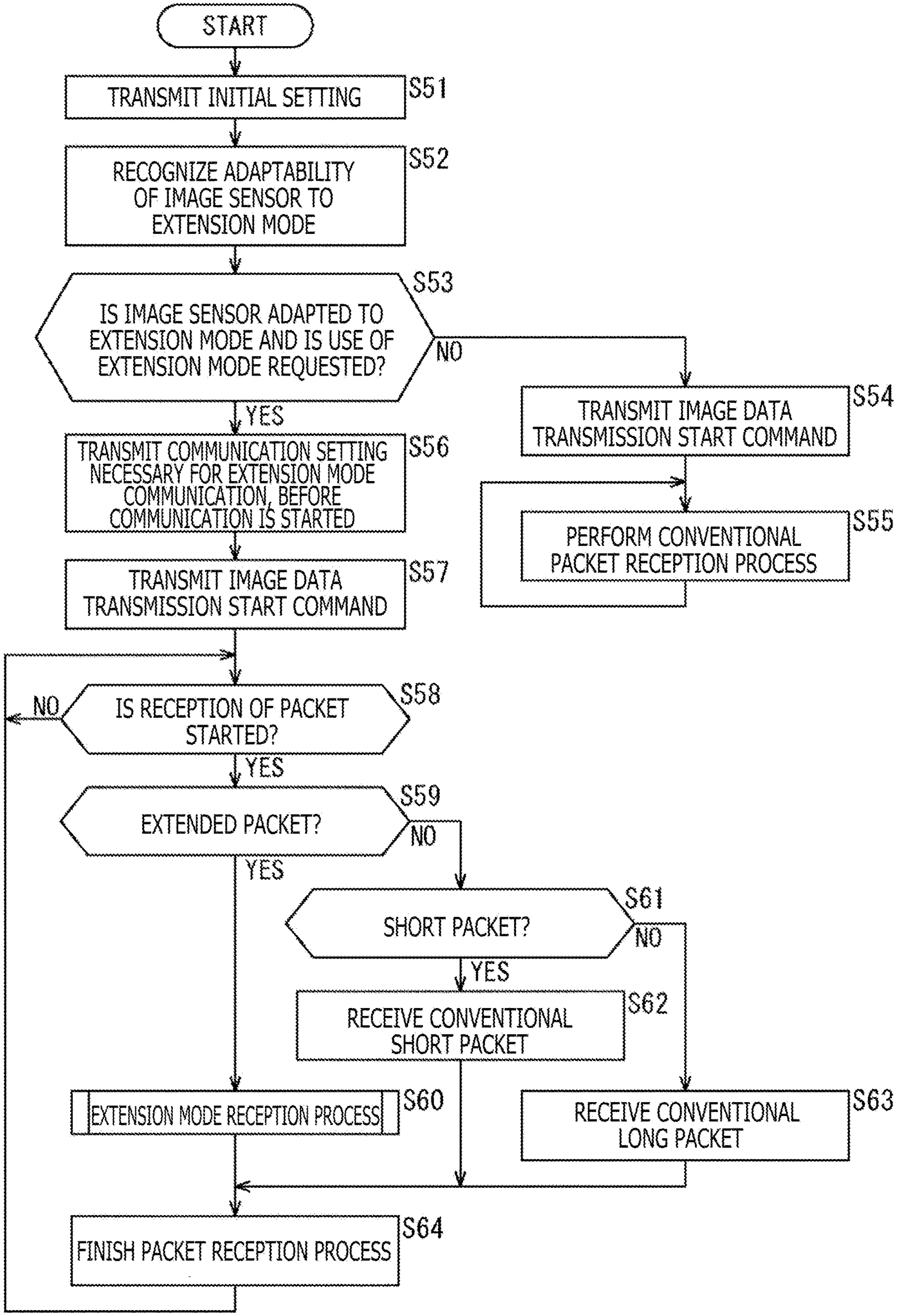
FIG. 13 is a flowchart for explaining a process in which the application processor receives a packet.

FIG. 13 is a flowchart for explaining a process in which the application processor 22 receives a packet.

For example, when the image sensor 21 is connected to the application processor 22 via the bus 23, the process is started. In step S51, the controller 74 writes an initial setting (for example, whether C-PHY is used or D-PHY is used as the physical layer) of the image sensor 21 into the register 73, and transmits the initial setting to the image sensor 21 via the CCI master 88 by means of the I2C/I3C master 72. Accordingly, the initial setting is written into the register 47 of the image sensor 21.

In step S52, the controller 74 recognizes whether or not the image sensor 21 is adapted to an extension mode. For example, the controller 74 recognizes whether or not the image sensor 21 is adapted to an extension mode, by acquiring a setting value (e.g., extended PH/PF dealing capability) stored in the register 47 of the image sensor 21 by means of the I2C/I3C master 72. Alternatively, the controller 74 can previously recognize whether or not the image sensor 21 is adapted to an extension mode, on the basis of a manual input, for example.

In step S53, the controller 74 determines whether or not the image sensor 21 is adapted to an extension mode and use of an extension mode is requested by an application being executed by the application processor 22.

In a case where the controller 74 determines, in step S53, that the image sensor 21 is not adapted to an extension mode or that use of an extension mode is not requested, the process proceeds to step S54.

In step S54, the controller 74 transmits an image data transmission start command to the image sensor 21 through the I2C/I3C master 72. At this time, the controller 74 causes the I2C/I3C master 72 to also transmit a communication setting conforming to the CSI-2 standard.

In step S55, in the application processor 22, a conventional packet reception process of receiving a packet having a packet structure conforming to the existing CSI-2 standard is performed on the basis of the communication setting transmitted in step S54.

On the other hand, in a case where the controller 74 determines, in step S53, that the image sensor 21 is adapted to an extension mode and use of an extension mode is requested by the application being executed by the application processor 22, the process proceeds to step S56.

In step S56, the I2C/I3C master 72 transmits a fixed communication setting that is necessary for extension mode communication, before the extension mode communication is started. Accordingly, the fixed communication setting is written into the register 47 of the image sensor 21 (step S14 in FIG. 11).

In step S57, the controller 74 transmits an image data transmission start command to the image sensor 21 by means of the I2C/I3C master 72. At this time, the controller 74 causes the I2C/I3C master 72 to also transmit a communication setting conforming to the CSI-2 standard.

In step S58, the packet header detection section 81 determines whether or not packet reception is started, by checking data supplied from the physical layer processing section 71. The packet header detection section 81 suspends the process until determining that packet reception is started. For example, in a case of detecting a packet header from the data supplied from the physical layer processing section 71, the packet header detection section 81 determines that packet reception is started.

In a case where the packet header detection section 81 determines, in step S5, that packet reception is started, the process proceeds to step S59.

In step S59, the packet header detection section 81 checks the data type in the packet header detected in step S58, and determines whether or not the packet reception of which has started is an extended packet corresponding to an extension mode. For example, in a case where extension mode setting information in the data type in the packet header indicates that the mode is an extension mode (DataType[5:3]=3'b111), the packet header detection section 81 determines that the packet reception of which has started is an extended packet.

In a case where the packet header detection section 81 determines, in step S59, that the packet reception of which has started is an extended packet, the process proceeds to step S60 in which an extension mode reception process (see FIG. 14) of receiving an extended packet is executed.

On the other hand, the packet header detection section 81 determines, in step S59, that the packet reception of which has started is not an extended packet, the process proceeds to step S61.

In step S61, the packet header detection section 81 determines whether or not the packet reception of which has started is a short packet, by checking the data type (DataType[5:0]) in the packet header detected in step S58.

In a case where the packet header detection section 81 determines, in step S61, that the packet reception of which has started is a short packet, the process proceeds to step S62. In step S62, the packet header detection section 81 receives the short packet that has the conventional packet structure and that is transmitted from the image sensor 21.

On the other hand, the packet header detection section 81 determines, in step S61, that the packet reception of which has started is not a short packet (that is, reception of a long packet has started), the process proceeds to step S63. In step S63, the unpacking section 87 receives a payload of the long packet that has the conventional packet structure and that is transmitted from the image sensor 21, and extracts image data from the payload. The CRC computation section 86 receives, as CPC, the WC+1-th byte transmitted following the packet header.

After the process in step S60, step S62, or step S63 is executed, the process proceeds to step S64 in which the controller 74 finishes the packet reception process. Thereafter, the process returns to step S58, and the similar packet reception processes are repeated for the next packet.

Figure 14:
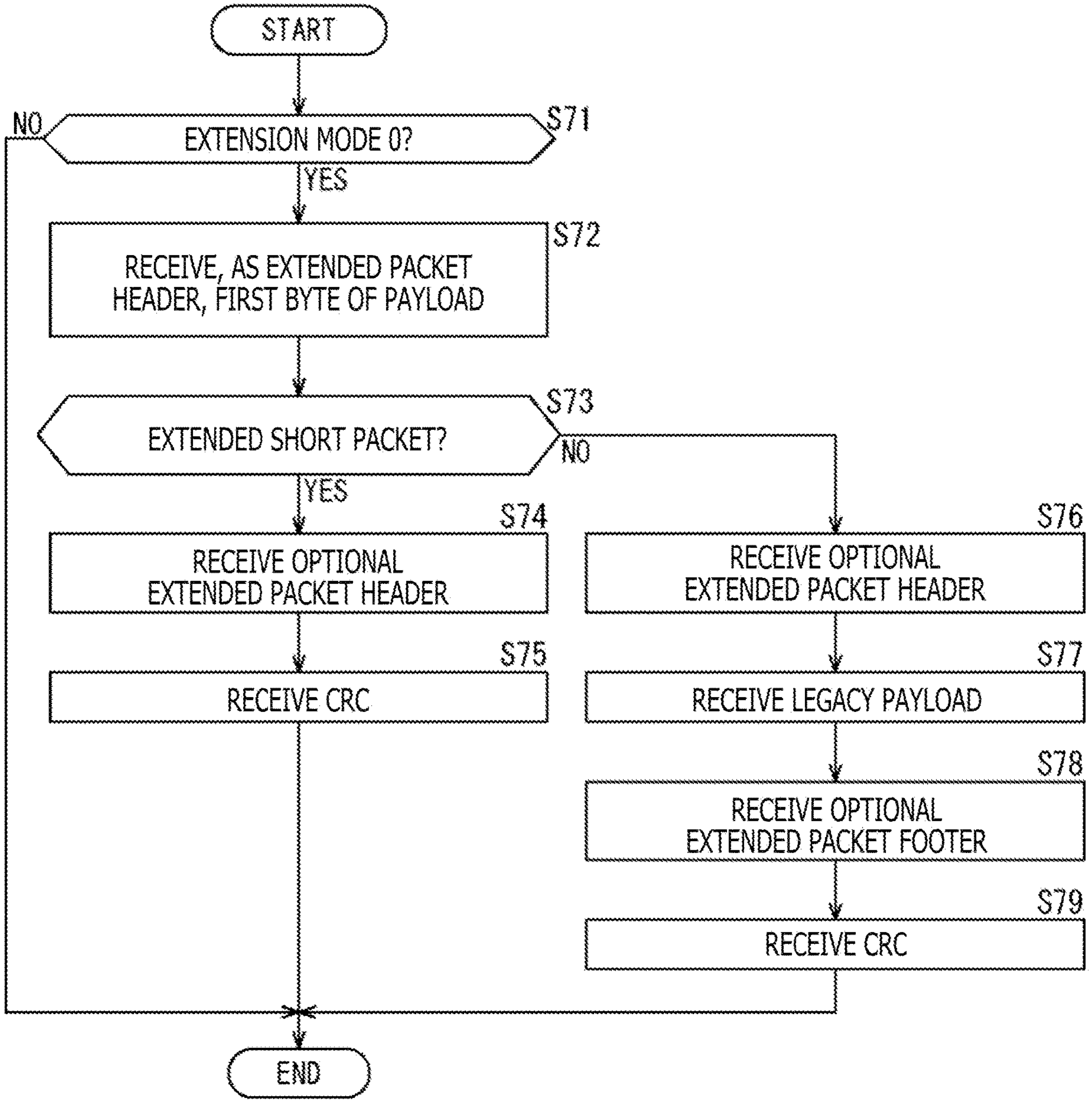
FIG. 14 is a flowchart for explaining an extension mode reception process.

FIG. 14 is a flowchart for explaining the extension mode reception process which is executed in step S60 in FIG. 13.

In step S71, the packet header detection section 81 determines whether or not the mode setting of the extension mode is an extension mode 0. For example, the packet header detection section 81 determines that the mode setting of the extension mode is the extension mode 0, in a case where the extension type setting information in the data type in the packet header indicates extension mode 0 (DataType [1:0]=2'b00).

In a case where the packet header detection section 81 determines, in step S71, that the mode setting of the extension mode is the extension mode 0, the process proceeds to step S72. In step S72, the interpretation section 83 receives, as an extended packet header, the first byte of the payload.

In step S73, the interpretation section 83 checks the data type (DataType[7:0]) in the extended packet header received in step S72, and determines whether or not the packet reception of which has started is an extended short packet.

In a case where the interpretation section 83 determines, in step S73, that the packet is an extended short packet, the process proceeds to step S74. In step S74, the interpretation section 83 receives an optional extended packet header according to the setting (OePH[7:0]) stored in the extended packet header received in step S72.

In step S75, the CPC computation section 86 receives, as CRC, the WC+1-th byte transmitted following the optional extended packet header.

On the other hand, in a case where the interpretation section 83 determines, in step S73, that the packet is not an extended short packet (that is, reception of an extended long packet has started), the process proceeds to step S76. In step S76, the interpretation section 83 receives an optional extended packet header according to the setting (OePH[7:0]) stored in the extended packet header received in step S72.

In step S77, the unpacking section 87 receives a legacy payload in the extended long packet transmitted from the image sensor 21, and extracts image data from the legacy payload.

In step S78, the interpretation section 83 receives an optional extended packet footer according to the setting (OePF[3:0]) stored in the extended packet header received in step S72.

In step S79, the CRC computation section 86 receives, as CRC, the WC+1-th byte transmitted following the optional extended packet footer.

Then, in a case where it is determined, in step S71, that the mode setting of the extension mode is not the extension mode 0, the process in step S75 or step S79 is executed. Thereafter, the extension mode reception process is finished.

In the manner explained so far, the application processor 22 acquires data by receiving an extended short packet or an extended long packet.

<Second Structure Example of Packet Structure>

A second structure example of a packet structure of a packet that is used in communication between the extension mode-capable CSI-2 transmission circuit 31 and the extension mode-capable CSI-2 reception circuit 32 will be explained with reference to FIGS. 15 to 18.

In the first structure example depicted in FIGS. 3 to 8, a packet structure having a packet header and a packet footer identical to those in the existing CSI-2 standard is adopted, and the packet structure is extended with an extended packet header, an optional extended packet header, and an optional extended packet footer because importance is placed on maintaining compatibility with the existing CSI-2 standard. In contrast, in the second structure example which will be explained hereinbelow, a packet header and a packet footer different from those in the existing CSI-2 standard are adopted, and the packet structure is extended with an extended packet header and an extended packet footer.

Figure 15:
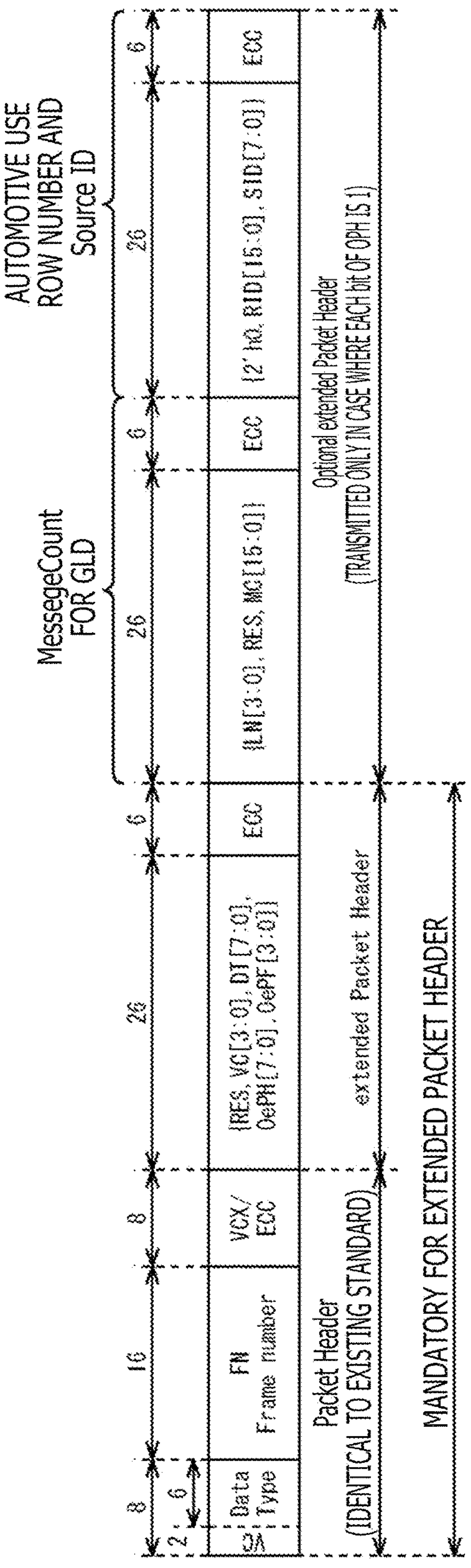
FIG. 15 is a diagram depicting a second structure example of the entire packet structure of an extended D-PHY packet.

FIG. 15 depicts a packet structure of a short packet (hereinafter, an extended D-PHY short packet) that is used in a CSI-2 extension mode in a case where the physical layer is D-PHY.

Analogous to an extended D-PHY short packet in the first structure example depicted in FIG. 4, the extended D-PHY short packet depicted in FIG. 15 identifies an extension mode through the data type stored in a packet header that is identical to that based on the existing CSI-2 standard.

On the other hand, in the extended D-PHY short packet in FIG. 15, a frame number is stored in a short packet data field of 16 bits subsequent to the data type in the packet header, in a manner similar to that in a short packet conforming to the existing CSI-2 standard. Then, subsequent to the packet header, an extended packet header having a configuration similar to that of the extended packet header depicted in FIG. 4 is transmitted.

Therefore, the application processor 22 which is the reception side interprets the data type stored in the extended packet header, and determines that a frame number is stored in the data field of the packet header in a case where the data type indicates an extended short packet.

It is to be noted that an optional extended packet header of the extended D-PHY short packet depicted in FIG. 15 has a configuration similar to that of the optional extended packet header of the extended D-PHY short packet having the first structure example depicted in FIG. 4. However, since the optional extended packet header has a packet structure in which the optional extended packet header is not embedded in the payload, it is not necessary to add CRC to the end.

Figure 16:
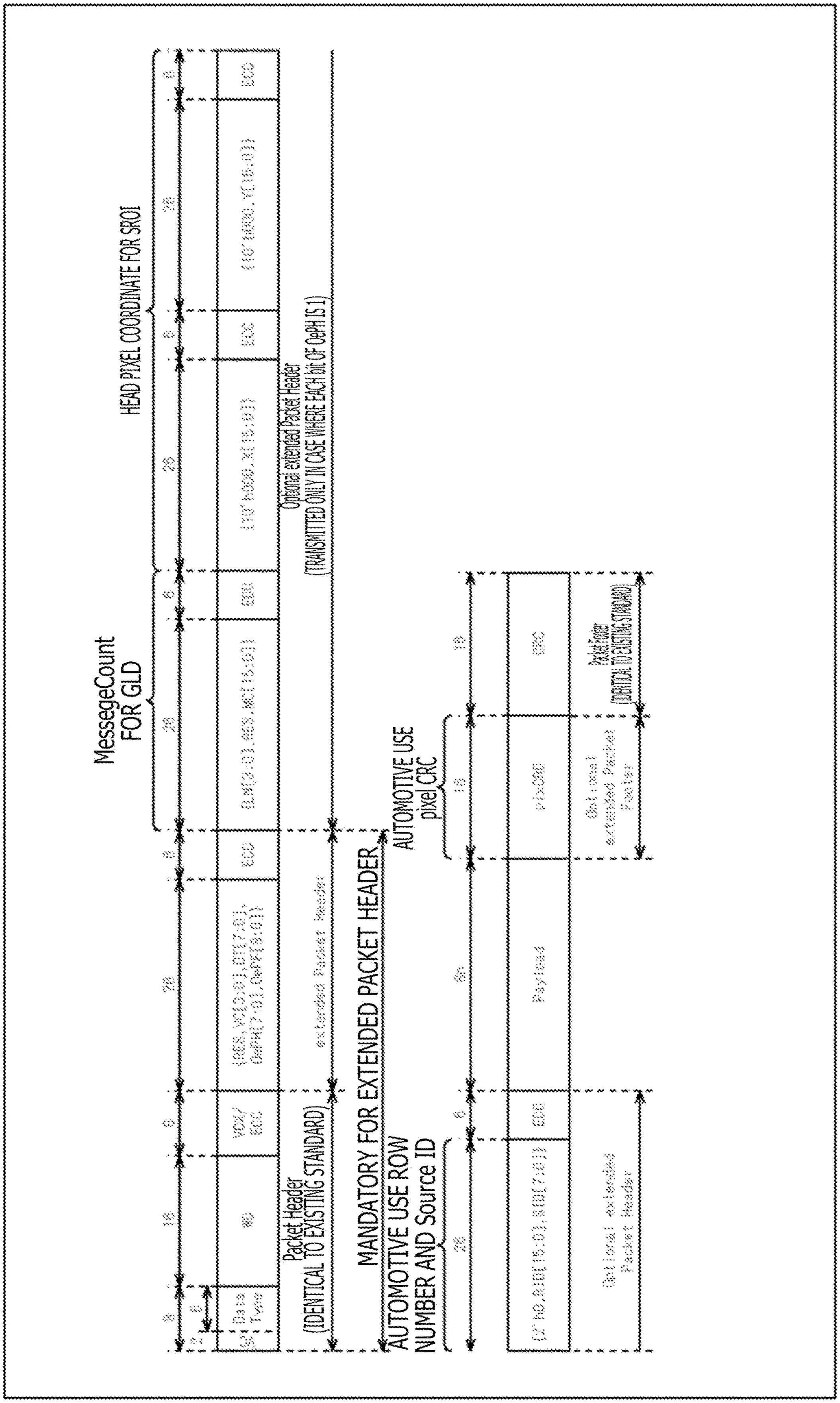
FIG. 16 is a diagram depicting a second structure example of a packet structure of an extended D-PHY long packet.

FIG. 16 depicts a packet structure of a long packet (hereinafter, an extended D-PHY long packet) that is used in a CSI-2 extension mode in a case where the physical layer is D-PHY.

In the extended D-PHY long packet depicted in FIG. 16, extended data is not embedded in the payload but is transmitted as a portion of the packet header or the packet footer. Therefore, analogous to that in the existing standard, WC in the packet header located at the head indicates the byte length of the payload.

Figure 17:
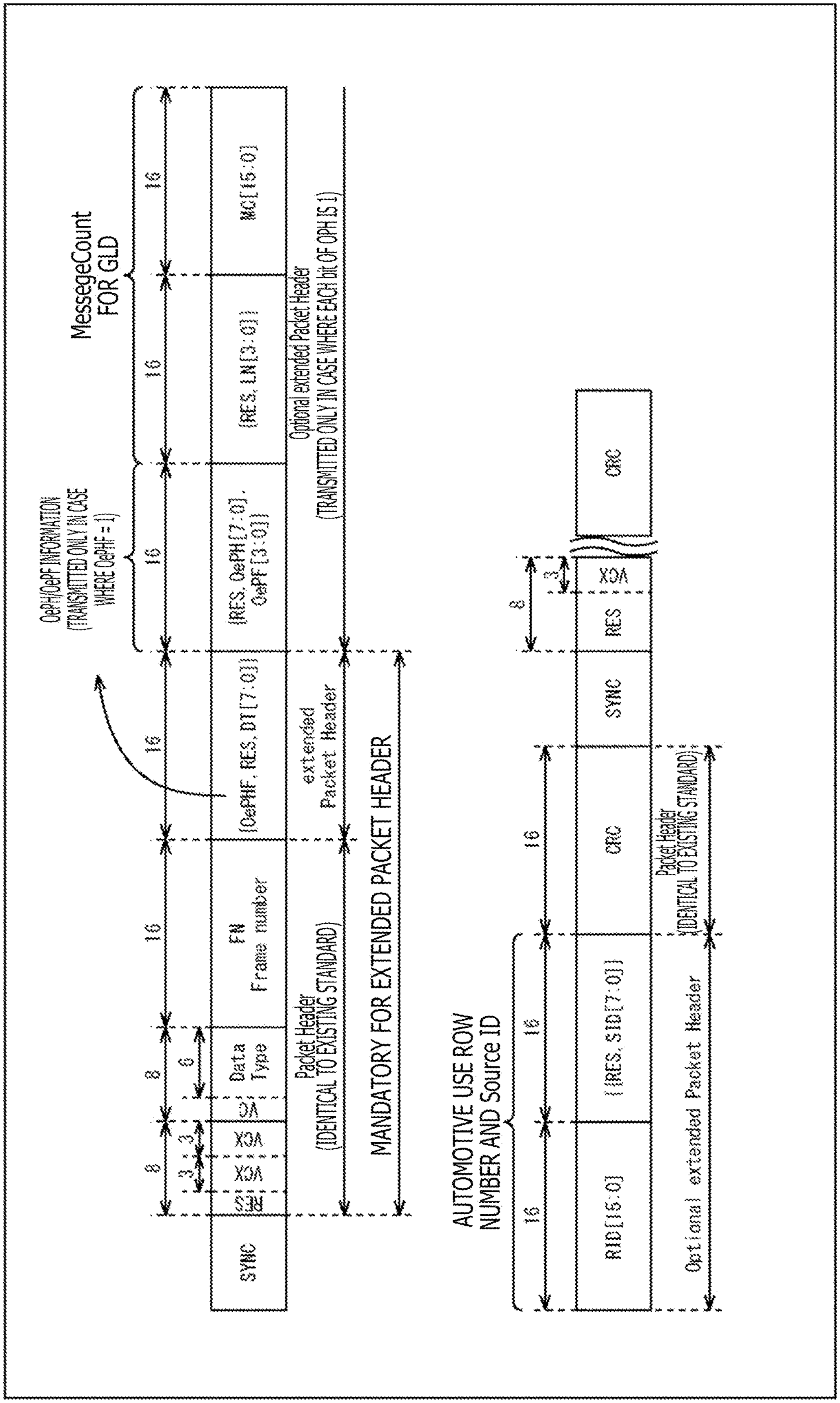
FIG. 17 is a diagram depicting a second structure example of a packet structure of an extended C-PHY short packet.

FIG. 17 depicts a packet structure of a short packet (hereinafter, an extended C-PHY short packet) that is used in a CSI-2 extension mode in a case where the physical layer is C-PHY.

Since an extended portion in the extended C-PHY short packet depicted in FIG. 17 is transmitted as an extension of a packet header that conforms to the existing CSI-2 standard, an extended portion which is an extended packet header or the like is inserted subsequent to the frame number. Then, the packet header ends with CRC as in the existing CSI-2 standard. Further, a packet structure in which two extended portions are transmitted with SYNC disposed therebetween is similar to that of a short packet conforming to the existing CSI-2 standard.

Figure 18:
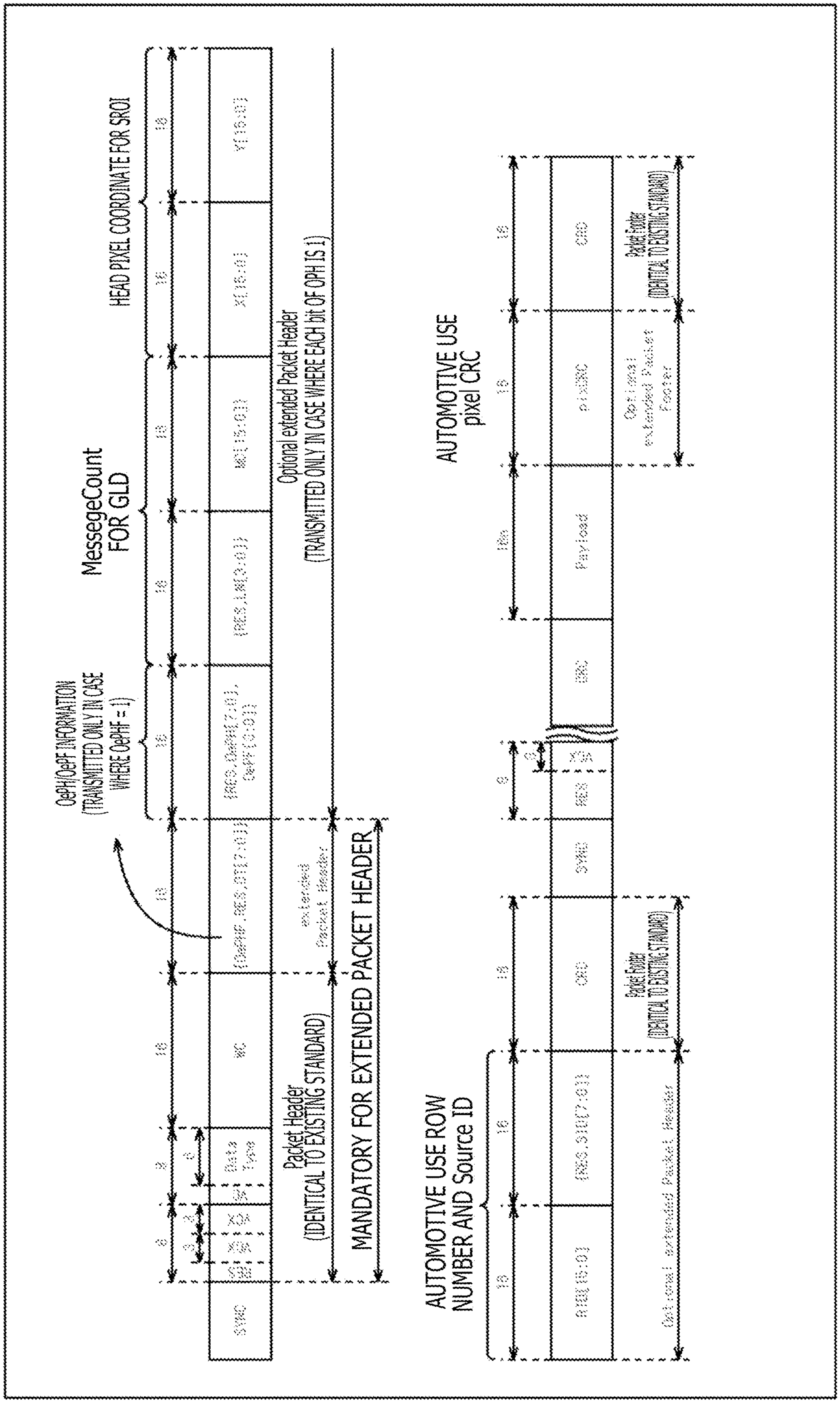
FIG. 18 is a diagram depicting a second structure example of an extended C-PHY long packet structure.

FIG. 18 depicts a packet structure of a long packet (hereinafter, an extended C-PHY long packet) that is used in a CSI-2 extension mode in a case where the physical layer is C-PHY.

The extended C-PHY long packet depicted in FIG. 18 is different from the extended C-PHY long packet according to the first structure example depicted in FIG. 8 in that the byte length of the payload is indicated by WC in the packet header located at the head in FIG. 18, as in an extended C-PHY long packet conforming to the existing standard.

Analogous to the packet structures of an extended packet of the first structure example (FIGS. 3 to 8), the packet structures of an extended packet of the second structure example depicted in FIGS. 15 to 18 are also adaptable to a wider variety of applications than those of the conventional packet structure.

However, the extended packet according to the second structure example has a packet structure in which extended data is not embedded in the existing payload but the existing packet header and footer are extended. Thus, in a case where the packet structure of the extended packet of the second structure example is adopted, an influence that requires a modification from a conventionally used communication system cannot be minimized, compared to a case where the packet structure of the extended packet of the first structure example is adopted. That is, the existing SerDes transmission circuit 34 requires a modification with respect to the SerDes reception circuit 35 (FIG. 2), for example.

As described above, when the extended packet of the first structure example is adopted, adaptation to a variety of applications including automotive use can be offered, and an automotive system can be formed while an influence that requires a modification from a conventional communication system is minimized.

Also, when the extended packet of the second structure example is adopted, adaptation to a variety of applications including automotive use can be achieved while a modification from a conventionally used communication system is required.

<Modification of Image Sensor and Application Processor>

A modification of the image sensor and the application processor will be explained with reference to FIG. 19.

The blocks constituting the image sensor 21 in FIG. 9 and the application processor 22 in FIG. 10 are configured to be able to execute processes on both D-PHY and C-PHY packets. In contrast, a block that executes a process exclusively on D-PHY packets and a block that executes a process exclusively on C-PHY packets may be simultaneously provided, and process switching may be performed therebetween.

Figure 19:
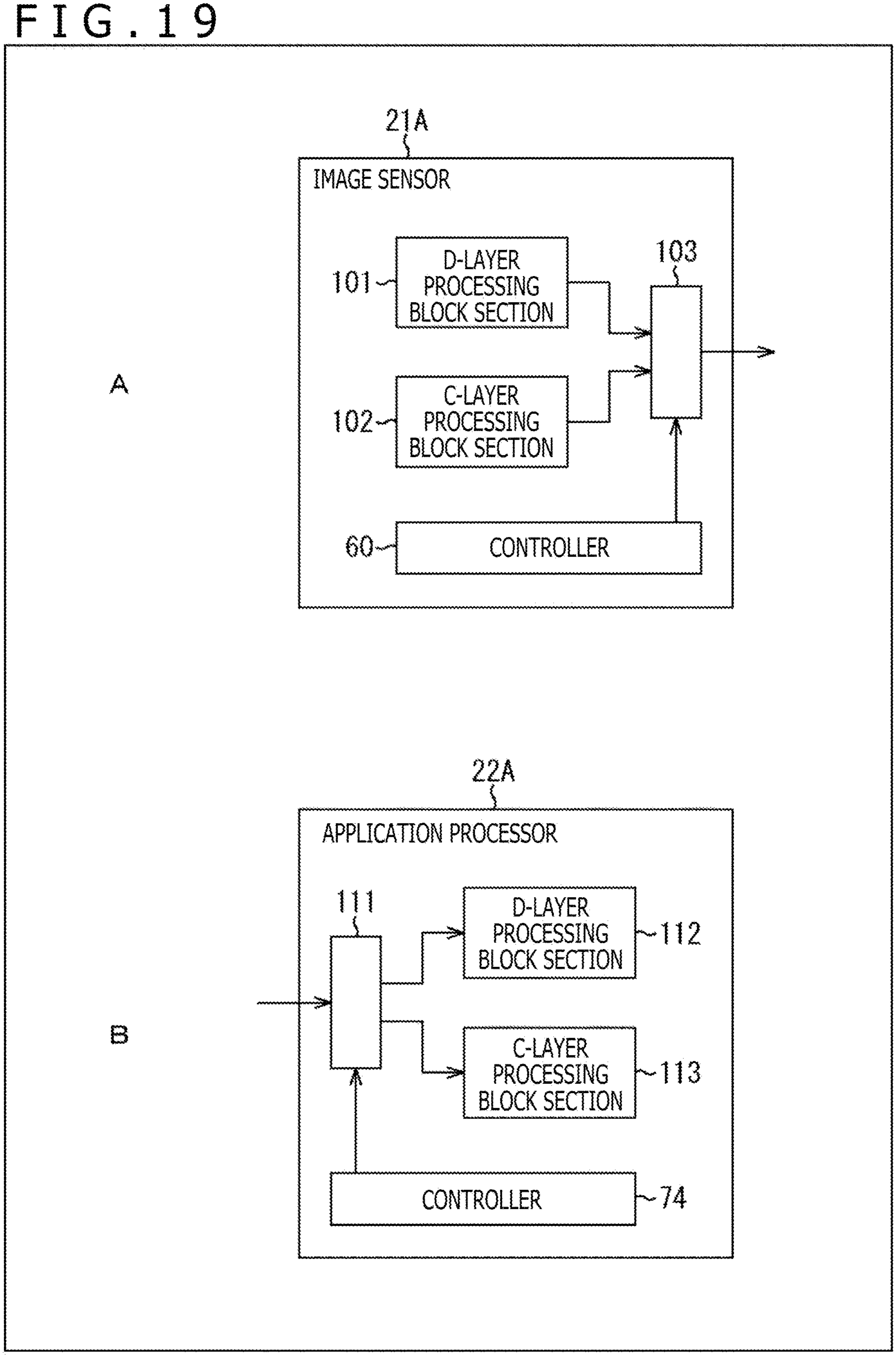
FIG. 19 is a block diagram depicting a modification oft a configuration of performing switching between D-PHY and C-PHY.

An image sensor 21A in A of FIG. 19 includes a D-layer processing block section 101, a C-layer processing block section 102, a switch section 103, and the controller 60.

The D-layer processing block section 101 includes blocks for exclusively processing D-PHY packets among the blocks constituting the image sensor 21 in FIG. 9. The C-layer processing block section 102 includes blocks for exclusively processing C-PHY packets among the blocks constituting the image sensor 21 in FIG. 9. Under control of the controller 60, the switch section 103 performs switching to output, in a case where D-PHY is used for the physical layer, a D-PHY packet generated by the D-layer processing block section 101, and to output, in a case where C-PHY is used for the physical layer, a C-PHY packet generated by the C-layer processing block section 102.

An application processor 22A in B of FIG. 19 includes a switch section 111, a L-layer processing block section 112, a C-layer processing block section 113, and the controller 74.

Under control of the controller 74, the switch section 111 performs switching to supply a packet transmitted from the image sensor 21A to one of the D-layer processing block section 112 and the C-layer processing block section 113. The D-layer processing block section 112 includes blocks that process exclusively D-PHY packets among the blocks constituting the application processor 22 in FIG. 10. The C-layer processing block section 113 includes blocks that process exclusively C-PHY packets among the blocks constituting the application processor 22 in FIG. 10.

In the image sensor 21A and the application processor 22A having the above-mentioned configurations, a physical layer to be used can be defined by the controller 60 and the controller 74 prior to the start of communication. Further, for example, in a case where D-PHY is used for the physical layer, a D-PHY packet generated by the D-layer processing block section 101 is transmitted via the switch section 103, is supplied to the D-layer processing block section 112 via the switch section 111, and then, is processed. Alternatively, in a case where C-PHY is used for the physical layer, for example, a C-PHY packet generated by the C-layer processing block section 102 is transmitted via the switch section 103, is supplied to the C-layer processing block section 113 via the switch section 111, and is processed.

<Application Examples of Extended Packet>

Applications of the above-mentioned extended packet to the following use cases, for example, are under study.

For example, an application of the extended packet to a use case of transmitting an image having higher definition (RAW24) is taken into consideration.

RAW6, RAW7, RAW8, RAW10, RAW12, RAW14, RAW16, and RAW20 are defined as data types which may be stored in a packet header in accordance with the existing CSI-2 standard when image data is transmitted in a RAW form, for example. In contrast, in recent years, transmission of images having higher definition has been desired for automated driving using an in-vehicle camera. When an extended packet is adopted and the number of bits of a data type is extended, RAW24 which has higher definition can be defined in a data type in the extended packet header, for example.

In addition, an application of an extended packet to SmartROI, which is a technology of transmitting only an image region of interest in a screen, has been taken into consideration.

For example, a number of cameras are currently set in stadiums, airports, etc. In a case where images taken by these cameras are fully transmitted from the cameras to a cloud server via a network such as the internet, band shortage on the internet or an increase of a calculation amount or a data amount on the cloud side, for example, is assumed to occur. Therefore, it has been desired to take out image regions of interest at an edge (camera-side) and transmit the taken image regions of interest to suppress band shortage on the internet or an increase of a calculation amount or a data amount on the cloud side.

In such SROI transmission, the coordinates of the upper left of a rectangular (ROI) need to be simultaneously transmitted in order to inform the reception side of a position, in an entire screen, corresponding to the image region of interest. In addition, data regarding a captured full screen needs to be transmitted at a predetermined timing according to a command given by the reception side. As a result, an SROI image and data regarding the entire image (existing packet header) coexist in a frame unit, for example.

To this end, when an extended packet is adopted, coordinate data including an at least 16-bits X coordinate and an at least 16-bits Y coordinate, for example, can be transmitted.

Further, a use case in which an extended packet is applied to GLD in which, even in a case where channel deterioration has occurred, communication is continued by reducing bands or lanes is studied. It is to be noted that GLD is a solution under consideration in CSI-2 ver3.0.

For example, in automated driving, when a cable connected to a camera is partially broken due to a collision, it is desired to use a cable that is not broken, to continue communication, and evacuate a vehicle to a safe zone and then stop the vehicle automatically. Thus, an in-vehicle camera interface needs to have at least a broken cable detection function to obtain a row number (16 bits) indicating which row number in a screen the information is about, a Source ID (8 bits) indicating which camera the information has been transmitted from, and a message counter (16 bits) indicating a transmission number. Moreover, in a case where the above-mentioned SROI is combined, the row number, the Source ID, and the message counter may be transmitted by unit of frame.

Such information can be transmitted if an extended packet is adopted.

<First Configuration Example that is Adaptable to E2E Protection>

A configuration example adapted to the regulation of prohibiting a change in a packet on a transmission path, for example, will be explained with reference to FIGS. 20 to 26.

For example, in the communication system 11A having the configuration previously explained with reference to FIG. 2, in a case where the image sensor 21 and the application processor 22 use different interfaces, transformation of a packet is necessary on a transmission path. That is, in a case where the physical layer is D-PHY in the image sensor 21 while the physical layer is C-PHY in the application processor 22, transformation from a D-PHY packet to a C-PHY packet is required in the SerDes device 26, for example.

Such a configuration in which a packet is transformed at the SerDes device 26, violates, for example, a regulation defined by ISO26262 (Functional Safety). The regulation (hereinafter, referred to as E2E (End-to-End) protection) prohibits a change in a packet on a transmission path, for example.

Figure 20:
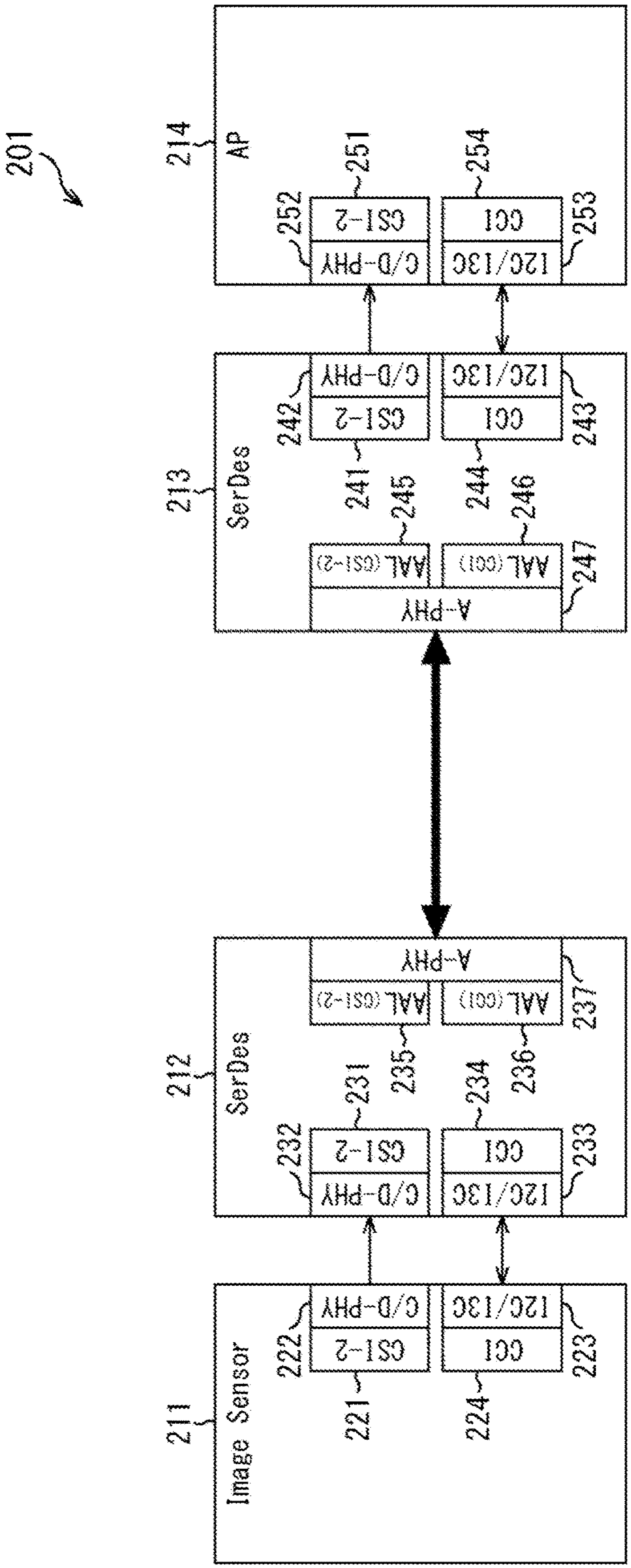
FIG. 20 is a block diagram depicting a configuration example of a third embodiment of the communication system to which the present technology is applied.

FIG. 20 is a block diagram depicting a configuration example of a communication system 201 that is adapted to E2E protection, as a third embodiment of the communication system to which the present technology is applied.

The communication system 201 includes an image sensor 211, a SerDes device 212, a SerDes device 213, and an application processor 214 connected to each other, as depicted in FIG. 20. It is to be noted that FIG. 20 depicts a case where SERDES is A-PHY. The connection may be established with use of any other SERDES standard such as FPD-LINK3. In addition, in the SERDES standard, communication may be performed on the basis of the SERDES standard while a CIS-2 format (at least Application Specific payload) is maintained. Moreover, in SERDES, physical layer processing sections 237 and 247 may include multiple physical layer processing sections for any other SERDES standards other than A-PHY. The physical layer processing sections may be switched to other physical layer processing sections according to an application.

The image sensor 211 includes at least an extension mode-capable CSI-2 transmission circuit 221, a physical layer processing section (hereinafter, referred to as a C/D-PHY physical layer processing section) 222 that is for either C-PHY or D-PHY or both C-PHY and D-PHY, a slave (hereinafter, referred to as an I2C/I3C slave) 223 that is adapted to either I2C or I3C or both I2C and I3C, and a CCI slave 224.

The SerDes device 212 includes at least a CSI-2 reception circuit 231, a C/D-PHY physical layer processing section 232, an I2C/I3C master 233, a CCI master 234, a CSI-2 A-PHY packet generation section 235, a CCI A-PHY packet transmission/reception section 236, and a physical layer processing section 237 that is for A-PHY. For example, in the SerDes device 212, a C-PHY or D-PHY packet is transformed to an A-PHY packet. This transformation is determined on the basis of register setting or the like.

The SerDes device 213 includes at least a CSI-2 transmission circuit 241, a C/D-PHY physical layer processing section 242, an I2C/I3C slave 243, a CCI slave 244, a CSI-2 A-PHY packet reception section 245, a CCI A-PHY packet transmission/reception section 246, and a physical layer processing section 247 that is for A-PHY. For example, in the SerDes device 213, an A-PHY packet is transformed to a C-PHY or D-PHY packet. This transformation is determined on the basis of register setting or the like.

The application processor 214 includes at least an extension mode-capable CSI-2 reception circuit 251, a C/D-PHY physical layer processing section 252, an I2C/I3C master 253, and a CCI master 254.

The communication system 201 has the above-mentioned configuration. An extended packet having the above-mentioned structure is transmitted from the image sensor 211, and is received by the application processor 214. Here, even in a case where the communication system 201 is configured such that the physical layer processing section 222 of the image sensor 211 is for D-PHY while the physical layer processing section 252 of the application processor 22 is for C-PHY, it is necessary to avoid violating E2E protection.

To this end, in order to make the communication system 201 adaptable to E2E protection, an E2E protection range is restricted to an Application Specific payload (hereinafter, referred to as an AS payload) which is a payload specific to an application. That is, a modification to an AS payload is prohibited from being made during transformation of an A-PHY packet to a C-PHY or D-PHY packet or transformation of a C-PHY or D-PHY packet to an A-PHY packet.

Figure 21:
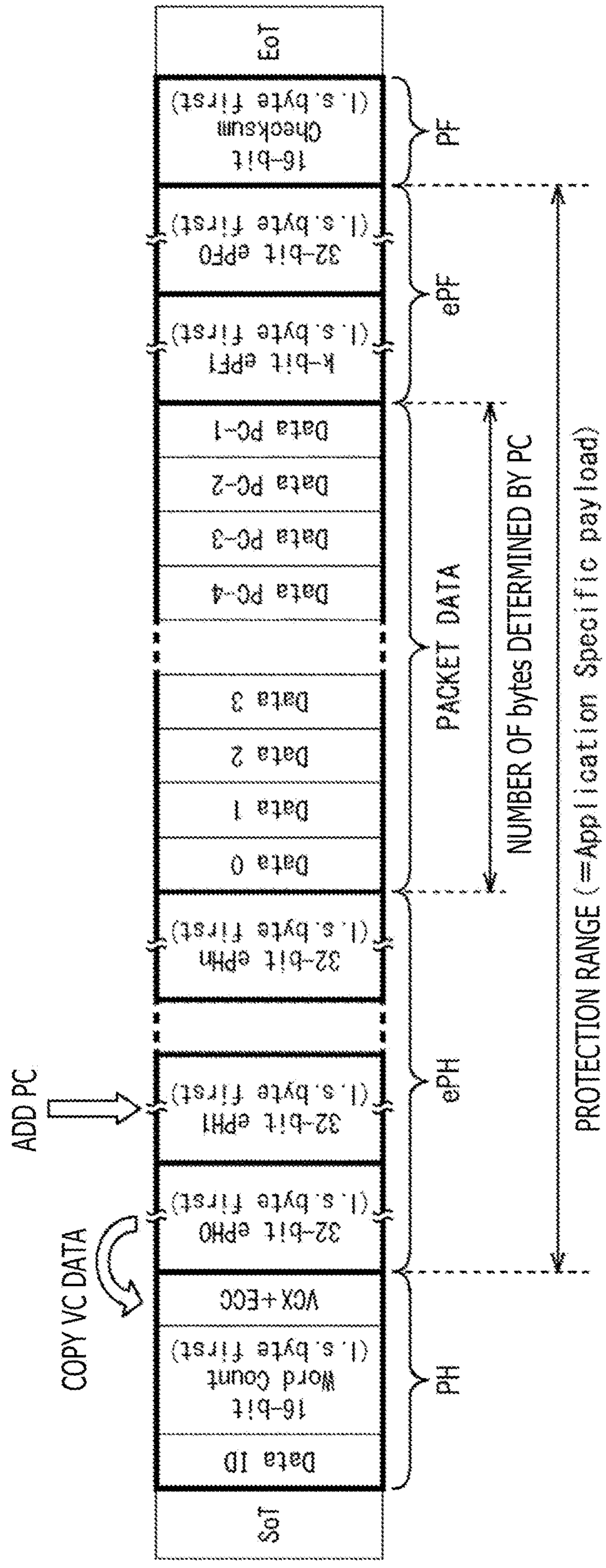
FIG. 21 is a diagram depicting a structure example of an extended D-PHY packet meeting a regulation of prohibiting a change in a packet.

FIG. 21 depicts a structure example of an extended D-PHY packet that is extended to be adapted to E2E protection.

In the extended D-PHY packet, an AS payload including an extended packet header (ePH), packet data, and an extended packet footer (ePF) is defined as an E2E protection range, as depicted in FIG. 21.

Further, predetermined information that is required in a case where the E2E protection range is restricted to the AS payload is described in the extended packet header. For example, a packet count PC (Packet Count) which indicates the data length of data stored in the AS payload in order to specify the data length of the packet data is added as the predetermined information described in the extended packet header. That is, the packet data indicates the number of bytes specified by the packet count PC. In addition, as the predetermined information to be described in the extended packet header, a virtual channel VC (Virtual Channel) which indicates the number of virtual channels is copied to the existing packet header.

Figure 22:
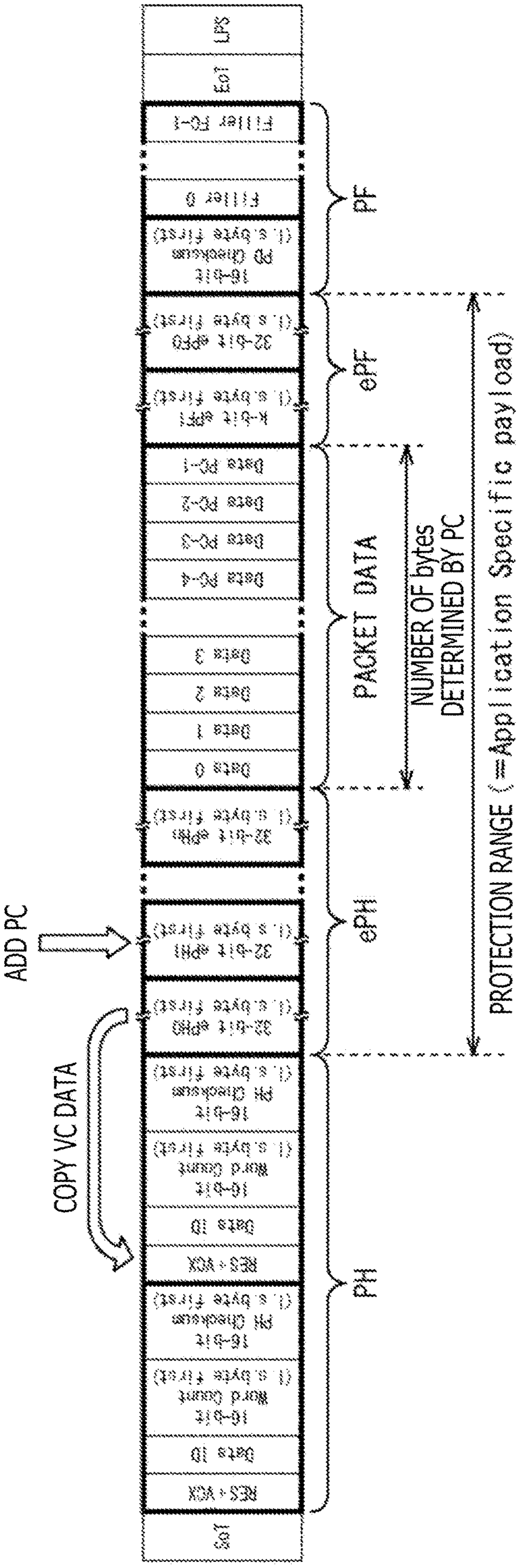
FIG. 22 is a diagram depicting a structure example of an extended C-PHY packet meeting a regulation of prohibiting a change in a packet.

FIG. 22 depicts a structure example of an extended C-PHY packet that is extended to be adapted to E2E protection.

As in the extended D-PHY packet, an AS payload including an extended packet header (ePH), packet data, and an extended packet footer (ePF) is specified as an E2E protection range in the extended C-PHY packet, as depicted in FIG. 22. Also, a packet count PC and a virtual channel VC which are predetermined information necessary for a case where the E2E protection range is restricted to the AS payload are described in an extended packet header.

Figure 23:
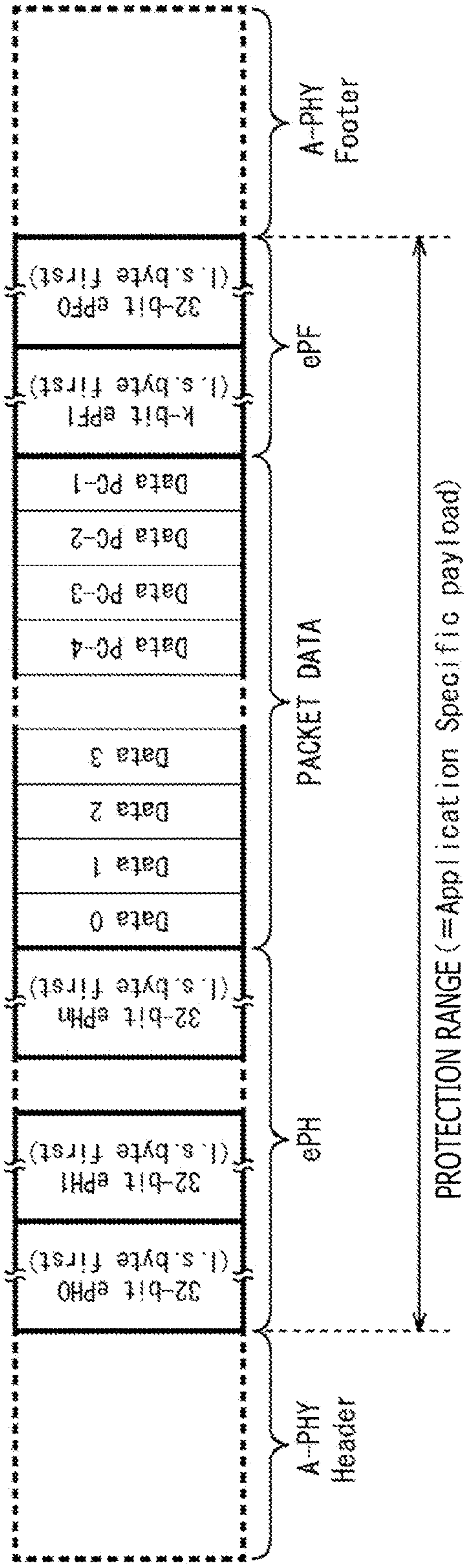
FIG. 23 is a diagram depicting a structure example of an extended A-PHY packet meeting a regulation of prohibiting a change in a packet.

FIG. 23 depicts a structure example of an extended A-PHY packet that is extended to be adapted to E2E protection.

Also in the A-PHY extended packet, an AS payload including an extended packet header (ePH), packet data, and an extended packet footer (ePF) is specified as an E2E protection range, as depicted in FIG. 23.

Here, in the communication system 201, an extended A-PHY packet is generated from an extended D-PHY packet or an extended C-PHY packet transmitted from the image sensor 211 to the SerDes device 212, as previously explained with reference to FIG. 20. Therefore, a packet count PC and a virtual channel CV are already described in the extended packet header of the extended A-PHY packet.

When the above-described packet structure is adopted, the communication system 201 can avoid a change in the AS payload on a transmission path, and can comply with E2E protection. It is to be noted that the packet structures depicted in FIGS. 21 to 23 can be partially replaced with the corresponding packets having such packet structures as the those depicted in FIGS. 3 to 8 and FIGS. 15 to 18, and generation of a packet can be partially replaced.

Figure 24:
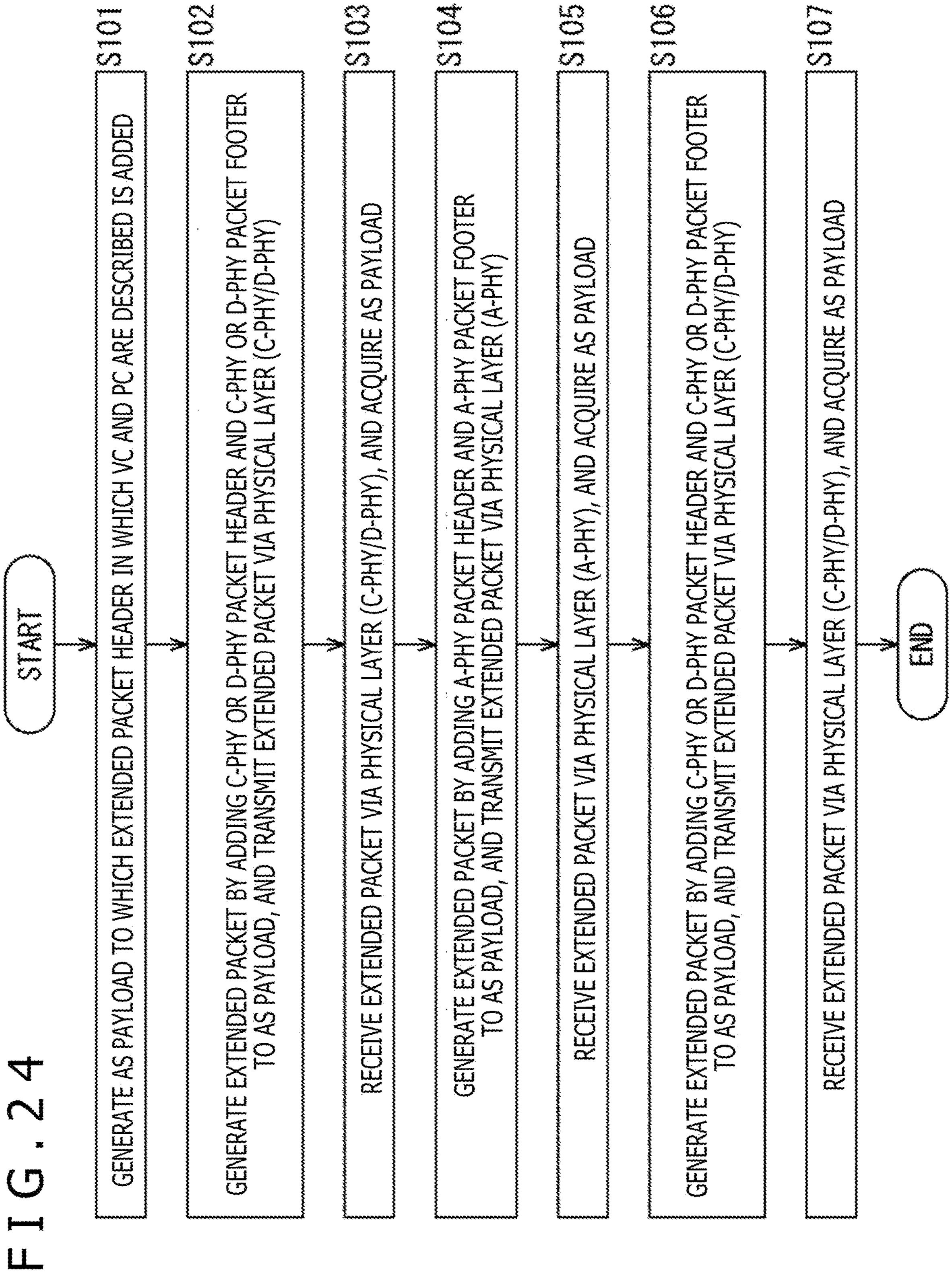
FIG. 24 is a flowchart for explaining a packet transmission/reception process adapted to a regulation of prohibiting a change in a packet.

FIG. 24 is a flowchart for explaining a packet transmission/reception process adapted to E2E protection.

For example, the process is started when data (e.g., image data) to be stored in packet data is supplied to the extension mode-capable CSI-2 transmission circuit 221. Then, in step S101, in the image sensor 211, the extension mode-capable CSI-2 transmission circuit 221 stores the supplied data into packet data. Further, the extension mode-capable CSI-2 transmission circuit 221 generates an extended packet header in which a virtual channel VC and a packet count PC are described as depicted in FIG. 21 or 22. Then, the extension mode-capable CSI-2 transmission circuit 221 generates an AS payload by adding an extended packet header and an extended packet footer to the packet data.

In step S102, the extension mode-capable CSI-2 transmission circuit 221 generates an extended C-PHY packet or an extended D-PHY packet by adding a C-PHY or D-PHY packet header and a C-PHY or D-PHY packet footer to the AS payload generated in step S101. Then, the extension mode-capable CSI-2 transmission circuit 221 transmits the extended C-PHY packet or the extended D-PHY packet to the SerDes device 212 via the C/D-PHY physical layer processing section 222.

In step S103, in the SerDes device 212, the CSI-2 reception circuit 231 receives the extended C-PHY packet or the extended D-PHY packet transmitted in step S102 from the image sensor 211 via the C/D-PHY physical layer processing section 232. Then, the CSI-2 reception circuit 231 acquires the AS payload by excluding the packet header and the packet footer from the received extended packet, and supplies the AS payload directly to the CSI-2 A-PHY packet generation section 235.

In step S104, in the SerDes device 212, the CSI-2 A-PHY packet generation section 235 generates an extended A-PHY packet by adding an A-PHY packet header and an A-PHY packet footer to the AS payload supplied from the CSI-2 reception circuit 231. Then, the CSI-2 A-PHY packet generation section 235 transmits the extended A-PHY packet to the SerDes device 213 via the physical layer processing section 237 which is for A-PHY.

In step S105, in the SerDes device 213, the CSI-2 A-PHY packet reception section 245 receives the extended A-PHY packet transmitted in step S104 from the SerDes device 212 via the physical layer processing section 247 which is for A-PHY. Then, the CSI-2 A-PHY packet reception section 245 acquires an AS payload by excluding the packet header and the packet footer from the received extended packet, and supplies the AS payload directly to the CSI-2 transmission circuit 241.

In step S106, the CSI-2 transmission circuit 241 generates an extended C-PHY packet or an extended D-PHY packet by adding a C-PHY or D-PHY packet header and a C-PHY or D-PHY packet footer to the AS payload supplied in step S105 from the CSI-2 A-PHY packet reception section 245. Then, the CSI-2 transmission circuit 241 transmits the extended C-PHY packet or the extended D-PHY packet to the application processor 214 via the C/D-PHY physical layer processing section 242.

In step S107, in the application processor 214, the extension mode-capable CSI-2 reception circuit 251 receives the extended C-PHY packet or the extended D-PHY packet transmitted in step S106 from the SerDes device 213 via the C/D-PHY physical layer processing section 252. Then, the extension mode-capable CSI-2 reception circuit 251 acquires the AS payload by excluding the packet header and the packet footer from the received extended packet, and outputs various types of data stored in the packet data of the AS payload to LSI (not depicted) in the later stage. Thereafter, the packet transmission/reception process adapted to E2E protection is finished, and the similar processes are repeated for the next extended packet.

As described above, in the communication system 201, when a packet transmission/reception process adapted to E2E protection is executed, an extended packet can be transmitted/received without a change in an AS payload on a transmission path. At this time, even in a case where, for example, the physical layer is D-PHY in the image sensor 211 while the physical layer is C-PHY in the application processor 214, that is, in a case where the image sensor 211 and the application processor 214 use different interfaces, the communication system 201 can comply with E2E protection.

Figure 25:
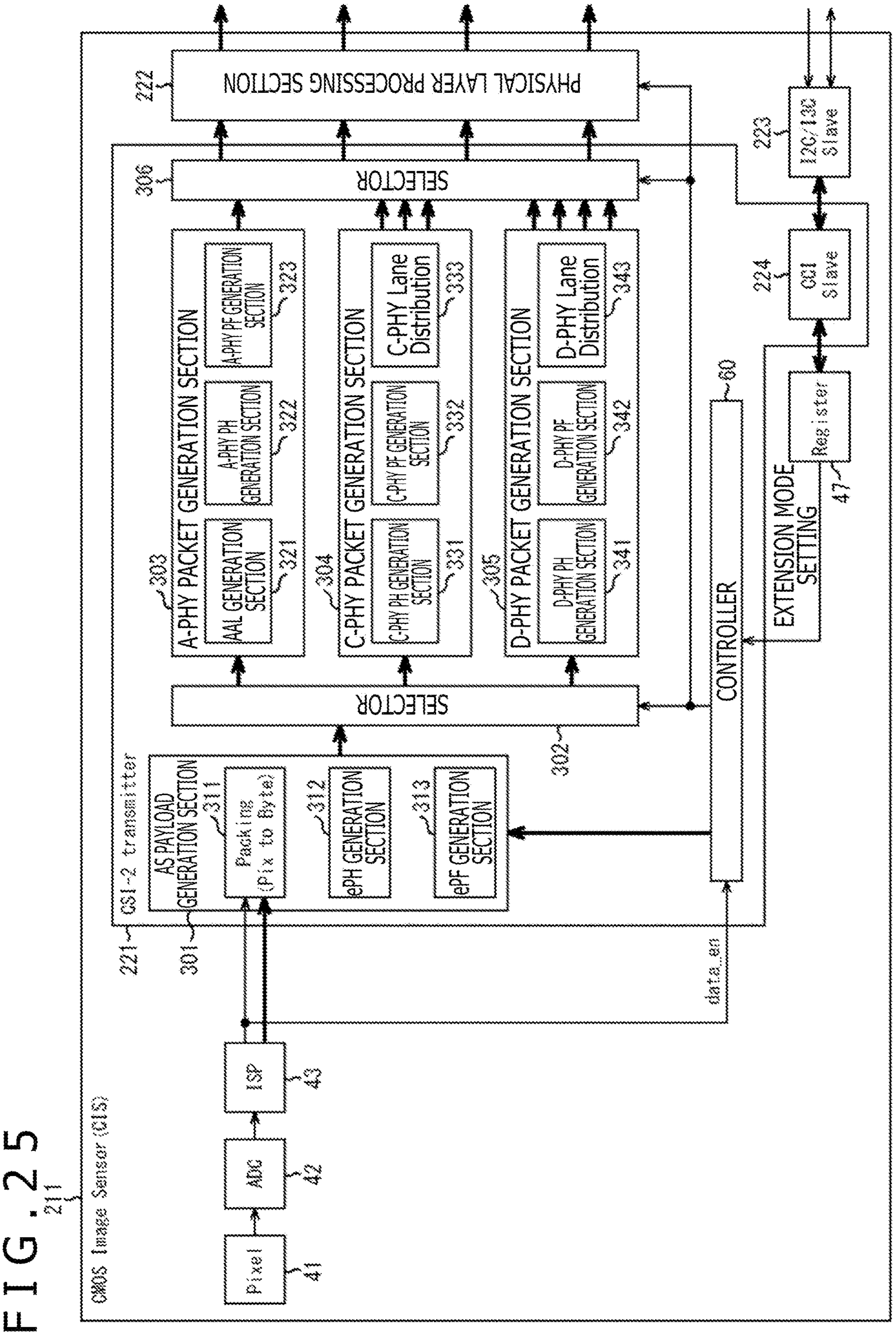
FIG. 25 is a block diagram depicting a configuration example of an image sensor adapted to a regulation of prohibiting a change in a packet.

FIG. 25 is a block diagram depicting a detailed configuration example of the image sensor 211. It is to be noted that the constituent components in the image sensor 211 in FIG. 25 that are common to those in the image sensor 21 in FIG. 9 are denoted by the same reference signs, and a detailed explanation thereof will be omitted.

That is, analogous to the image sensor 21 in FIG. 9, the image sensor 211 includes the pixel 41, the AD converter 42, the image processing section 43, the register 47, and the controller 60. In addition, an I2C/I3C slave 223 and a CCI slave 224 included in the image sensor 211 correspond to the I2C/I3C slave 46 and the CCI slave 59 in FIG. 9, respectively.

Further, the image sensor 211 includes the extension mode-capable CSI-2 transmission circuit 221 and the physical layer processing section 222. The physical layer processing section 222 is adapted to A-PHY, C-PHY, and D-PHY.

The extension mode-capable CSI-2 transmission circuit 221 includes, in addition to the controller 60 and the CCI slave 224, an AS payload generation section 301, a selector 302, an A-PHY packet generation section 303, a C-PHY packet generation section 304, a D-PHY packet generation section 305, and a selector 306.

The AS payload generation section 301 generates an AS payload that is restricted as an E2E protection range, and outputs the AS payload to the selector 302. For example, the AS payload generation section 301 includes a packing section 311, an extended packet header generation section 312, and an extended packet footer generation section 313.

The packing section 311 packs image data supplied from the image processing section 43, and generates packet data having the number of bytes determined by a packet count PC, as data to be transmitted. For example, according to a set value (e.g., an image size) stored in the register 47, the controller 60 can control the number of bytes of the packet data to be generated by the packing section 311.

As previously explained with reference to FIGS. 21 to 23, for example, the extended packet header generation section 312 generates an extended packet header in which a packet count PC and a virtual channel VC are described, and adds the extended packet header to the packet data. The extended packet footer generation section 313 generates an extended packet footer, and adds the extended packet footer to the packet data.

Under control of the controller 60, the selector 302 selects, as an output destination of an AS payload supplied from the AS payload generation section 301, one of the A-PHY packet generation section 303, the C-PHY packet generation section 304, and the D-PHY packet generation section 305 which are arranged in parallel.

The A-PHY packet generation section 303 generates an extended A-PHY packet from an AS payload supplied via the selector 302, and outputs the extended A-PHY packet to the selector 306. For example, the A-PHY packet generation section 303 includes an AAL generation section 321, an A-PHY packet header generation section 322, and an A-PHY packet footer generation section 323.

For example, the AAL (A-PHY Adaptation Layer) generation section 321 divides the AS payload generated by the AS payload generation section 301, into 380-byte units in a layer called an Adaptation Layer. Then, the A-PHY packet header generation section 322 adds an A-PHY packet header to each of the divided units of the AS payload, and the A-PHY packet footer generation section 323 adds an A-PHY packet footer to each of the divided units of the AS payload.

The C-PHY packet generation section 304 generates an extended C-PHY packet from the AS payload supplied via the selector 302, and outputs the extended C-PHY packet to the selector 306. For example, the C-PHY packet generation section 304 includes a C-PHY packet header generation section 331, a C-PHY packet footer generation section 332, and a C-PHY lane distribution section 333.

For example, the C-PHY packet header generation section 331 adds a C-PHY packet header to the AS payload generated by the AS payload generation section 301, and the C-PHY packet footer generation section 332 adds a C-PHY packet footer to the AS payload. Then, the C-PHY lane distribution section 333 distributes the extended C-PHY packet to three lanes conforming to the CSI-2 standard.

The D-PHY packet generation section 305 generates an extended D-PHY packet from the AS payload supplied via the selector 302, and outputs the extended D-PHY packet to the selector 306. For example, the D-PHY packet generation section 305 includes a D-PHY packet header generation section 341, a D-PHY packet footer generation section 342, and a D-PHY lane distribution section 343.

For example, the D-PHY packet header generation section 341 adds a D-PHY packet header to the AS payload generated by the AS payload generation section 301, and the D-PHY packet footer generation section 342 adds a D-PHY packet footer to the AS payload. Then, the D-PHY lane distribution section 343 distributes the extended D-PHY packet to four lanes conforming to the CSI-2 standard.

Under control of the controller 60, the selector 306 selects, as an output source of an extended packet to be supplied to the physical layer processing section 222, one of the A-PHY packet generation section 303, the C-PHY packet generation section 304, and the D-PHY packet generation section 305 which are arranged in parallel.

Further, in a case where an extended A-PHY packet is suppled from the A-PHY packet generation section 303, the physical layer processing section 222 transmits the extended A-PHY packet through one lane. In addition, in a case where an extended C-PHY packet is suppled from the C-PHY packet generation section 304 to the physical layer processing section 222, the physical layer processing section 222 transmits the extended C-PHY packet through three lanes. In addition, in a case where an extended D-PHY packet is supplied from the D-PHY packet generation section 305 to the physical layer processing section 222, the physical layer processing section 222 transmits the extended D-PHY packet through four lanes.

In the image sensor 11 having the above-described configuration, the extension mode-capable CSI-2 transmission circuit 221 is configured in such a manner that the AS payload generation section 301 is connected to the A-PHY packet generation section 303, the C-PHY packet generation section 304, and the D-PHY packet generation section 305 via the selector 302. Accordingly, through the AS payload generation section 301 alone, the image sensor 211 can generate an AS payload that is common to an extended A-PHY packet, an extended C-PHY packet, and an extended D-PHY packet. That is, the A-PHY packet generation section 303, the C-PHY packet generation section 304, and the D-PHY packet generation section 305 can share the AS payload generation section 301, so that the circuit scale can be reduced. Consequently, the image sensor 211 can be downsized.

Figure 26:
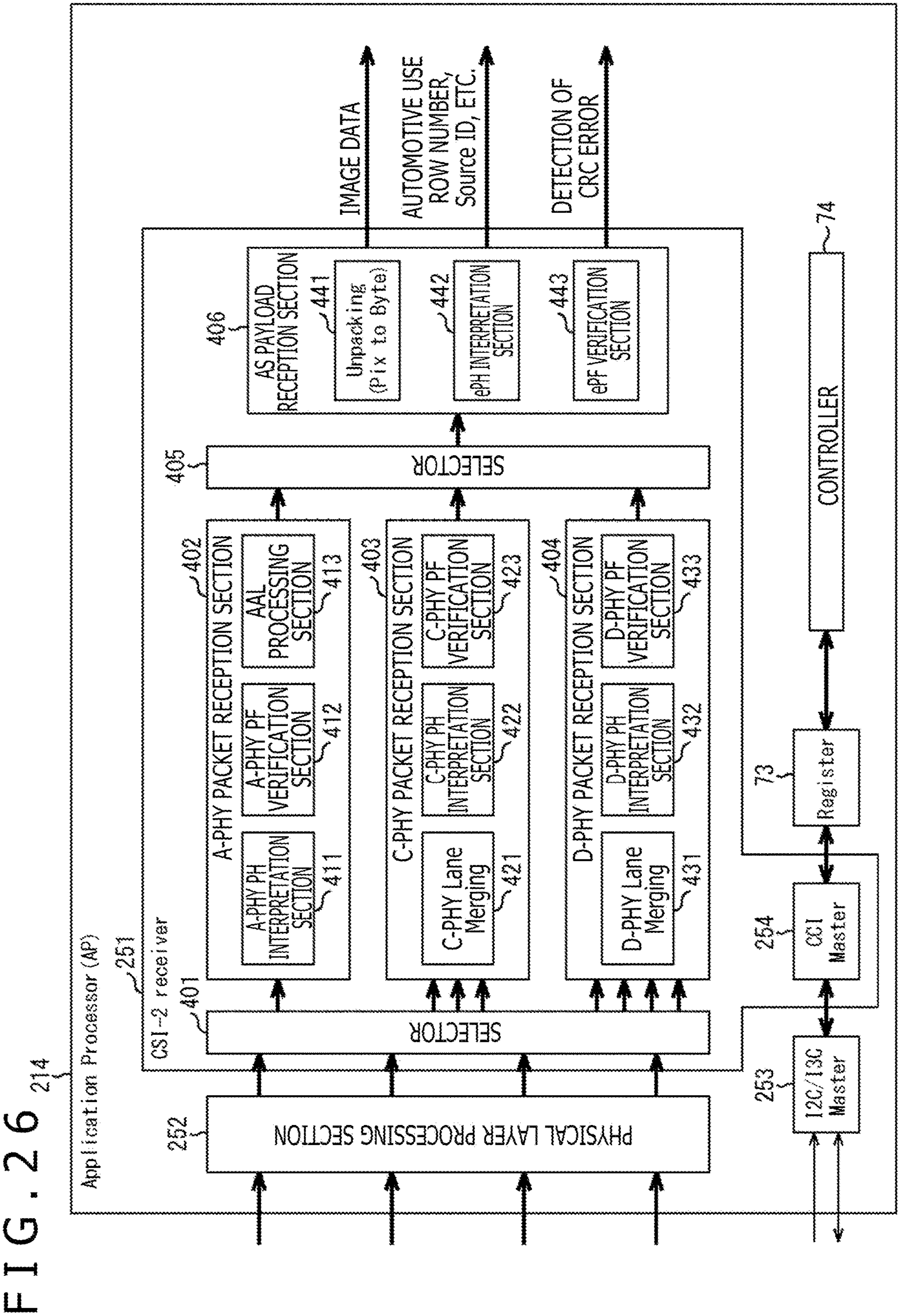
FIG. 26 is a block diagram depicting a configuration example of an application processor adapted to a regulation of prohibiting a change in a packet.

FIG. 26 is a block diagram depicting a detailed configuration example of the application processor 214. It is to be noted that the constituent components of the application processor 214 depicted in FIG. 26 that are common to those in the application processor 22 in FIG. 10 are denoted by the same reference signs, and a detailed explanation thereof will be omitted.

That is, analogous to the application processor 22 in FIG. 10, the application processor 214 includes the register 73 and the controller 74. It is to be noted that the controller 74 may be implemented by software. Further, the I2C/I3C master 253 and the CCI master 254 included in the application processor 214 correspond to the I2C/I3C master 72 and the CCI master 88 in FIG. 10, respectively.

In addition, the application processor 214 includes an extension mode-capable CSI-2 reception circuit 251 and a physical layer processing section 252. The physical layer processing section 252 is adapted to A-PHY, C-PHY, and D-PHY.

The extension mode-capable CSI-2 reception circuit 251 includes, in addition to the CCI master 254, a selector 401, an A-PHY packet reception section 402, a C-PHY packet reception section 403, a D-PHY packet reception section 404, the selector 405, and an AS payload reception section 406.

The selector 401 selects, as an output destination of an extended packet supplied from the physical layer processing section 252, one of the A-PHY packet reception section 402, the C-PHY packet reception section 403, and the D-PHY packet reception section 404 which are arranged in parallel.

The A-PHY packet reception section 402 receives an extended A-PHY packet supplied via the selector 401, and outputs the extended A-PHY packet to the selector 405. For example, the A-PHY packet reception section 402 includes an A-PHY packet header interpretation section 411, an A-PHY packet footer verification section 412, and an AAL processing section 413.

For example, the A-PHY packet header interpretation section 411 interprets the contents described in the A-PHY packet header, and performs a process necessary to receive the extended A-PHY packet. The A-PHY packet footer verification section 412 verifies the presence/absence of an error by using the A-PHY packet footer. Then, the AAL processing section 413 performs a process of merging the divided Adaptation Layers obtained by the AAL generation section 321 in FIG. 25.

The C-PHY packet reception section 403 receives an extended C-PHY packet supplied via the selector 401, and outputs the extended C-PHY packet to the selector 405. For example, the C-PHY packet reception section 403 includes a C-PHY lane merging section 421, a C-PHY packet header interpretation section 422, and a C-PHY packet footer verification section 423.

For example, the C-PHY lane merging section 421 merges extended C-PHY packets that have been divided into three lanes in accordance with the CSI-2 standard and supplied thereto via the physical layer processing section 252. Then, the C-PHY packet header interpretation section 422 interprets the contents described in the C-PHY packet header, and performs a process necessary to receive the extended C-PHY packet. The C-PHY packet footer verification section 423 verifies the presence/absence of an error by using the C-PHY packet footer.

The D-PHY packet reception section 404 receives an extended D-PHY packet supplied via the selector 401, and outputs the extended D-PHY packet to the selector 405. For example, the D-PHY packet reception section 404 includes a D-PHY lane merging section 431, a D-PHY packet header interpretation section 432, and a D-PHY packet footer verification section 433.

For example, the D-PHY lane merging section 431 merges extended D-PHY packets that have been divided into four lanes in accordance with the CSI-2 standard and supplied thereto via the physical layer processing section 252. Then, the D-PHY packet header interpretation section 432 interprets the contents described in the D-PHY packet header, and performs a process necessary to receive the extended D-PHY packet. The D-PHY packet footer verification section 433 verifies the presence/absence of an error by using the D-PHY packet footer.

The selector 405 selects, as an output source of an extended packet to be supplied to the AS payload reception section 406, one of the A-PHY packet reception section 402, the C-PHY packet reception section 403, and the D-PHY packet reception section 404 which are arranged in parallel.

The AS payload reception section 406 corresponds to the AS payload generation section 301 in FIG. 25, and includes an unpacking section 441, an extended packet header interpretation section 442, and an extended packet footer verification section 443. The unpacking section 441 unpacks image data packed by the packing section 311. The extended packet header interpretation section 442 interprets an extended packet header generated by the extended packet header generation section 312, and reads out a packet count PC and a virtual channel VC, for example. The extended packet footer verification section 443 verifies the presence/absence of an error by using the extended packet footer added by the extended packet footer generation section 313. Then, the AS payload reception section 406 outputs various types of data such as image data, an automotive use row number, a Source ID, and a CRC error, for example, stored in the packet data supplied via the selector 405, to LSI (not depicted) in the later stage.

In the application processor 214 having the above-described configuration, the extension mode-capable CSI-z reception circuit 251 is configured in such a manner that the AS payload reception section 406 is connected to the A-PHY packet reception section 402, the C-PHY packet reception section 403, and the D-PHY packet reception section 404 via the selector 405. Accordingly, through the AS payload reception section 406 alone, the application processor 214 can receive an AS payload that is common to an extended A-PHY packet, an extended C-PHY packet, and an extended D-PHY packet. That is, the A-PHY packet reception section 402, the C-PHY packet reception section 403, and the D-PHY packet reception section 404 can share the AS payload reception section 406, so that the circuit scale can be reduced. Consequently, the application processor 214 can be downsized.

<Second Configuration Example that is Adaptable to E2E Protection>

A second configuration example adapted to E2E Protection will be explained with reference to FIGS. 27 to 74.

<Configuration Example of A-PHY Direct Connection Configuration>

A communication system 501 depicted in FIG. 27 has a direct connection configuration in which an image sensor 511 and an application processor 512 are directly connected to each other through A-PHY (not via such a SerDes device as that explained later with reference to FIG. 40).

The image sensor 511 includes an A-PHY processing section 521, a CSIA processing section 522, a CSI2 processing section 523, a CSI2-FS processing section 524, a CCI processing section 525, a CCI-FS processing section 526, and a register 527.

With the CCI processing section 525 implemented as an upper layer, the A-PHY processing section 521 is MIPI A-PHY connected to the A-PHY processing section 531 of the application processor 512, and transmits and receives data including an extended packet header ePH and an extended packet footer ePF to and from the A-PHY processing section 531.

The CCI-FS processing section 526 compares a Destination ID included in the extended packet header ePH, for example, with an ID (Source ID) given to the image sensor 511, and determines whether or not the data is for accessing the image sensor 511.

The application processor 512 includes an A-PHY processing section 531, a CSIA processing section 532, a CSI2 processing section 533, a CSI2-FS processing section 534, a CCI processing section 535, a CCI-FS processing section 536, a register 537, and a CCI-FS switch 539.

With the CCI processing section 535 implemented as an upper layer, the A-PHY processing section 531 is MIPI A-PHY connected to the A-PHY processing section 521 of the image sensor 511, and transmits and receives data including an extended packet header ePH and an extended packet footer ePF to and from the A-PHY processing section 521.

The CCI-FS processing section 536 compares Destination ID included in the extended packet header ePH, for example, with an ID (Source ID) given to the application processor 512, and determines whether or not the data is for accessing the application processor 512.

The CCI-FS switch 538 performs switching in such a manner that data is transmitted and received via the CCI-FS processing section 536 in a case where the CCI-FS processing section 536 is enabled, and data is transmitted and received not via the CCI-FS processing section 536 in a case where the CCI-FS processing section 536 is disabled.

A transfer of a read command and read data in the communication system 501 will be explained with reference to FIGS. 28 to 32.

Figure 28:
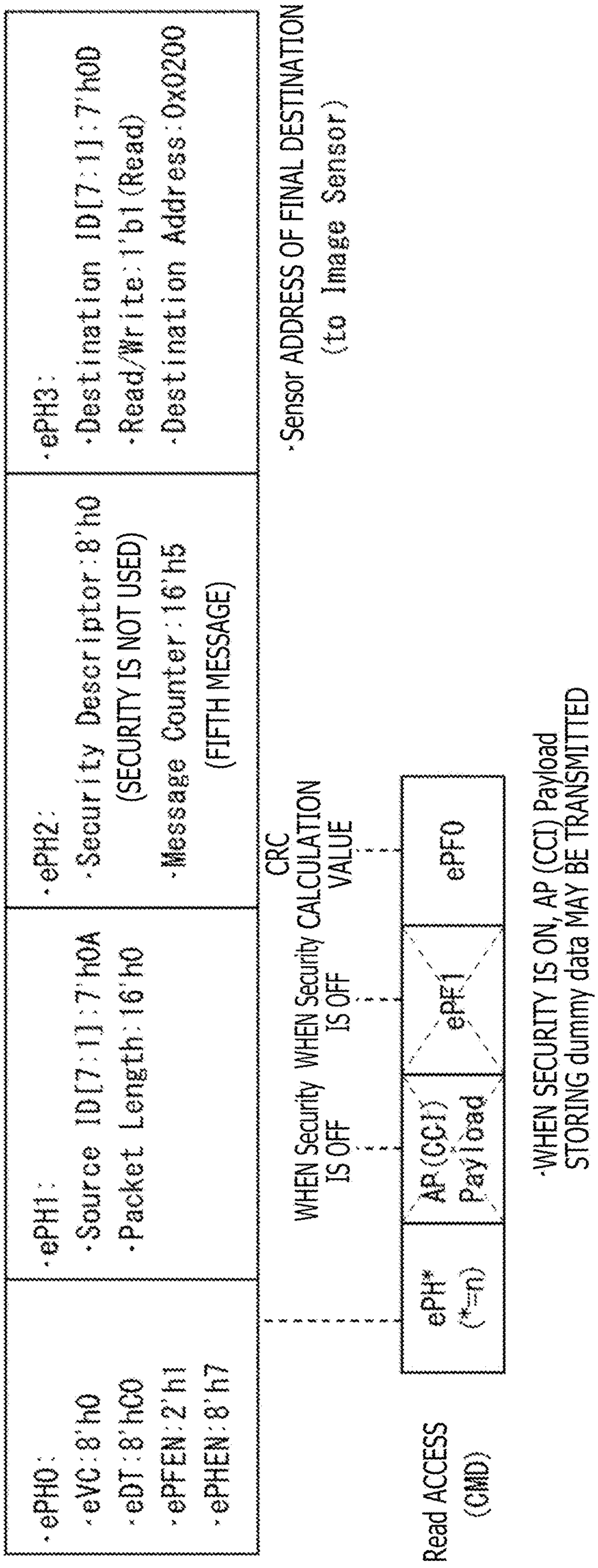
FIG. 28 is a diagram depicting one example of a packet configuration of a read command generated by the application processor side.

FIG. 28 depicts one example of the packet configuration of a read command that is generated by the CCI-FS processing section 536 of the application processor 512 when a read access is made.

As depicted in FIG. 28, the read command includes an extended packet header ePH*(*=n), an AP (CCI) payload, an extended packet footer ePF1, and an extended packet footer ePF0.

The extended packet header ePH*(*=n) includes extended packet headers ePH0 to ePH3, as depicted in FIG. 28.

The extended packet header ePH0 stores an extended VC, extended DT, extended PFEN, and extended PHEN. For example, the extended DT is information indicating a CCI protocol (I2C). The extended DT is used to execute a routing process.

A Source ID [7:1] and a Packet Length are stored in the extended packet header ePH1. For example, the Source ID is information indicating the transmission source of CCI protocol (I2C). On the basis of the Source ID, a response process is executed. The Packet Length is information indicating the data length.

A Security Descriptor and a Message Counter are stored in the extended packet header ePH2. The Security Descriptor indicates whether or not to use security. In a case where security is not used, "8'h0" is indicated. The Message Counter is information that indicates the place of the bucket, and indicates a count value that is the number of message counts. When the message is the fifth message, "16'h5" is indicated.

A Destination ID [7:1], Read/Write, and a Destination Address are stored in the extended packet header ePH3. The Destination ID [7:1] indicates a slave address in the CCI processing section 525 of the image sensor 511. In the example depicted in FIG. 28, the Destination ID [7:1] is "7'h0D." For example, the Destination ID is information that indicates a transmission destination of the CCI protocol (I2C). Routing is performed on the basis of the Destination ID, and reference to a communication path is made. Read/Write indicates data reading or data writing, and in a case of data reading. "1'b1" is indicated. The Destination Address indicates the address of the register 527 in the image sensor 511, which is the final destination. In the example depicted in FIG. 28, the Destination Address is "0x0200."

Various types of data (Data0 [7:0]) are stored in the AP (CCI) payload, for example. The AP (CCI) payload is not transmitted when security is off, and the AP (CCI) payload storing dummy data may be transmitted when security is on.

The extended packet footer ePF1 is not transmitted when security is off.

The extended packet footer ePF0 includes security data (e.g., a hash calculation value) that is used for checking data integrity. Specifically, the extended packet footer ePF0 stores a CRC calculation value.

In the application processor 512, a read command having the above-mentioned packet structure is generated by the CCI-FS processing section 536, and is supplied to the A-PHY processing section 531.

Figure 29:
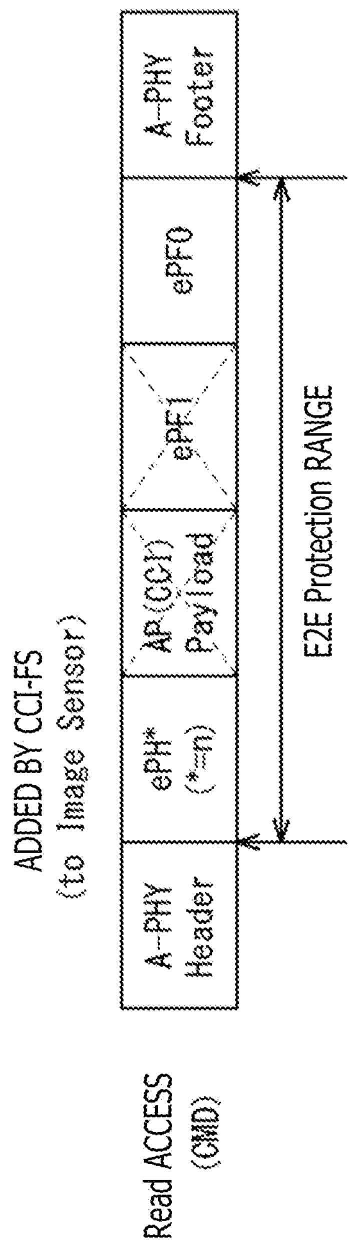
FIG. 29 is a diagram depicting one example of a packet configuration of a read command to be transferred through A-PHY.

FIG. 29 illustrates one example of a packet configuration of a read command that is outputted from the A-PHY processing section 531 of the application processor 512 when a read access is made.

As illustrated in FIG. 29, the A-PHY processing section 531 specifies, as an E2E Protection range, the read command supplied from the CCI-FS processing section 536, and adds an A-PHY header and an A-PHY footer thereto.

An A-PHY transfer of the read command having such a packet structure is conducted by the A-PHY processing section 531 of the application processor 512. Then, in the image sensor 511, the A-PHY processing section 521 removes the A-PHY header and the A-PHY footer from the read command. Subsequently, the read command is supplied to the CCI-FS processing section 526 via the CCI processing section 525 having a slave address "7'h0D" indicated by the Destination ID.

Figure 30:
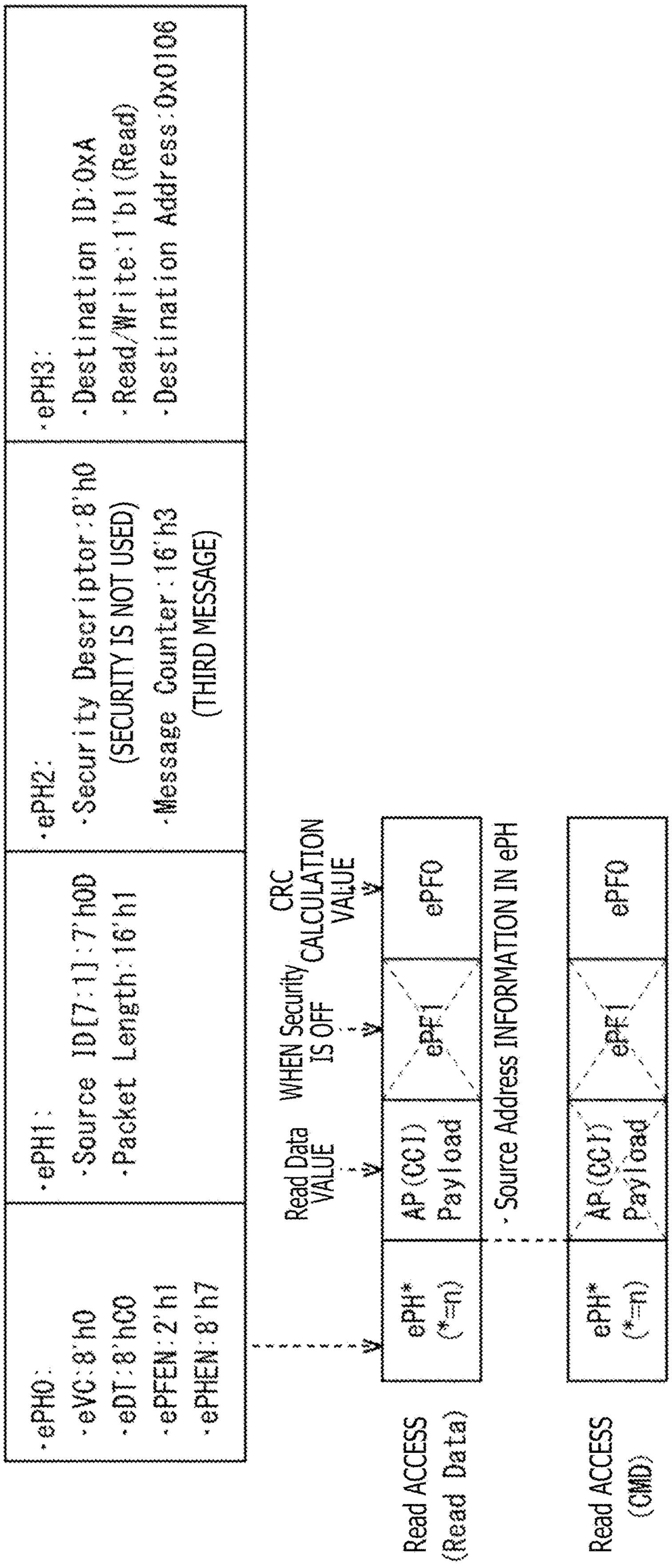
FIG. 30 is a diagram depicting one example of a packet configuration of a read command and read data on the image sensor side.

FIG. 30 depicts one example of the packet structure of a read command that is supplied to the CCI-FS processing section 526 and read data that is generated by the CCI-FS processing section 526 when a read access is made.

The read command having the packet structure illustrated in FIG. 28 as it is, that is, the read command specified as the E2E Protection range during the A-PHY transfer, as illustrated in FIG. 30, is supplied to the CCI-FS processing section 526.

The read data includes the extended packet header ePH* (*=n), the AP (CCI) payload, the extended packet footer ePF1, and the extended packet footer ePF0 as illustrated in FIG. 30. Further, the AP (CCI) payload stores a read data value read out from an address "0x0200" of the register 527 indicated by source address information (Destination Address) in the extended packet header ePH of the read command.

In the image sensor 511, read data having the above-mentioned packet structure is generated by the CCI-FS processing section 526, and is supplied to the A-PHY processing section 521.

Figure 31:
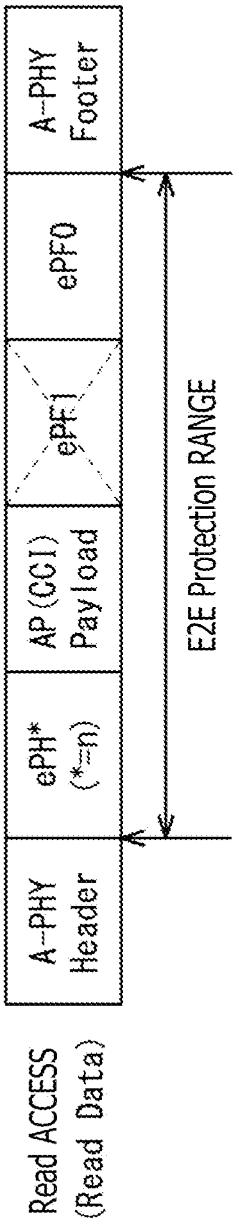
FIG. 31 is a diagram depicting one example of a packet configuration of read data to be transferred through A-PHY.

FIG. 31 illustrates one example of a packet configuration of read data that is outputted from the A-PHY processing section 521 of the image sensor 511 when a read access is made.

As illustrated in FIG. 31, the A-PHY processing section 521 specifies, as the E2E Protection range, the read data supplied from the CCI-FS processing section 526, and adds an A-PHY header and an A-PHY footer thereto.

An A-PHY transfer of read data having the above-mentioned packet structure is conducted by the A-PHY processing section 521 of the image sensor 511. Then, in the application processor 512, the A-PHY processing section 531 removes the A-PHY header and the A-PHY footer from the read data, and the resultant read data is supplied to the CCI-FS processing section 536.

Figure 32:
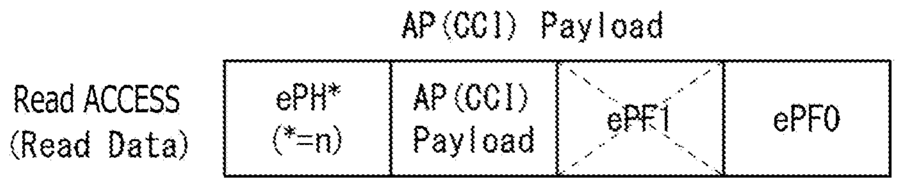
FIG. 32 is a diagram depicting one example of a packet configuration of read data acquired by the application processor side.

FIG. 32 illustrates one example of a packet structure of read data that is supplied to the CCI-FS processing section 536 when a read access is made.

The read data having the packet structure illustrated in FIG. 30 as it is, that is, the read data specified as the E2E protection range in the A-PHY transfer, as illustrated in FIG. 32, is supplied to the CCI-FS processing section 536.

Transfer of write data in the communication system 501 will be explained with reference to FIGS. 33 to 35. It is to be noted that the explanation is given on the assumption that an access is made in a state where the CCI-FS processing section 526 of the image sensor 511 is enabled.

Figure 33:
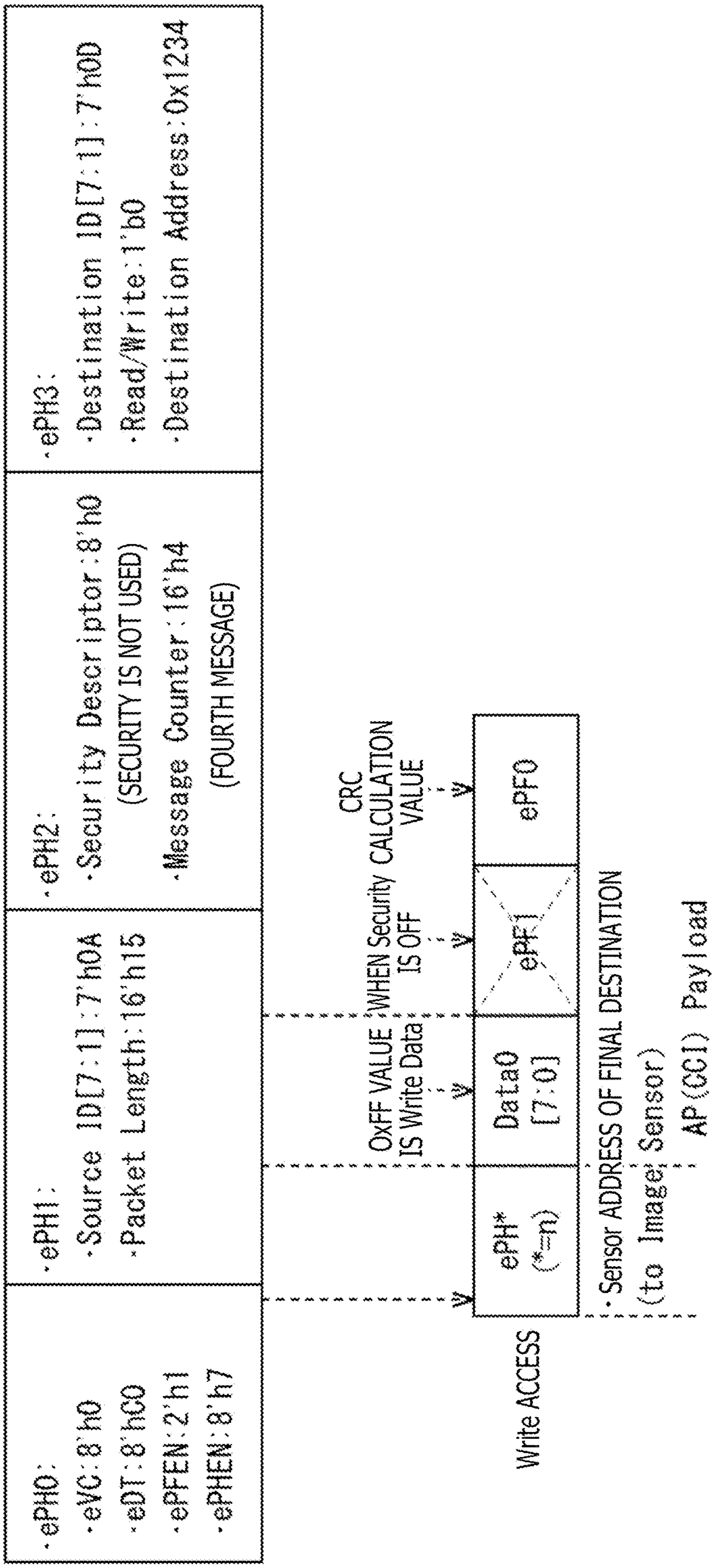
FIG. 33 is a diagram depicting one example of a packet configuration of write data generated by the application processor side.

FIG. 33 depicts one example of a packet configuration of write data generated by the CCI-FS processing section 536 of the application processor 512 when a write access is made.

As depicted in FIG. 33, the write data includes an extended packet header ePH*(*=n), an AP (CCI) payload (write data), an extended packet footer ePF1, and an extended packet footer ePF0.

As depicted in FIG. 33, the extended packet header ePH*(*=n) includes extended packet headers ePH0 to ePH3.

An extended VC, extended DT, extended PFEN, and extended PHEN are stored in the extended packet header ePH0.

A Source ID [7:1] and a Packet Length are stored in the extended packet header ePH1.

A Security Descriptor and a Message Counter are stored in the extended packet header ePH2. The Security Descriptor indicates whether or not to use security, and in a case where security is not used, "8'h0" is indicated. The Message Counter indicates a count value that is the number of message counts. "16'h4" indicates that the message is the fourth message.

The extended packet header ePH3 stores a Destination ID [7:1], Read/Write, and a Destination Address. The Destination ID [7:1] indicates a slave address in the CCI processing section 525 of the image sensor 511. The Destination ID [7:1] is "7'h0D" in the example depicted in FIG. 33. Read/Write indicates either data reading or data writing. "1'b0" indicates data writing. The Destination Address indicates the address of the register 527 in the image sensor 511, which is the final destination. The Destination Address is "0x1234" in the example depicted in FIG. 33.

The AP (CCI) payload stores data (Data0 [7:0]) to be written into the image sensor 511. 0xFF value is write data.

The extended packet footer ePF1 is not transmitted when security is off.

A CRC calculation value is stored in the extended packet footer ePF0.

In the application processor 512, write data having the above-mentioned packet structure is generated by the CCI-FS processing section 536, and is supplied to the A-PHY processing section 531.

Figure 34:
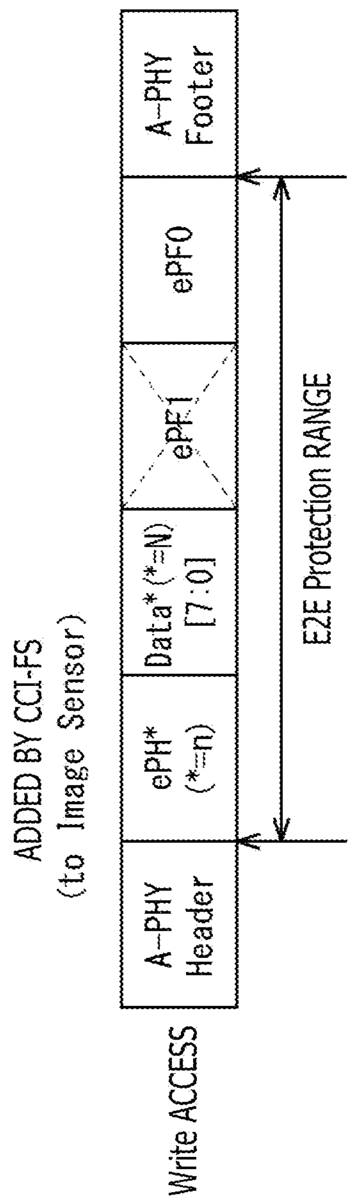
FIG. 34 is a diagram depicting one example of a packet configuration of write data to be transferred through A-PHY.

FIG. 34 depicts one example of a packet configuration of write data that is outputted from the A-PHY processing section 531 of the application processor 512 when a write access is made.

The A-PHY processing section 531 specifies, as the E2E protection range, the write data supplied from the CCI-FS processing section 536, and adds an A-PHY header and an A-PHY footer to the write data, as depicted in FIG. 34.

An A-PHY transfer of write data having the above-mentioned packet structure is conducted by the A-PHY processing section 531 of the application processor 512. Then, in the image sensor 511, the A-PHY processing section 521 removes the A-PHY header and the A-PHY footer from the write data. Thereafter, the write data is supplied to the CCI-FS processing section 526 via the CCI processing section 525 having a slave address "7'h0" indicated by the Destination ID.

Figure 35:
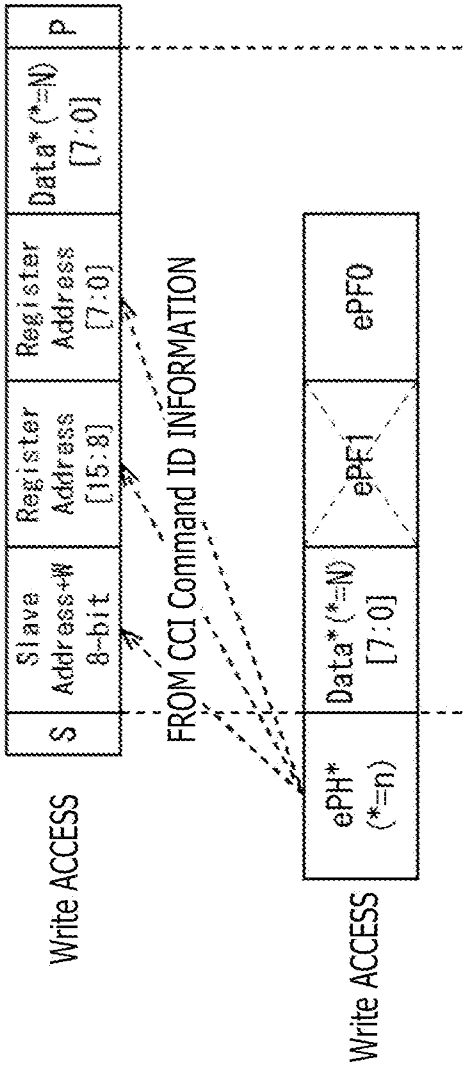
FIG. 35 is a diagram depicting one example of a packet configuration of write data acquired by the image sensor side.

FIG. 35 depicts one example of a packet structure of write data that is supplied to the CCI-FS processing section 526 when a write access is made.

Write data having the packet structure illustrated in FIG. 35 as it is, that is, write data specified as the E2E protection range in the A-PHY transfer, is supplied to the CCI-FS processing section 526, as depicted in FIG. 35. Then, the CCI-FS processing section 526 writes data stored in the AP (CCI) payload, by CCI command ID information, that is, the address "0x1234" of the register 527 indicated by source address information (Destination Address) in the extended packet header ePH of the read command.

An overview of the extended packet header ePH and the extended packet footer ePF will be explained with reference to FIG. 36.

Figure 36:
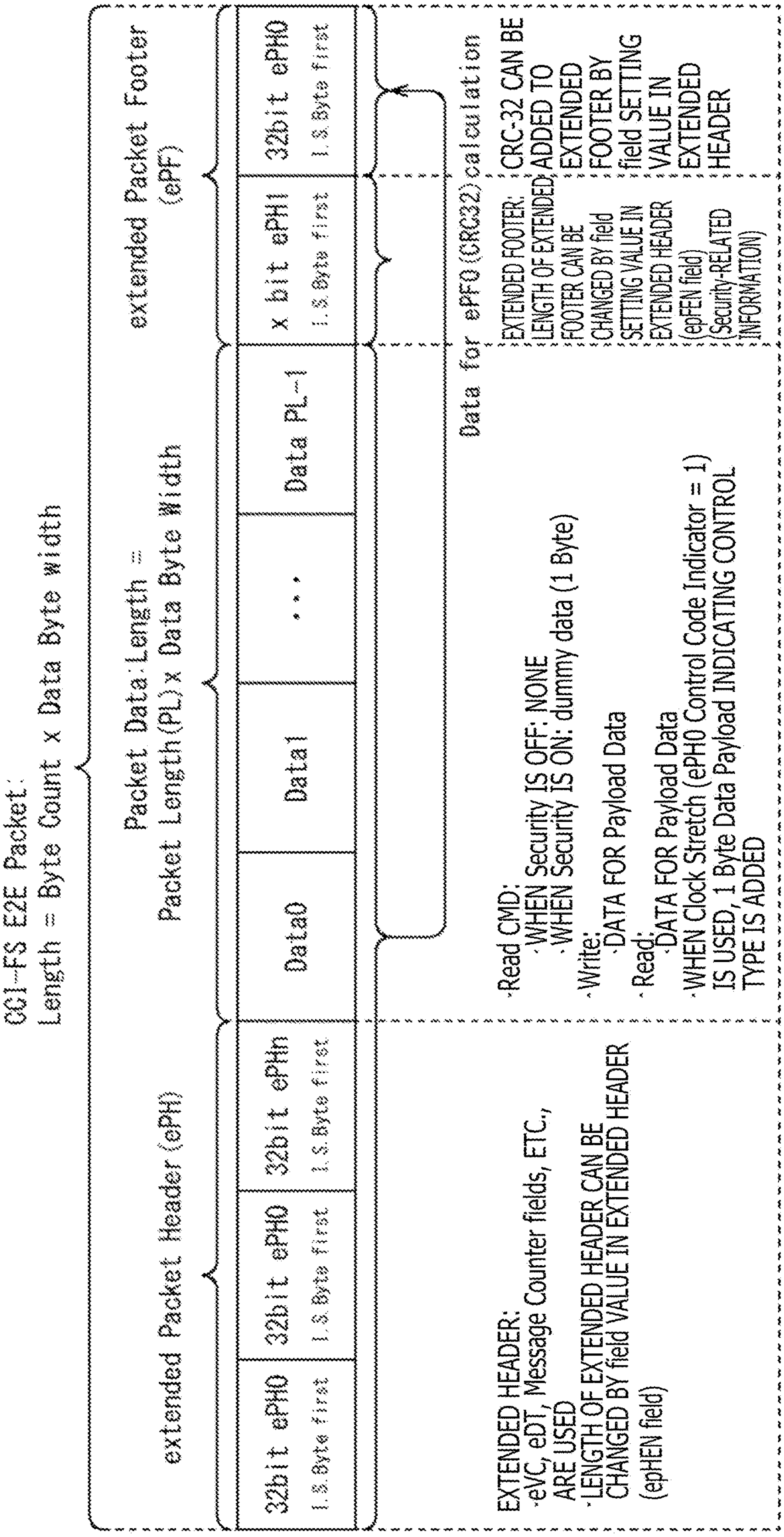
FIG. 36 is a diagram for explaining the overview of an extended packet header ePH and an extended packet footer ePF.

As illustrated in FIG. 36, a CCI-FS E2E packet includes the extended packet header ePH, the packet data, and the extended packet footer ePF, and has a packet length that is Length=Byte Count×Data Byte width.

In the extended packet header ePH, fields of an extended VC, extended DT, a Message Counter, etc., are used. With a field value (epFEN field) in the extended packet header ePH, the length of the extended packet header ePH can be changed.

The packet data includes PL sets of data (Data 0 to Data PL−1), and has a length that is Length=Packet Length (PL)×Data Byte Width. In a case of a read command, no data is stored in the packet data when security is off, and 1-byte dummy data is stored when security is on. In a case of a write access, write data for a payload is stored in the packet data. In a case where a read access is made, read data for a payload is stored in the packet data. When Clock Stretch (Control Code Indicator=1 in ePH0) is used, a 1-byte data payload indicating a control type is added to the packet data.

With a field set value (epFEN field) in the extended packet header ePH, the length of the extended packet footer ePF1 can be changed. In addition, security-related information can be added to the extended packet footer ePF1.

With the field set value in the extended packet header ePH, CPC-32 calculated from packet data can be added to the extended packet footer ePF0.

<Process Example of Communication Process>

A communication process using CCI-FS in the communication system 501 depicted in FIG. 27 will be explained with reference to the flowcharts in FIGS. 37 to 39.

Figure 37:
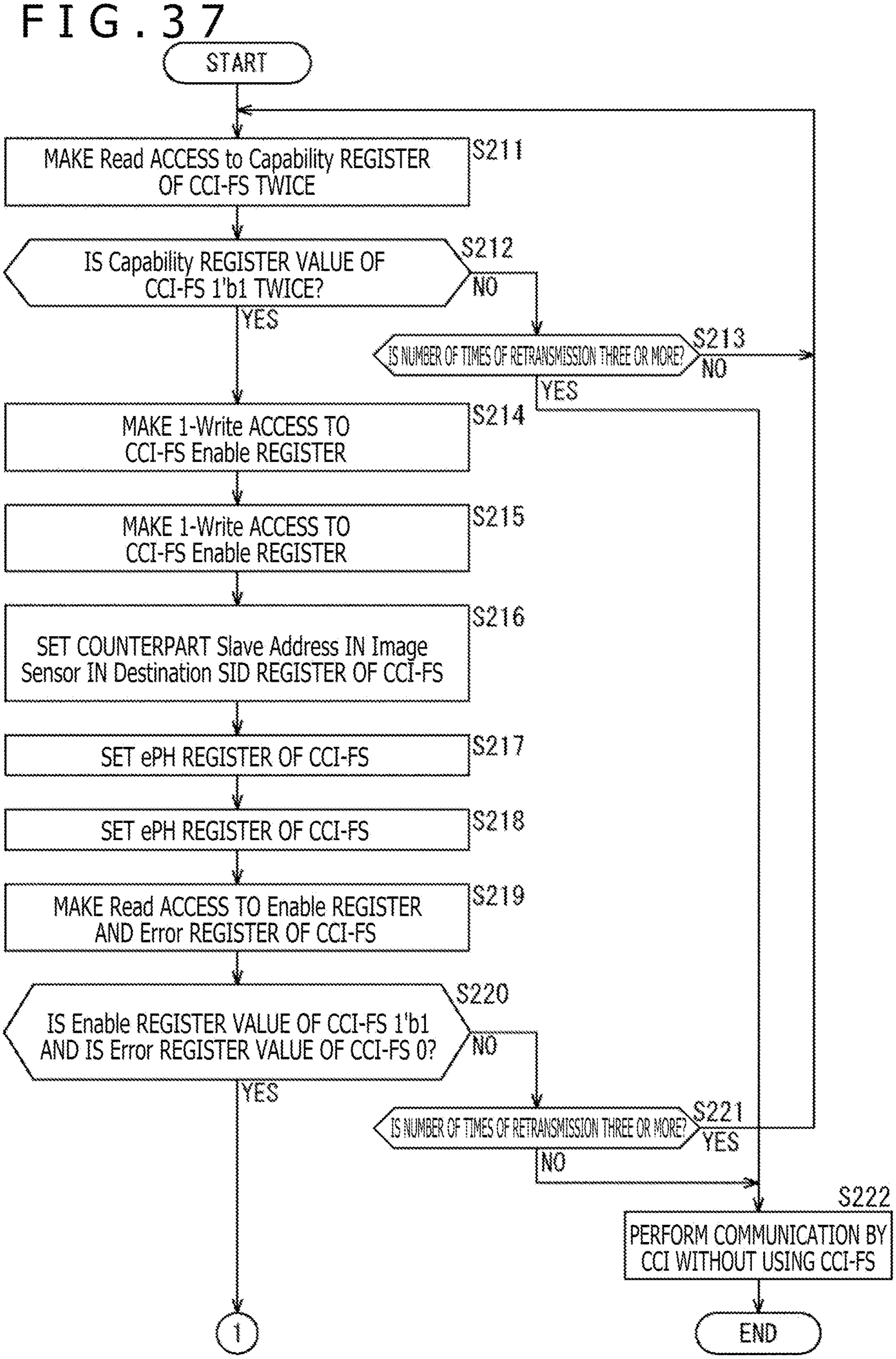
FIG. 37 is a flowchart for explaining initial setting and a check operation in a communication process using CCI-FS.

As illustrated in FIG. 37, initial setting and a check operation are performed in steps S211 and S222.

In step S211, a read access to a Capability register of the CCI-FS processing section 526 is made twice from the application processor 512 to the image sensor 511. It is to be noted that the number of times of making the read access is not limited to two, and the number can freely be defined in order to ensure functional safety, for example. The number may be set to 1, or to 3 or greater.

In step S212, in the application processor 512, the CSI2-FS processing section 524 determines whether or not a Capability register value in the CCI-FS processing section 526 has become 1'b1 twice as a result of the read accesses made in step S211. In a case where it is determined, in step S212, that the Capability register value in the CCI-FS processing section 526 has not become 1'b1 twice, the process proceeds to step S213.

In step S213, in the application processor 512, the CSI2-FS processing section 524 determines whether or not the number of times of retransmission is three or more. It is to be noted that the number of times of retransmission is not limited to three, and any number can be set. This similarly applies to a number of times of retransmission which will be described later. In a case where it is determined, in step S213, that the number of times of retransmission is not three or more (is one or two), the process returns to step S211. Thereafter, the similar processes are repeated.

On the other hand, in a case where it is determined, in step S212, that the Capability register value in the CCI-FS processing section 526 has become 1'b1 twice, the process proceeds to 214.

In step S214, 1-write access to an Enable register in the CCI-FS processing section 526 is made from the application processor 512 to the image sensor 511.

In step S215, in the image sensor 511, the CCI-FS processing section 526 makes 1-write access to an Enable register in the CCI-FS processing section 536 of the application processor 512.

In step S216, the counterpart slave address in the image sensor 511 is set in a Destination SID register of the CCI-FS processing section 536 of the application processor 512.

In step S217, an ePH register in the CCI-FS processing section 536 of the application processor 512 is set.

In step S218, an ePH register of the CCI-FS processing section 526 is set from the application processor 512 to the image sensor 511.

In step S219, a read access to the Enable register and the Error register in the CCI-FS processing section 526 is made from the application processor 512 to the image sensor 511.

In step S220, in the application processor 512, the CCI-FS processing section 536 determines whether or not the Enable register value in the CCI-FS processing section 526 is 1'b1 and whether or not the Error register value is 0 as a result of the read access made in step S219.

In a case where it is determined, in step S220, that the Enable register value of the CCI-FS processing section 526 is not 1'b1 or in a case where it is determined that the Error register value is not 0, the process proceeds to step S221.

In step S221, in the application processor 512, the CSI2-FS processing section 524 determines whether or not the number of times of retransmission is three or more. In a case where it is determined, in step S221, that the number of times of retransmission is three or more, the process returns to step S211. Thereafter, the similar processes are repeated.

On the other hand, in a case where it is determined, in step S213, that the number of times of retransmission is three or more, or in a case where it is determined, in step S221, that the number of times of retransmission is not three or more (is one or two), the process proceeds to step S222.

In step S222, communication using not CCI-FS but CCI is performed. Thereafter, the communication process is finished.

On the other hand, in a case where it is determined, in step S220, that the Enable register value in the CCI-FS processing section 526 is 1'b1 and the Error register value is 0, the process proceeds to step S223.

Figure 38:
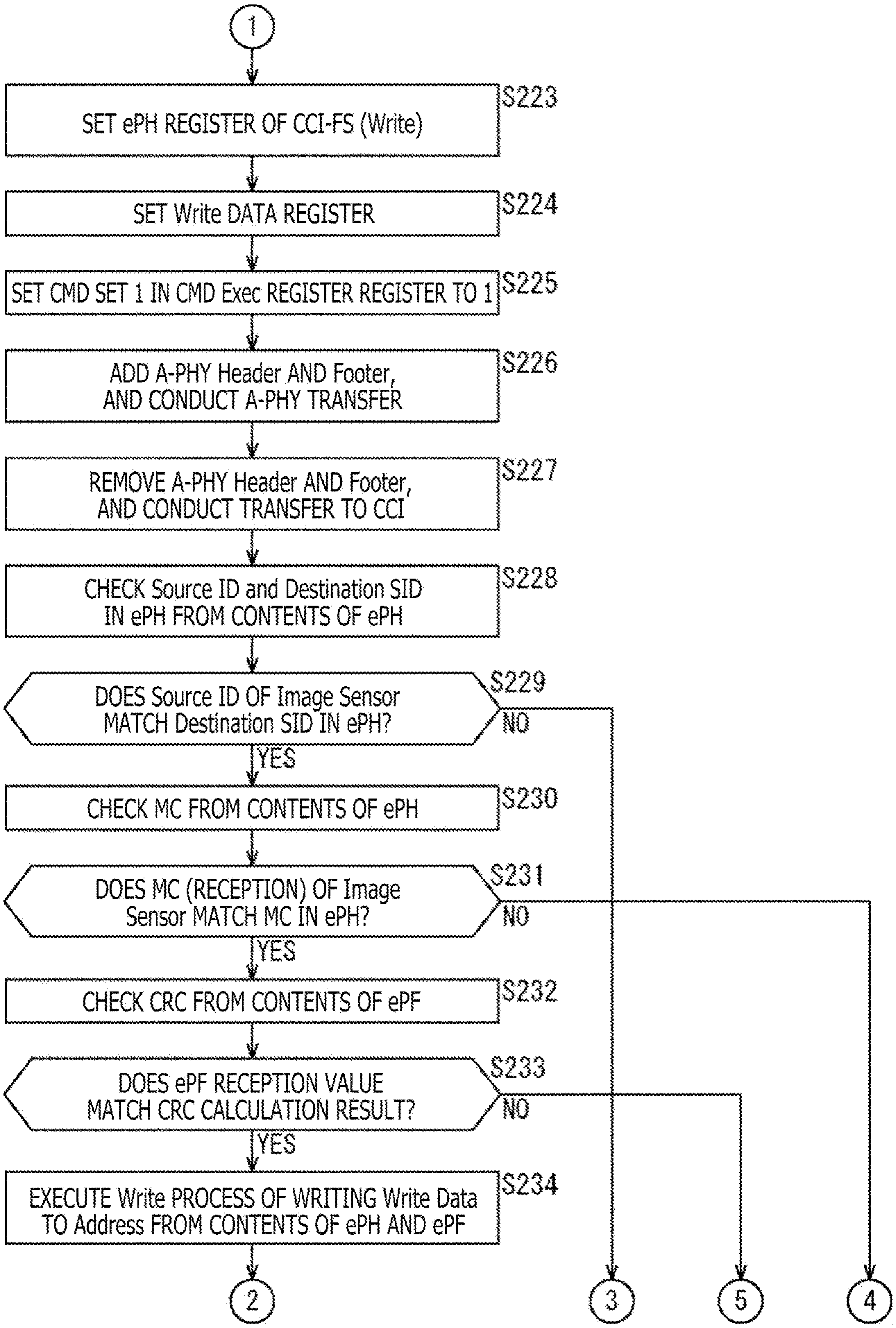
FIG. 38 is a flowchart for explaining a write operation using CCI-FS.

In steps S223 to S234, a write operation using CCI-FS is executed as illustrated in FIG. 38.

In step S223, the CCI-FS processing section 536 of the application processor 512 sets an ePH register to execute a write operation.

In step S224, the CCI-FS processing section 536 of the application processor 512 sets a write data register.

In step S225, the CCI-FS processing section 536 of the application processor 512 sets 1 in a command execution register.

In step S226, in the application processor 512, the A-PHY processing section 531 specifies, as the E2E protection range, the write data generated by the CCI-FS processing section 536, adds an A-PHY header and an A-PHY footer to the write data as illustrated in FIG. 34, and conducts an A-PHY transfer of the resultant write data.

In step S227, in the image sensor 511, the A-PHY processing section 521 removes the A-PHY header and the A-PHY footer from the write data, and supplies the E2E protection range to the CCI-FS processing section 526.

In step S229, in the image sensor 511, the CCI-FS processing section 526 checks the Source ID of the image sensor 511 and a Destination SID in the extended packet header ePH from the contents of the extended packet header ePH.

In step S229, in the image sensor 511, the CCI-FS processing section 526 determines whether or not the Source ID of the image sensor 511 checked in step S228 matches the Destination SID in the extended packet header ePH checked in step S228.

In a case where it is determined, in step S229, that the Source ID of the image sensor 511 matches the Destination SID in the extended packet header ePH, the process proceeds to step S230.

In step S230, in the image sensor 511, the CCI-FS processing section 526 checks a Message Counter from the contents of the extended packet header ePH.

In step S231, in the image sensor 511, the CCI-FS processing section 526 determines whether or not the Message Counter (reception) of the image sensor 511 checked in step S230 matches the Message Counter in the extended packet header ePH.

In a case where it is determined, in step S231, that the Message Counter (reception) of the image sensor 511 matches the Message Counter in the extended packet header ePH, the process proceeds to step S232.

In step S232, in the image sensor 511, the CCI-FS processing section 526 checks CPC from the contents of the extended packet footer ePF.

In step S233, in the image sensor 511, the CCI-FS processing section 526 determines whether or not a reception value (ePF0) in the extended packet footer ePF checked in step S232 matches a CRC calculation result calculated by the CCI-FS processing section 526.

In a case where it is determined, in step S233, that the reception value (ePF0) in the extended packet footer ePF matches the CRC calculation result, the process proceeds to step S234.

In step S234, in the image sensor 511, the CCI-FS processing section 526 executes a write process of writing write data to the address of the register 527 on the basis of the contents of the extended packet header ePH and the extended packet footer ePF. Thereafter, the process proceeds to step S235.

Figure 39:
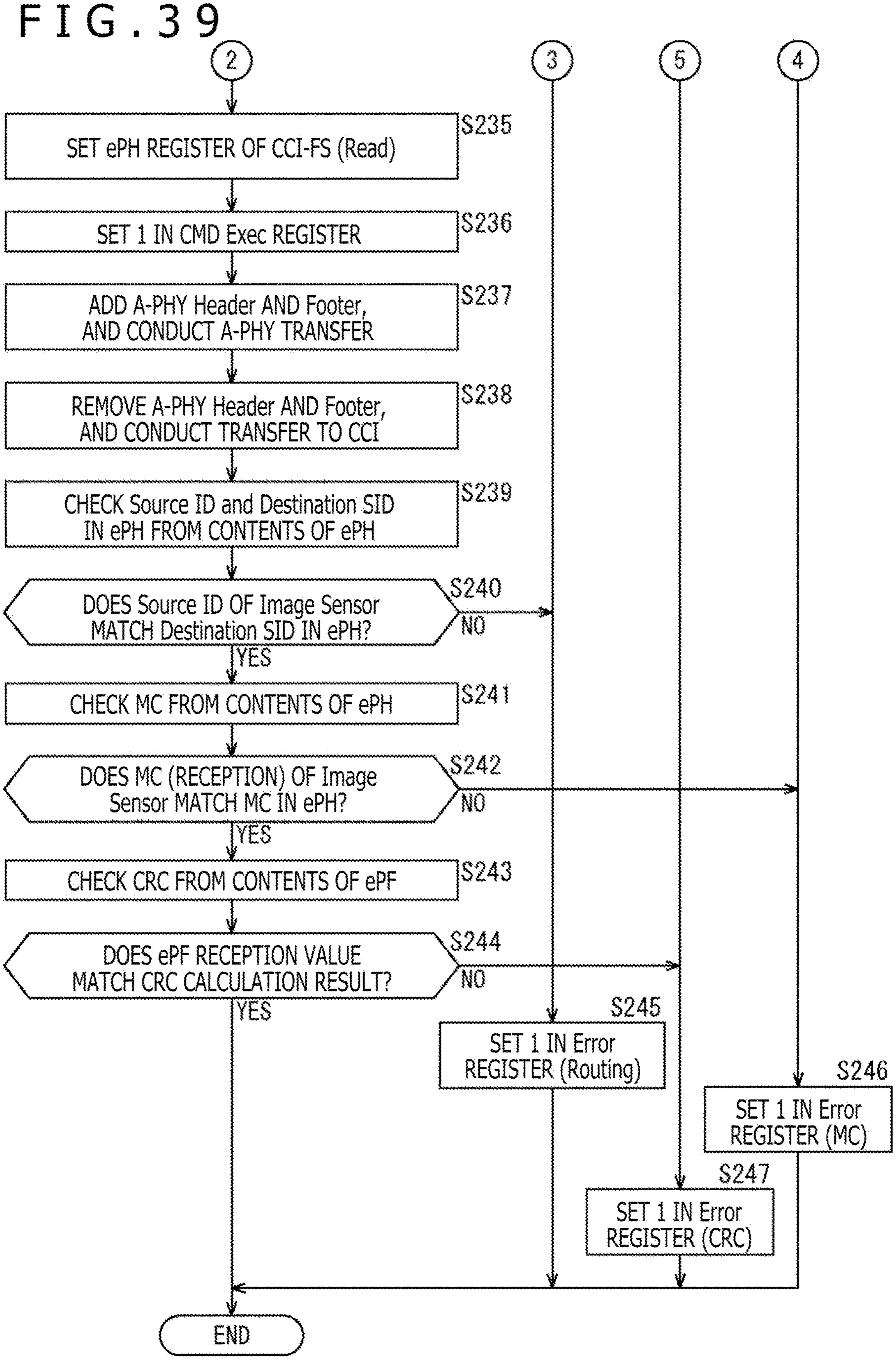
FIG. 39 is a flowchart for explaining a read operation using CCI-FS.

As illustrated in FIG. 39, a read operation using CCI-FS is executed in steps S235 to S247.

In step S235, in the application processor 512, the CCI-FS processing section 536 sets an ePH register to execute the read operation.

In step S236, in the application processor 512, the CCI-FS processing section 536 sets 1 in the command execution register.

In step S237, in the application processor 512, the A-PHY processing section 531 specifies, as the E2E protection range, the write data generated by the CCI-FS processing section 536, adds an A-PHY header and an A-PHY footer to the write data, as illustrated in FIG. 29, and conducts an A-PHY transfer of the resultant write data.

In step S238, in the image sensor 511, the A-PHY processing section 521 removes the A-PHY header and the A-PHY footer from the write data, and supplies the E2E protection range to the CCI-FS processing section 526.

In step S239, in the image sensor 511, the CCI-FS processing section 526 checks the Source ID of the image sensor 511 and the Destination SID in the extended packet header ePH from the contents of the extended packet header ePH.

In step S240, in the image sensor 511, the CCI-FS processing section 526 determines whether or not the Source ID of the image sensor 511 checked in step S239 match the Destination SID in the extended packet header ePH checked in step S239.

In a case where it is determined, in step S240, that the Source ID of the image sensor 511 matches the Destination SID in the extended packet header ePH, the process proceeds to step S241.

In step S241, in the image sensor 511, the CCI-FS processing section 526 checks the Message Counter from the contents of the extended packet header ePH.

In step S242, in the image sensor 511, the CCI-FS processing section 526 determines whether or not the Message Counter (reception) of the image sensor 511 checked in step S241 matches the Message Counter in the extended packet header ePH.

In a case where it is determined, in step S242, that the Message Counter (reception) of the image sensor 511 matches the Message Counter in the extended packet header ePH, the process proceeds to step S243.

In step S243, in the image sensor 511, the CCI-FS processing section 526 checks CRC on the basis of the contents of the extended packet footer ePF.

In step S244, in the image sensor 511, the CCI-FS processing section 526 determines whether or not a reception value (ePF0) in the extended packet footer ePF checked in step S243 matches a CRC calculation result calculated by the CCI-FS processing section 526.

In a case where it is determined, in step S244, that the reception value (ePF0) in the extended packet footer ePF matches the CRC calculation result, the process is finished.

On the other hand, in a case where it is determined, in step S229 in FIG. 38 or in step S240 in FIG. 39, that the Source ID of the image sensor 511 does not match the Destination SID in the extended packet header ePH, the process proceeds to step S245.

In step S245, 1 is set in Error register (Routing) on the image sensor 511 side. Thereafter, the process is finished.

On the other hand, in a case where it is determined, in step S231 in FIG. 3@ or in step S242 in FIG. 39, that the Message Counter (reception) of the image sensor 511 does not match the Message Counter in the extended packet header ePH, the process proceeds to step S246.

In step S246, 1 is set in Error register (MC) on the image sensor 511 side. Thereafter, the process is finished.

On the other hand, in a case where it is determined, in step S233 in FIG. 38 or step S244 in FIG. 39, that a reception value (ePF0) in the extended packet footer ePF does not match the CRC calculation result, the process proceeds to step S247.

In step S247, 1 is set in the Error register (CRC) on the image sensor 511 side. Thereafter, the process is finished.

<Configuration Example of SerDes Connection Configuration>

Figure 40:
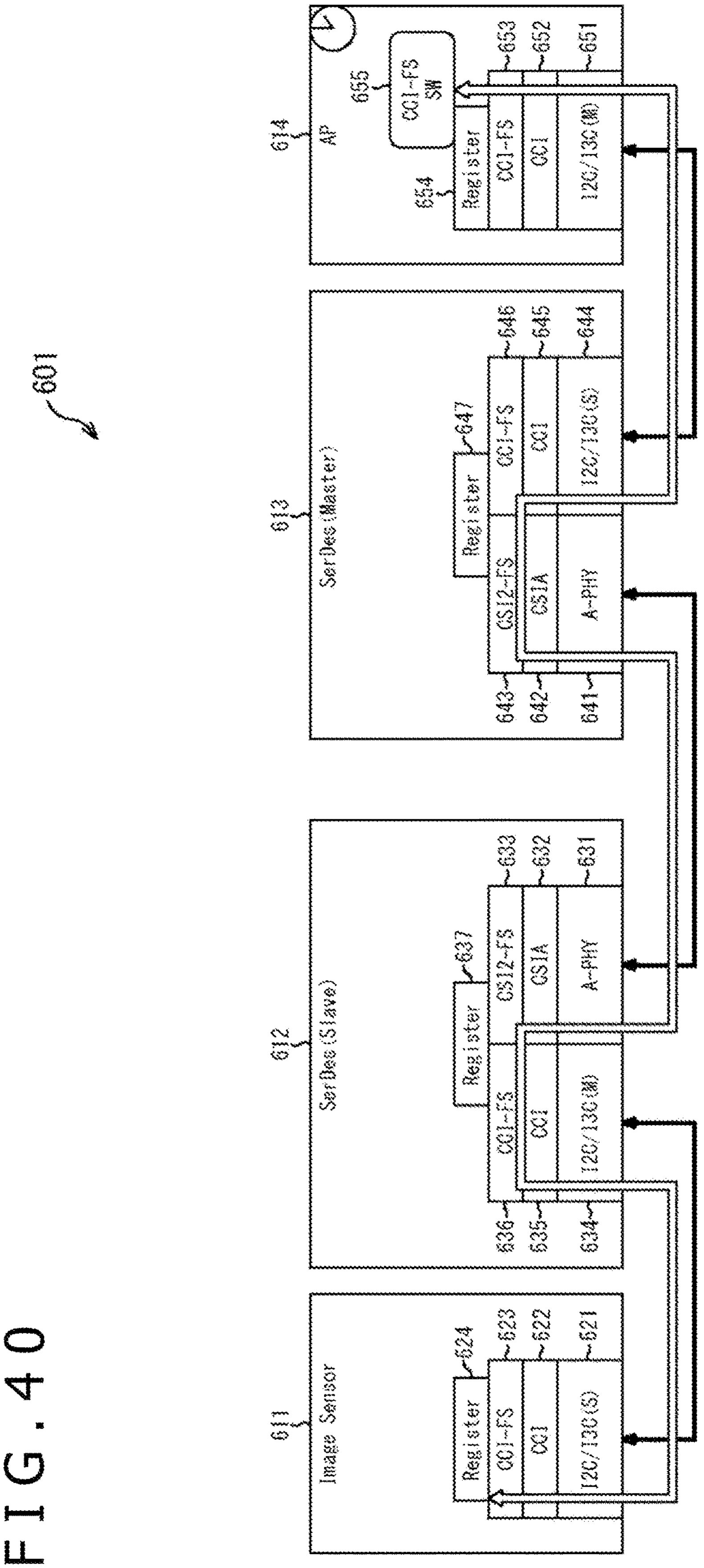
FIG. 40 is a block diagram depicting a configuration example of a communication system having SerDes connection of an image sensor and an application processor.

A communication system 601 depicted in FIG. 40 has a SerDes connection configuration in which an image sensor 611 and an application processor 614 are connected to each other via a SerDes device 612 which is disposed on a slave side and a SerDes device 613 which is disposed on a master side.

The image sensor 611 includes an I2C/I3C slave 621, a CCI processing section 622, a CSI2-FS processing section 623, and a register 624.

The slave-side SerDes device 612 includes an A-PHY processing section 631, a CSIA processing section 632, a CSI2-FS processing section 633, an I2C/I3C master 634, a CCI processing section 635, a CCI-FS processing section 636, and a register 637.

The master-side SerDes device 613 includes an A-PHY processing section 641, a CSIA processing section 642, a CSI2-FS processing section 643, an I2C/I3C slave 644, a CCI processing section 645, a CCI-FS processing section 646, and a register 647.

The application processor 614 includes an I2C/I3C master 651, a CCI processing section 652, a CCI-FS processing section 653, a register 654, and a CCI-FS switch 655.

It is to be noted that, in such a SerDes connection configuration as that depicted in FIG. 40, in a case where a CCI configuration or a CCI-FS configuration is implemented as an upper protocol, any other SerDes standard may be used. For example, a configuration of the extended packet header ePH, the extended packet footer ePF1, and the extended packet footer ePF0 illustrated in FIG. 41 is implemented in a Payload from an upper layer corresponding to an Application Layer or a layer thereunder, so that a variety of SerDes specifications such as PCIE, a USB, DisplayPort, an HDMI (registered trademark), LVDS, and FPD-LINK can be applied.

Transfer of a read command and read data in the communication system 601 will be explained with reference to FIGS. 41 to 49.

Figure 41:
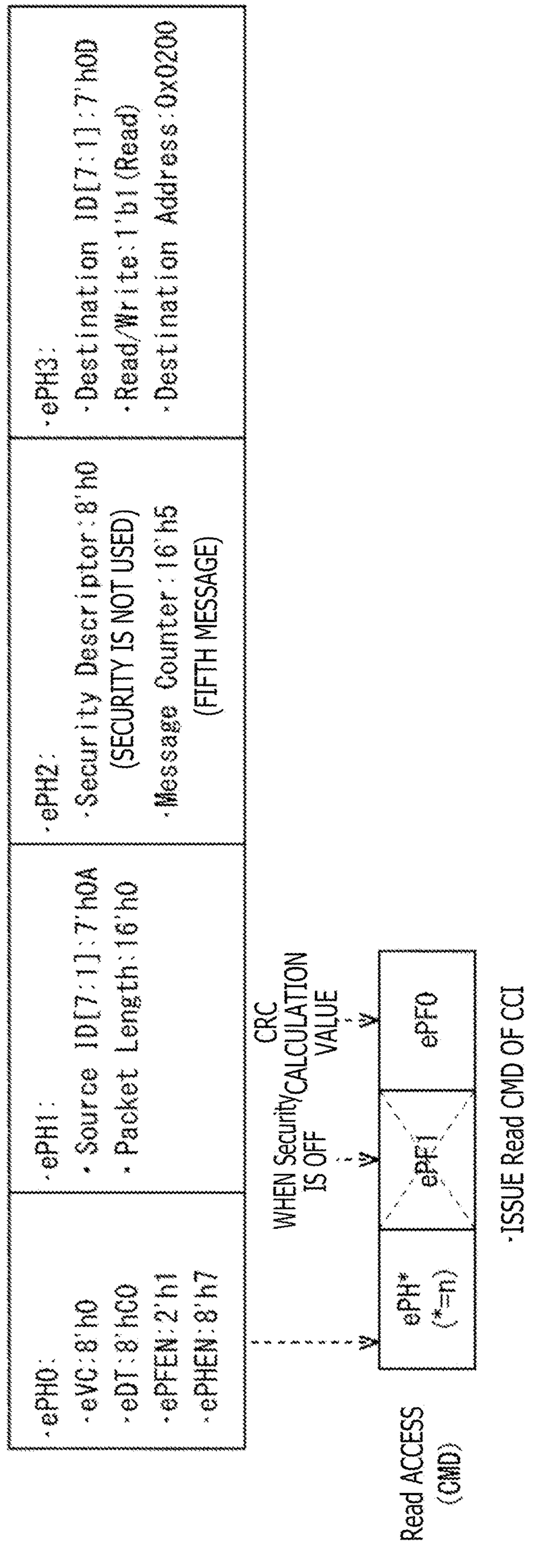
FIG. 41 is a diagram depicting one example of a packet configuration of a read command generated by the application processor side.

FIG. 41 depicts one example of a packet configuration of a read command that is generated by the CCI-FS processing section 653 of the application processor 614 when a read access is made.

As depicted in FIG. 41, the read command includes an extended packet header ePH*(*=n), an extended packet footer ePF1, and an extended packet footer ePF0. It is to be noted that the details thereof are identical to those in the read command previously explained with reference to FIG. 28.

In the application processor 614, a read command having the above-mentioned packet structure is generated by the CCI-FS processing section 653, and is supplied to the I2C/I3C master 651.

Figure 42:
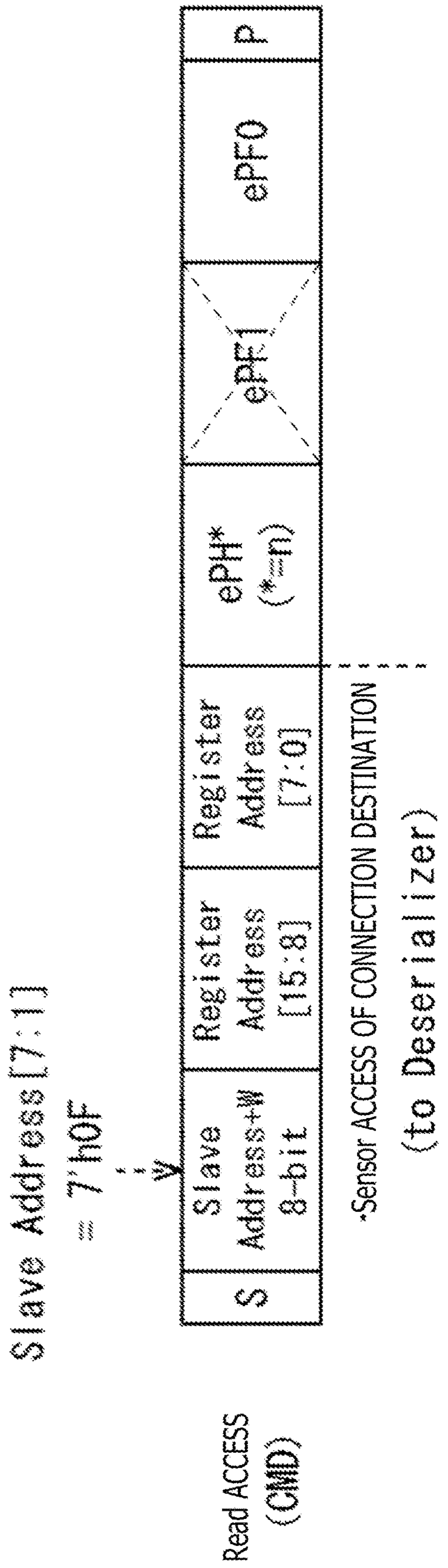
FIG. 42 is a diagram depicting one example of a packet configuration of a read command that is outputted by I2C/I3C.

FIG. 42 depicts one example of a packet configuration of a read command that is outputted from the I2C/I3C master 651 of the application processor 614 when a read access is made.

As depicted in FIG. 42, subsequent to the start condition S, the I2C/I3C master 651 transmits the sensor address of the connection destination. That is, the I2C/I3C master 651 transmits the address (Slave Address+W 8-bit) of the CCI processing section 645 of the master-side SerDes device 613 in the configuration depicted in FIG. 40. In FIG. 42, Slave Address[7:1]=7'h0F is defined as the address of the CCI processing section 645. Subsequent to this address, the register address (Register Address [15:8] and Register Address [7:0]) of the register 647 of the master-side SerDes device 613 are transmitted. The I2C/I3C master 651 transmits the extended packet header ePH*(*=n), the extended packet footer ePF1, and the extended packet footer ePF0, and then, at the end, transmits a stop condition P.

A read command having the above-described packet structure is transferred from the I2C/I3C master 651 of the application processor 614 through I2C/I3C. In the master-side SerDes device 613, the I2C/I3C slave 644 acquires the read command (the extended packet header ePH*(*=n), the extended packet footer ePF1, and the extended packet footer ePF0). The read command is supplied to the CCI processing section 645 indicated by Slave Address[7:1]=7'h0F, and then, is supplied to the A-PHY processing section 641 via the CCI-FS processing section 646, the CSI2-FS processing section 643, and the CSIA processing section 642.

Figure 43:
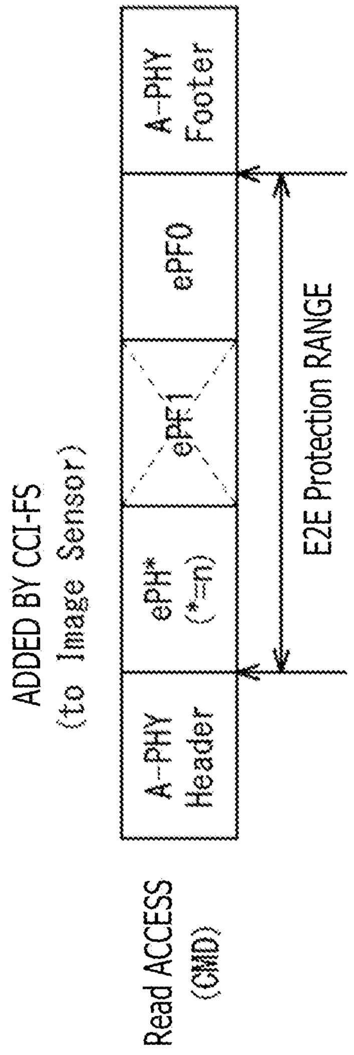
FIG. 43 is a diagram depicting one example or a packet configuration of a read command to transferred through A-PHY.

FIG. 43 depicts one example of a packet configuration of a read command that is outputted from the A-PHY processing section 641 of the master-side SerDes device 613 when a read access is made.

The A-PHY processing section 641 specifies, as the E2E protection range, the read command acquired by the I2C/I3C slave 644, and adds an A-PHY header and an A-PHY footer thereto, as depicted in FIG. 43. It is to be noted that the address of the CCI processing section 635 of the master-side SerDes device 613, which is Slave Address[7:1]=7'h0E, for example, is added to the extended packet header ePH*(*=n) by the CSI2-FS processing section 643.

An A-PHY transfer of a read command having the above-mentioned packet structure is conducted by the A-PHY processing section 641 of the master-side SerDes device 613. In the slave-side SerDes device 612, the A-PHY processing section 631 removes the A-PHY header and the A-PHY footer from the read command. The read command is supplied to the CCI processing section 635 having the slave address "7'h0E" indicated by a Destination ID, via the CSIA processing section 632, the CSI2-FS processing section 633, and the CCI-FS processing section 636, and then, is supplied to the I2C/I3C master 634.

Figure 44:
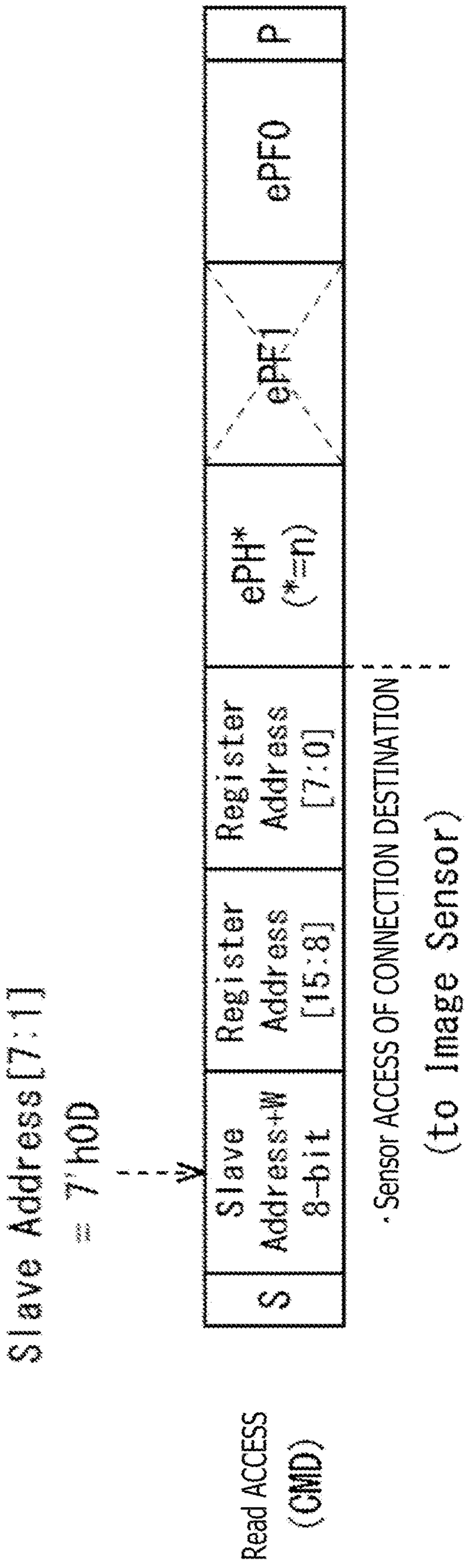
FIG. 44 is a diagram depicting one example of a packet configuration of read data generated by a slave-side SerDes device.

FIG. 44 depicts one example of a packet configuration of a read command that is outputted from the I2C/I3C master 634 when a read access is made.

The I2C/I3C master 634 transmits, subsequent to a start condition S, a sensor address of the connection destination as illustrated in FIG. 44. That is, the I2C/I3C master 634 transmits an address (Slave Address+W 8-bit) of the CCI processing section 622 of the image sensor 611 in the configuration illustrated in FIG. 40. In the example depicted in FIG. 44, the address of the CCI processing section 622 is Slave Address[7:1]=7'h0D. Subsequent to this address, a register address (Register Address [15:8] and Register Address [7:0]) of the register 624 of the image sensor 611 is transmitted. The I2C/I3C master 634 transmits the extended packet header ePH*(*=n), the extended packet footer ePF1, and the extended packet footer ePF0, and then, at the end, transmits a stop condition P.

A transfer of a read command having the above-described packet structure from the I2C/I3C master 634 of the slave-side SerDes device 612 is conducted through I2C/I3C. Then, in the image sensor 611, the I2C/I3C slave 621 acquires the read command (the extended packet header ePH*(*=n), the extended packet footer ePF1, and the extended packet footer ePF0). The read command is supplied to the CSI2-FS processing section 623 via the CCI processing section 622 at Slave Address[7:1]=7'h0D.

Figure 45:
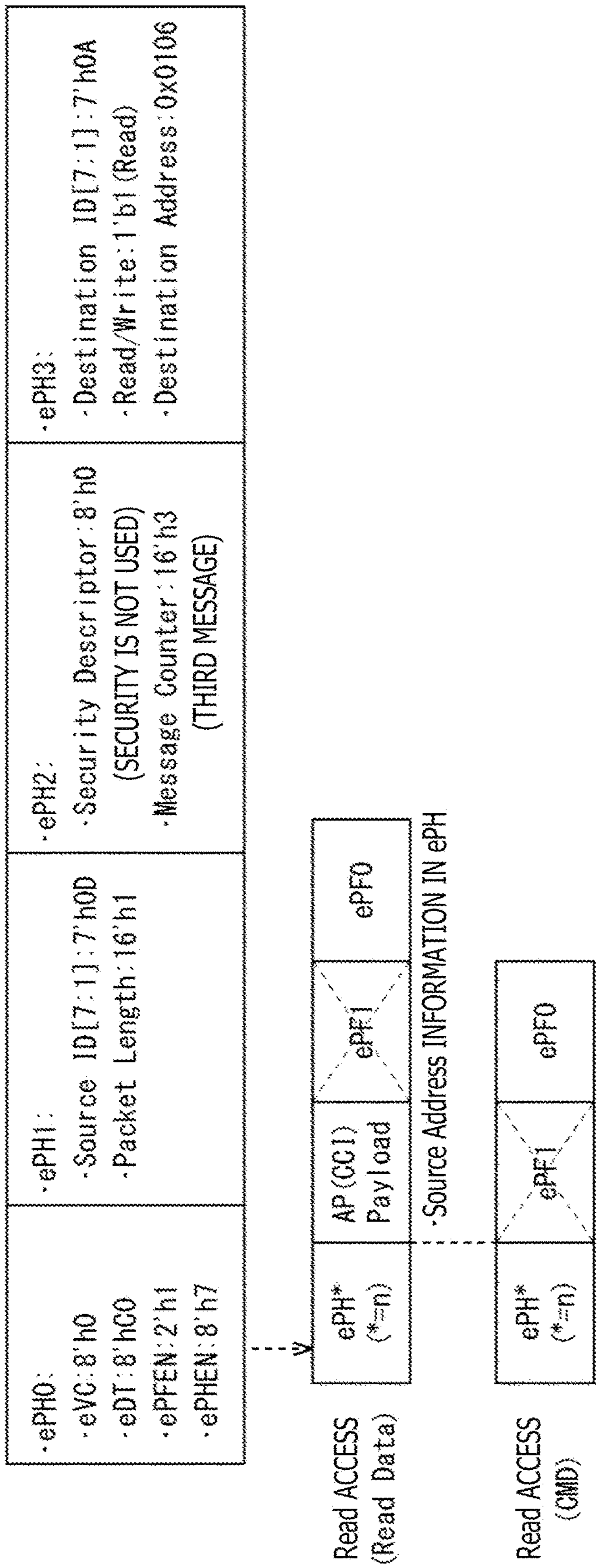
FIG. 45 is a diagram depicting one example of a packet configuration of a read command and read data on the image sensor side.

FIG. 45 depicts one example of a packet structure of a read command that is supplied to the CSI2-FS processing section 623 and read data that is generated by the CSI2-FS processing section 623 when a read access is made.

A read command having the packet structure illustrated in FIG. 41 as it is, that is, a read command specified as the E2E protection range in the A-PHY transfer, is supplied to the CSI2-FS processing section 623, as illustrated in FIG. 45.

The read data includes the extended packet header ePH*(*=n), the AP (CCI) payload, the extended packet footer ePF1, and the extended packet footer ePF0, as illustrated in FIG. 45. Further, the AP (CCI) payload stores a read data value read out from the address "0x0200" of the register 624 indicated by source address information (Destination Address) in the extended packet header ePH of the read command.

In the image sensor 611, read data having the above-described packet structure is generated by the CCI-FS processing section 623, and is supplied to the I2C/I3C slave 621 via the CCI processing section 622.

Figure 46:
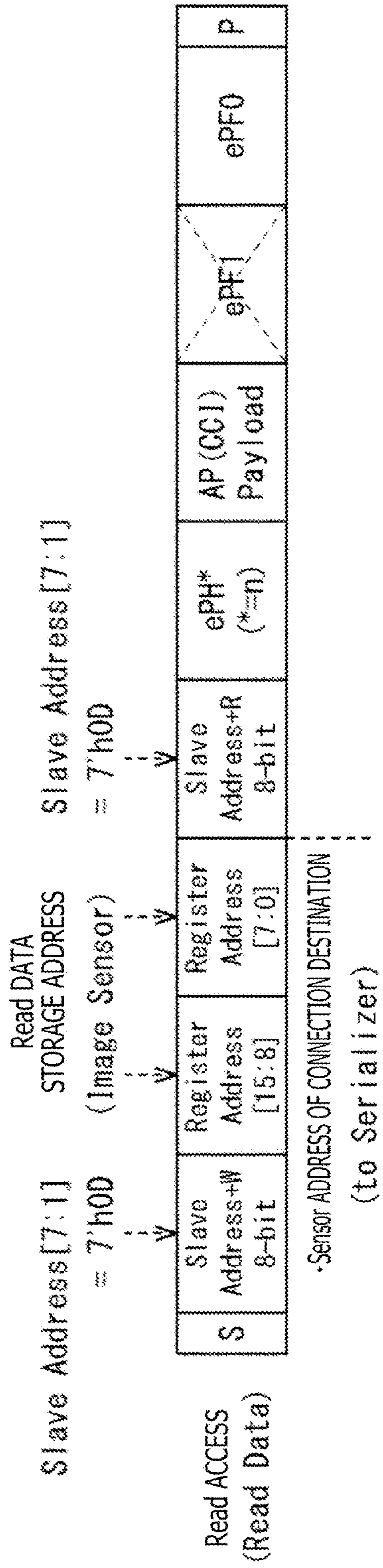
FIG. 46 is a diagram depicting one example of a packet configuration of read data that is outputted through I2C/I3C.

FIG. 46 depicts one example of a packet configuration of read data that is outputted from the I2C/I3C slave 621 of the image sensor 611 when a read access is made.

The I2C/I3C slave 621 transmits, subsequent to a start condition 3, a sensor address of a connection destination, as depicted in FIG. 46. That is, the I2C/I3C slave 621 transmits the address (Slave Address+W 8-bit) of the I2C/I3C master 634 of the slave-side SerDes device 612 in the configuration illustrated in FIG. 40. In FIG. 46, the address of the I2C/I3C master 634 is Slave Address [7:1]=7'h0D. Subsequent to this address, a storage address (the address of the register 624 of the image sensor 611) of the read data is transmitted, and the address (Slave Address+R 8-bit) of the I2C/I3C master 634 of the slave-side SerDes device 612 is transmitted. The I2C/I3C slave 621 transmits the extended packet header ePH*(*=n), the AP (CCI) payload, the extended packet footer ePF1, and the extended packet footer ePF0, and then, at the end, transmits a stop condition P.

A read command having the above-described packet structure is transferred from the I2C/I3C slave 621 of the image sensor 611 through I2C/I3C. In the slave-side SerDes device 612, the I2C/I3C master 634 acquires read data (the extended packet header ePH*(*=n), the AP (CCI) payload, the extended packet footer ePF1, and the extended packet footer ePF0). The read data is supplied to the CCI processing section 635 at Slave Address[7:1]=7'h0E, and then, is supplied to the A-PHY processing section 631 via the CCI-FS processing section 636, the CSI2-FS processing section 633, and the CSIA processing section 632.

Figure 47:
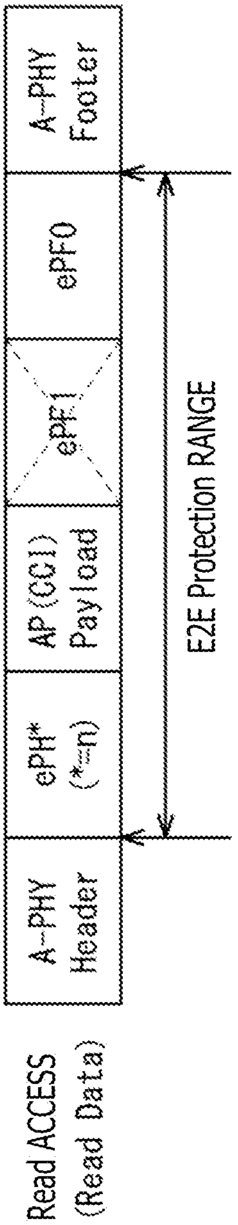
FIG. 47 is a diagram depicting one example of a packet configuration of read data to be transferred through A-PHY.

FIG. 47 depicts one example of a packet configuration of read data that is outputted from the A-PHY processing section 631 of the slave-side SerDes device 612 when a read access is made.

The A-PHY processing section 631 specifies, as an E2E protection range, the read data acquired by the I2C/I3C master 634, and adds an A-PHY header and an A-PHY footer to the read data, as depicted in FIG. 47.

An A-PHY transfer of read data having the above-described packet structure is conducted by the A-PHY processing section 631 of the slave-side SerDes device 612. Then, in the master-side SerDes device 613, the A-PHY processing section 641 removes the A-PHY header and the A-PHY footer from the read data. The resultant read data is supplied to the I2C/I3C slave 644 via the CSIA processing section 642, the CSI2-FS processing section 643, the CCI-FS processing section 646, and the CCI processing section 635.

Figure 48:
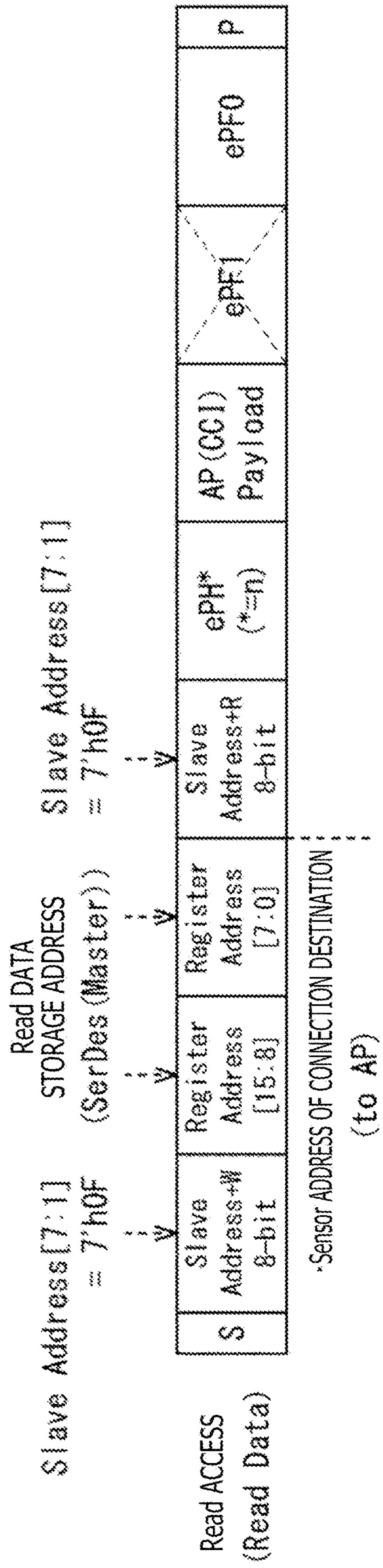
FIG. 48 is a diagram depicting one example of a packet configuration of read data that is outputted through I2C/I3C.

FIG. 48 depicts one example of a packet configuration of read data that is outputted from the I2C/I3C slave 644 of the master-side SerDes device 613 when a read access is made.

As illustrated in FIG. 48, the I2C/I3C slave 644 transmits, subsequent to a start condition S, the sensor address of the connection destination. That is, the I2C/I3C slave 644 transmits the address (Slave Address+W 8-bit) of the CCI processing section 635 of the master-side SerDes device 613 in the configuration illustrated in FIG. 40. In FIG. 48, Slave Address[7:1]=7'h4F is specified as the address of the CCI processing section 635. Subsequent to this address, the register address (Register Address [15:8] and Register Address [7:0]) of the register 647 of the master-side SerDes device 613 is transmitted, and the address (Slave Address+F 9-bit) of the CCI processing section 635 is transmitted. Next, the I2C/I3C slave 644 transmits the extended packet header ePH*(*=n), the AP (CCI) payload, the extended packet footer ePF1, and the extended packet footer ePF0, and then, at the end, transmits a stop condition P.

The read data having the above-described packet structure is transferred from the I2C/I3C slave 644 of the master-side SerDes device 613 through I2C/I3C. Then, in the application processor 614, the I2C/I3C master 651 acquires a read command (the extended packet header ePH*(*=n), the extended packet footer ePF1, and the extended packet footer ePF4), and supplies the read command to the CCI-FS processing section 653.

Figure 49:
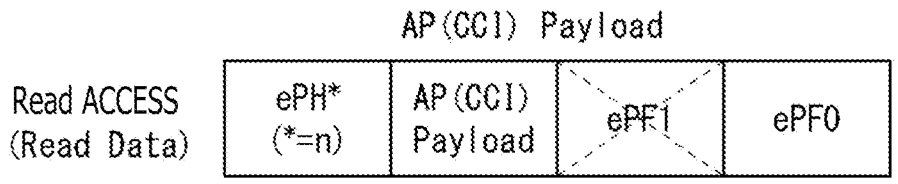
FIG. 49 is a diagram, depicting one example of a packet configuration of read data acquired by the application processor side.

FIG. 49 depicts one example of a packet structure of read data that is supplied to the CCI-FS processing section 653 when a read access is made.

As depicted in FIG. 49, read data having the packet structure depicted in FIG. 45, that is, the read data specified as the E2E protection range in the A-PHY transfer, is supplied to the CCI-FS processing section 653.

<Process Example of Communication Process>

A communication process using CCI-FS in the communication system 601 depicted in FIG. 40 will be explained with reference to the flowcharts in FIGS. 50 to 57.

Figure 50:
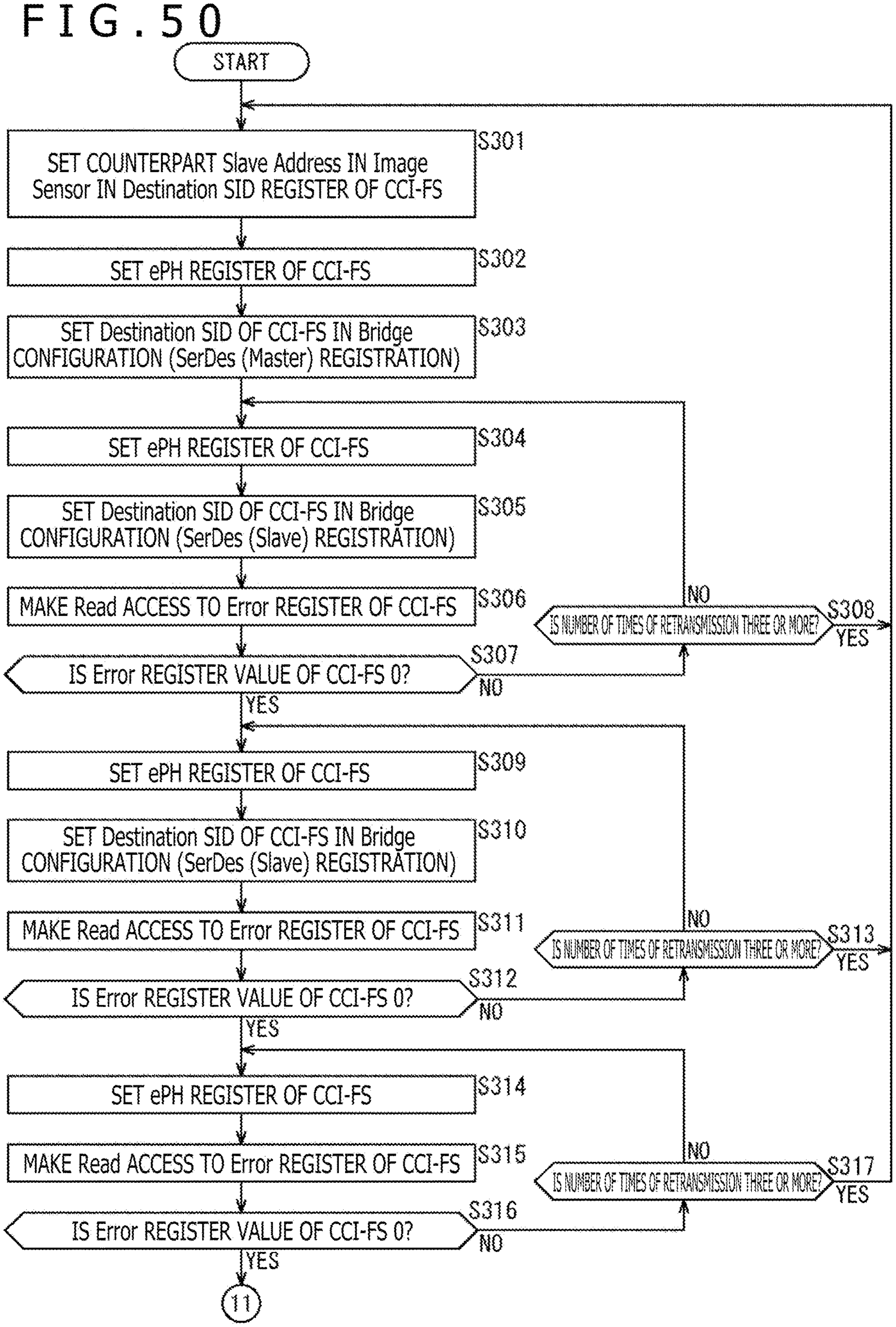
FIG. 50 is a flowchart for explaining initial setting and a check operation in a communication process using CCI-FS.

Initial setting and a check operation are performed in steps S301 to S317, as illustrated in FIG. 50.

In step S301, a slave address of the counterpart image sensor 611 is set in a Destination SID register of the CCI-FS processing section 653 of the application processor 614.

In step S302, an ePH register is set in the CCI-FS processing section 653 of the application processor 614.

In step S303, a Destination SID of the CCI-FS processing section 653 of the application processor 614 in a Bridge configuration is set, and the master-side SerDes device 613 is registered. Here, also Address, attribution, Timeout_no1 registers are similarly set, and thereafter, the similar setting is performed.

In step S304, an ePH register in the CCI-FS processing section 643 is set from the application processor 614 to the master-side SerDes device 613.

In step S305, a Destination SID of the CCI-FS processing section 643 in a Bridge configuration is set from the application processor 614 to the master-side SerDes device 613, and the slave-side SerDes device 612 is registered.

In step S306, a read access to an Error register in the CCI-FS processing section 643 is made from the application processor 614 to the master-side SerDes device 613.

In step S307, in the application processor 614, the CCI-FS processing section 653 determines whether or not the register value of the Error register in the CCI-FS processing section 643 of the master-side SerDes device 613 is 0, as a result of the read access made in step S306.

In a case where it is determined, in step S307, that the register value of the Error register in the CCI-FS processing section 643 of the master-side SerDes device 613 is not 0 (is a value other than 0), the process proceeds to step S308.

In step S308, in the application processor 614, the CCI-FS processing section 653 determines whether or not the number of times of retransmission is three or more. In a case where the number of times of retransmission is determined not to be three or more (is one or two), the process returns to step S304, and thereafter, the similar processes are repeated.

On the other hand, in a case where it is determined, in step S307, that the register value of the Error register in the CCI-FS processing section 643 of the master-side SerDes device 613 is 0, the process proceeds to step S309.

In step S309, an ePH register of the CCI-FS processing section 636 is set from the application processor 614 to the slave-side SerDes device 612.

In step S310, a Destination SID of the CCI-FS processing section 636 in a Bridge configuration is set from the application processor 614 to the slave-side SerDes device 612, and the slave-side SerDes device 612 is registered.

In step S311, a read access to an Error register in the CCI-FS processing section 636 is made from the application processor 614 to the slave-side SerDes device 612.

In step S312, in the application processor 614, the CCI-FS processing section 653 determines whether or not the register value of the Error register in the CCI-FS processing section 636 of the slave-side SerDes device 612 is 0 as a result of the read access made in step S311.

In a case where it is determined, in step S312, that the register value of the Error register in the CCI-FS processing section 636 of the slave-side SerDes device 612 is not 0 (is a value other than 0), the process proceeds to step S313.

In step S313, in the application processor 614, the CCI-FS processing section 653 determines whether or not the number of times of retransmission is three or more. In a case where the number of times of retransmission is determined not to be three or more (is one or two), the process returns to step S309, and thereafter, the similar processes are repeated.

On the other hand, in a case where it is determined, in step S312, that the register value of the Error register in the CCI-FS processing section 636 of the slave-side SerDes device 612 is 0, the process proceeds to step S314.

In step S314, an ePH register in the CCI-FS processing section 623 is set from the application processor 614 to the image sensor 611.

In step S315, a read access to the Error register in the CCI-FS processing section 623 is made from the application processor 614 to the image sensor 611.

In step S316, in the application processor 614, the CCI-FS processing section 653 determines whether or not the register value of the Error register in the CCI-FS processing section 623 of the image sensor 611 is 0 as a result of the read access made in step S315.

In a case where it is determined, in step S316, that the register value of the Error register in the CCI-FS processing section 6:3 of the image sensor 611 is not 0 (is a value other than 0), the process proceeds to step S317.

In step S317, in the application processor 614, the CCI-FS processing section 653 determines whether or not the number of times of retransmission is three or more. In a case where it is determined that the number of times of retransmission is not three or more (is one or two), the process returns to step S314. Thereafter, the similar processes are repeated.

Here, in a case where it is determined, in step S308, step S313, or step S317, that the number of times of retransmission is three or more, the process returns to step S301. Thereafter, the similar processes are repeated.

On the other hand, in a case where it is determined, in step S316, that the register value of the Error register in the CCI-FS processing section 623 of the image sensor 611 is 0, the process proceeds to step S318.

Figure 51:
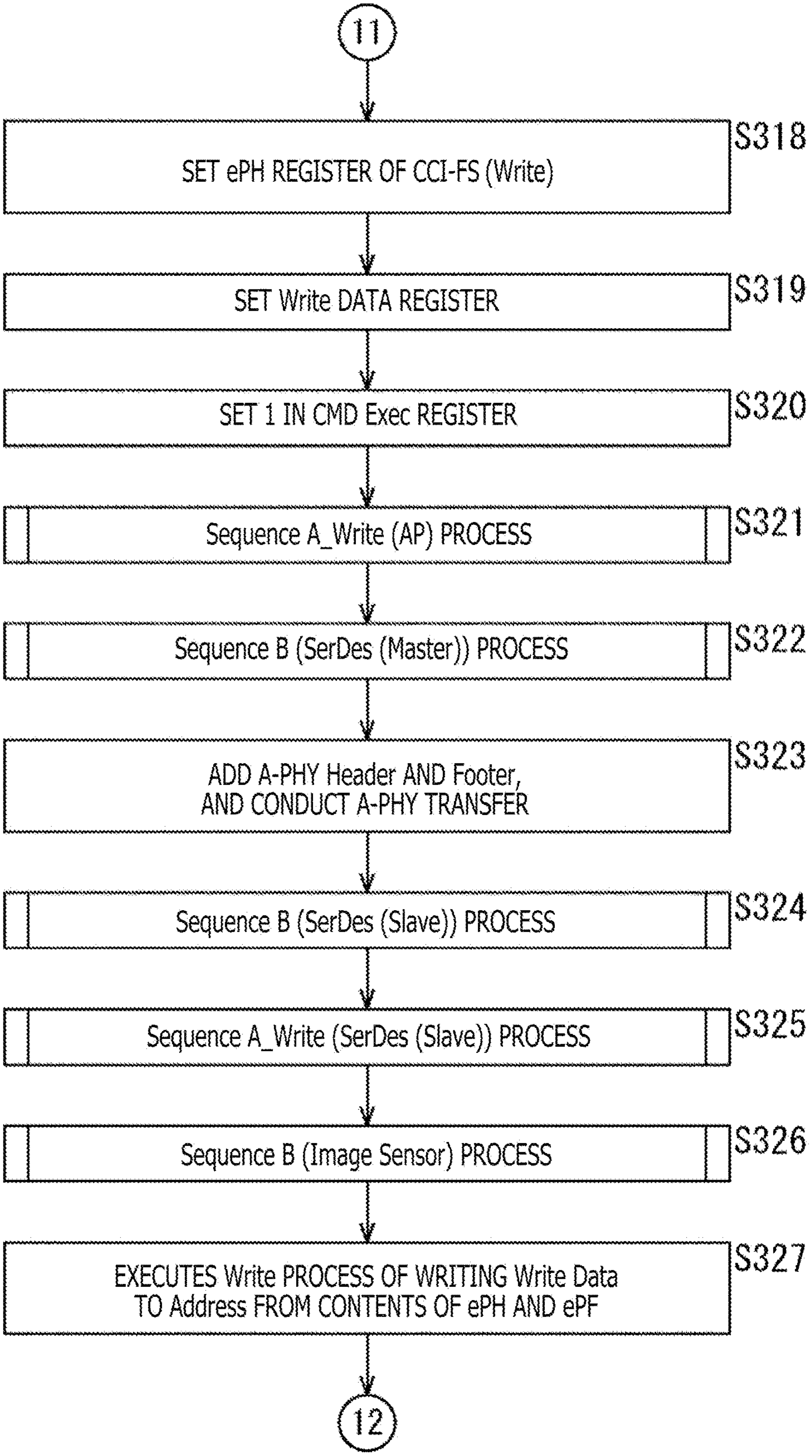
FIG. 51 is a flowchart for explaining a write operation using CCI-FS.

A write operation using CCI-FS is performed in steps S318 to S327, as illustrated in FIG. 51.

In step S318, the CCI-FS processing section 653 of the application processor 614 sets an ePH register to execute a write operation.

In step S319, the CCI-FS processing section 653 of the application processor 614 sets a write data register.

In step S320, the CCI-FS processing section 653 of the application processor 614 sets 1 in the command execution register, and issues a write command.

In step S321, the application processor 614 executes a Sequence A_Write (AP) process which will be explained with reference to FIG. 53.

Figure 56:
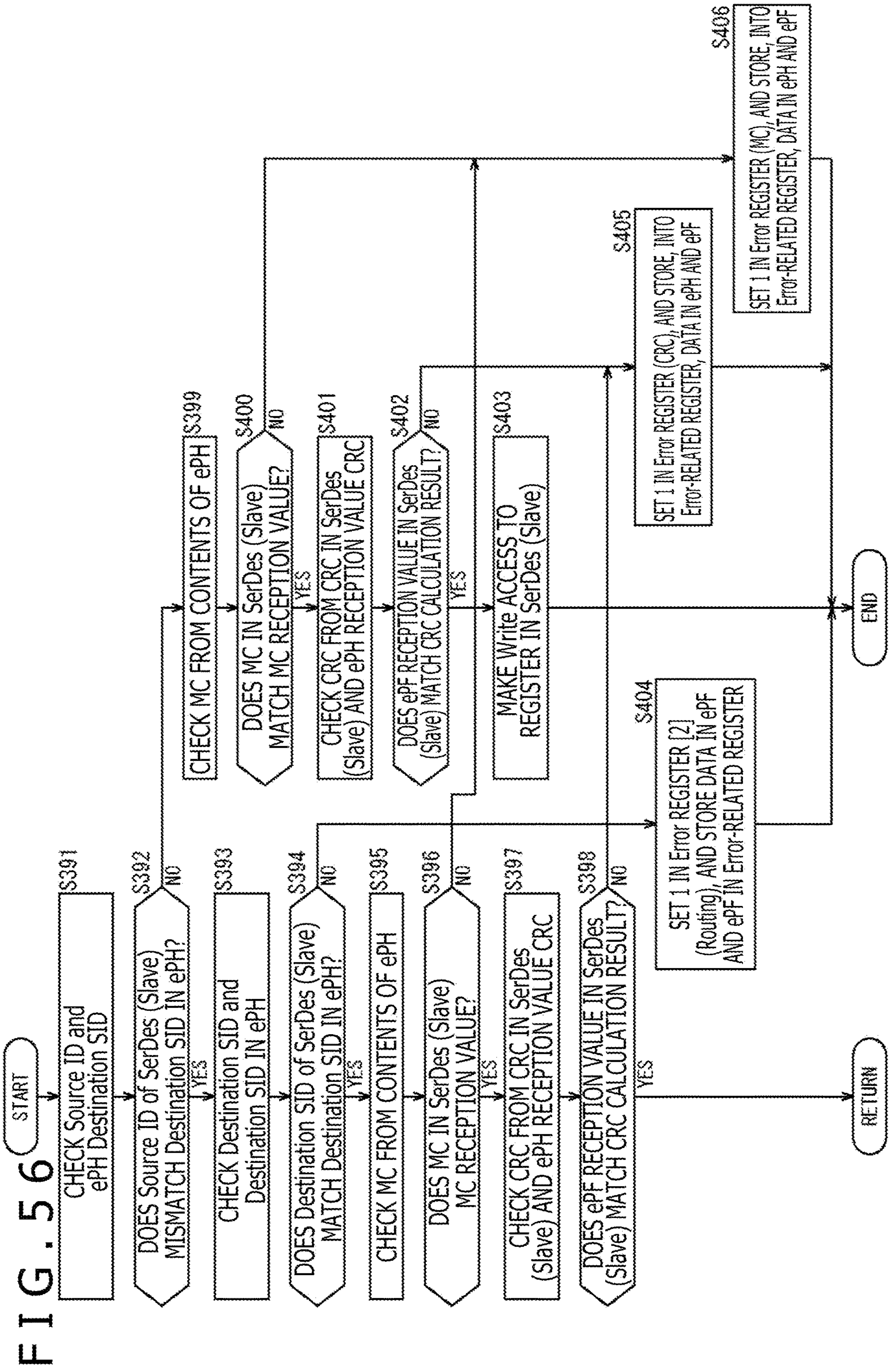
FIG. 56 is a flowchart for explaining a Sequence B (SerDes (Slave)) process.

In step S322, the master-side SerDes device 613 executes a Sequence B (SerDes(Master)) process which will be explained with reference to FIG. 56. It is to be noted that, although FIG. 56 illustrates the Sequence B (SerDes(Slave)) process that is executed in the slave-side SerDes device 612, the similar process can be executed by the corresponding blocks in the master-side SerDes device 613 as well.

In step S323, from extended DT in the extended packet header ePH of the master-side SerDes device 613, the A-PHY processing section 641 adds an A-PHY header and an A-PHY footer, and conducts an A-PHY transfer via the CSI2-FS processing section 643 and the CSIA processing section 642.

In step S324, the slave-side SerDes device 612 executes a Sequence B (SerDes(Slave)) process which will be explained with reference to FIG. 56.

In step S325, the slave-side SerDes device 612 executes a Sequence A_Write (SerDes(Slave)) process which will be explained with reference to FIG. 53. It is to be noted that, although FIG. 53 illustrates the Sequence A_Write (AP) process that is executed in the application processor 614, the similar process can be executed by the corresponding blocks in the slave-side SerDes device 612 as well.

In step S326, the image sensor 611 executes a Sequence B (Image Sensor) process which will be explained later with reference to FIG. 56. It is to be noted that, although FIG. 56 illustrates the Sequence B (SerDes(Slave)) process that is executed in the slave-side SerDes device 612, the similar process can be executed by the corresponding blocks in the image sensor 611 as well.

In step S327, in the image sensor 611, the CCI-FS processing section 623 executes a write process of writing write data to the address of the register 624 on the basis of the contents of the extended packet header ePH and the extended packet footer ePF. Thereafter, the process proceeds to step S328.

Figure 52:
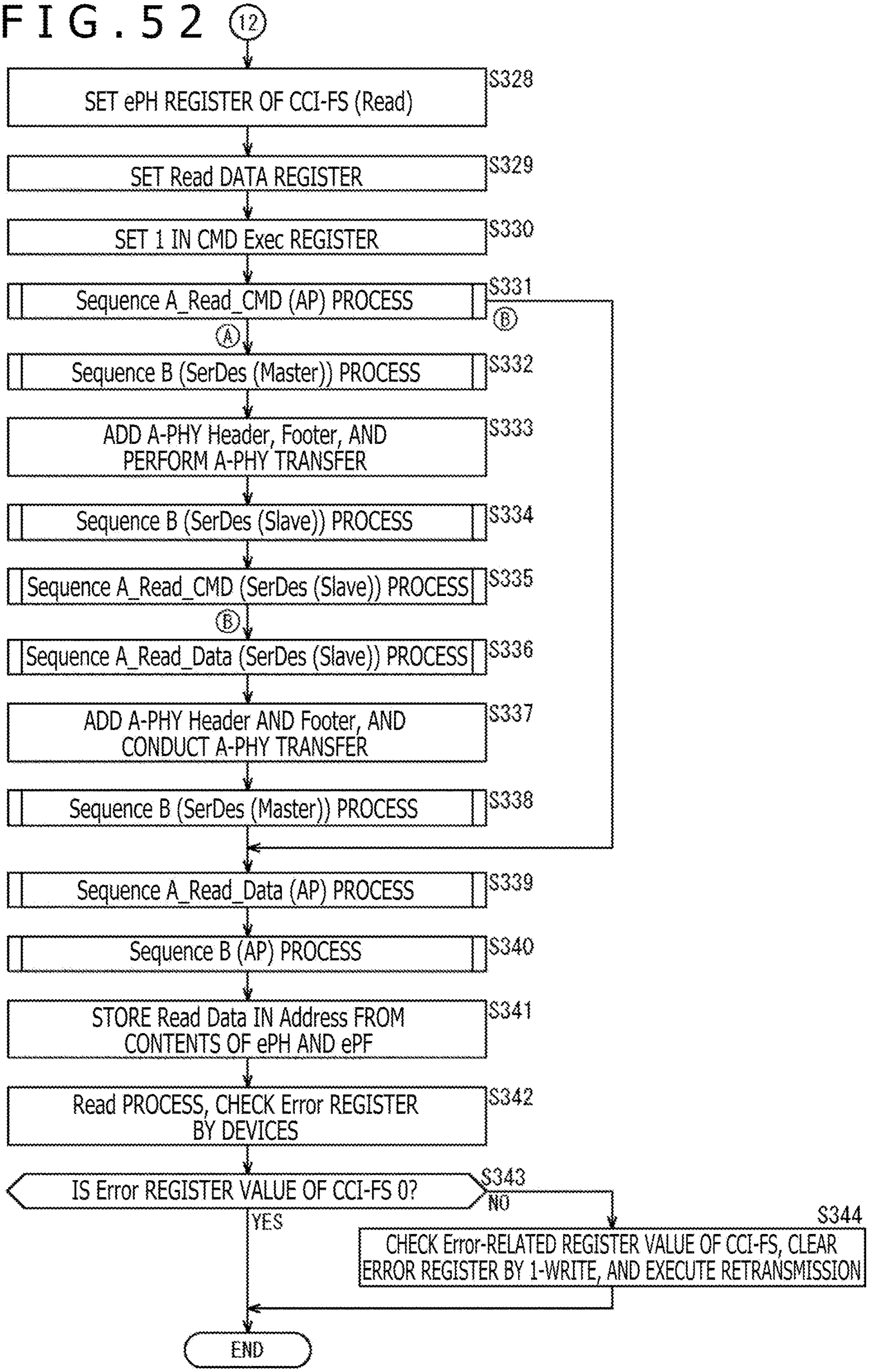
FIG. 52 is a flowchart for explaining a read operation using CCI-FS.

A read operation using CCI-FS is executed in steps S328 to S344, as illustrated in FIG. 52.

In step S328, the CCI-FS processing section 653 of the application processor 614 sets an ePH register to execute a read operation.

In step S329, the CCI-FS processing section 653 of the application processor 614 sets a read data register.

In step S330, the CCI-FS processing section 653 of the application processor 614 sets 1 in a command execution register to issue a read command.

In step S331, the application processor 614 executes a Sequence A_Read_CMD (AP) process which will be explained with reference to FIG. 54. Here, in the Sequence A_Read_CMD (AP) process, two branch processes are executed in parallel. According to a branch A, the process proceeds to step S332. According to a branch B, the process proceeds to step S339.

In step S332, the master-side SerDes device 613 executes a Sequence B (SerDes(Master)) process which will be explained later with reference to FIG. 56. It is to be noted that, although FIG. 56 illustrates the Sequence B (SerDes (Slave)) process which is executed in the slave-side SerDes device 612, the similar process can be executed by the corresponding blocks in the master-side SerDes device 613 as well.

In step S333, from extended DT in the extended packet header ePH of the master-side SerDes device 613, the A-PHY processing section 641 adds an A-PHY header and an A-PHY footer, and conducts an A-PHY transfer via the CSI2-FS processing section 643 and the CSIA processing section 642.

In step S334, the slave-side SerDes device 612 executes a Sequence B (SerDes(Slave)) process which will be explained later with reference to FIG. 56.

In step S355, the slave-side SerDes device 612 executes a Sequence A_Read_CMD (SerDes(Slave)) process which will be explained with reference to FIG. 54. It is to be noted that, although FIG. 54 illustrates the Sequence A_Read_CMD (AP) process which is executed in the application processor 614, the similar process can be executed by the corresponding blocks in the slave-side SerDes device 612. Here, in the Sequence A_Read_CMD (SerDes(Slave)) process, there are two branch processes, and the process does not proceed to a branch A but proceeds to step S336 according to a branch B.

Figure 57:
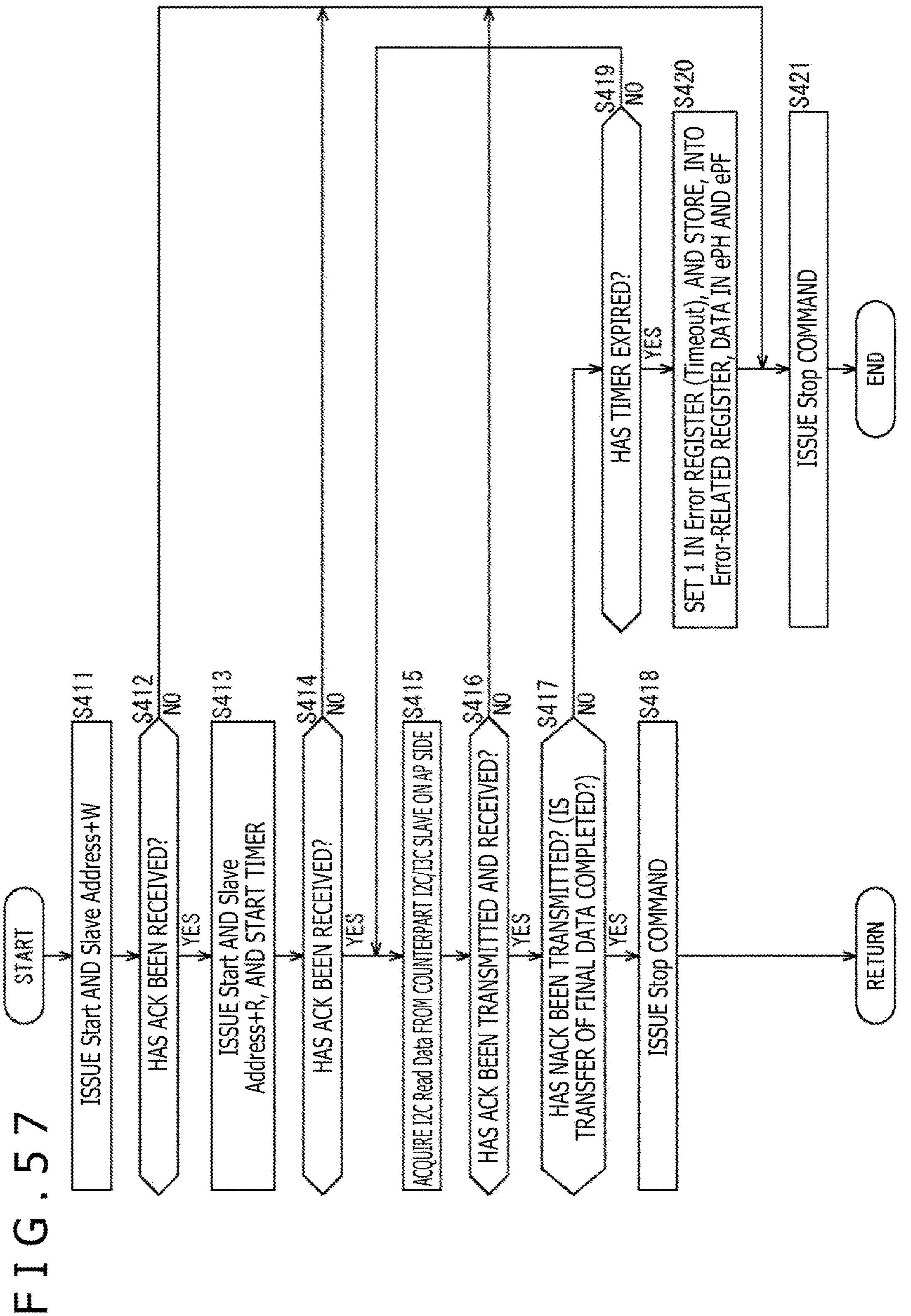
FIG. 57 is a flowchart for explaining a Sequence A_Read_Data (AP) process.
Figure 61:
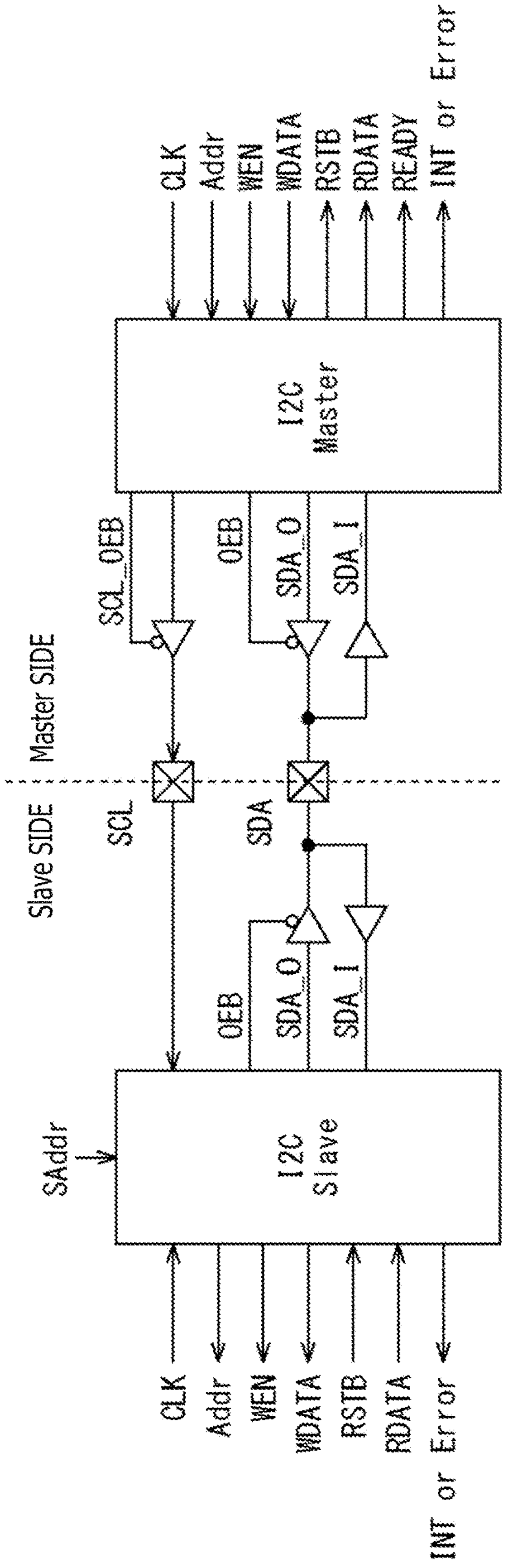
FIG. 61 is a block diagram depicting a hardware configuration example of a conventional I2C.
Figure 62:
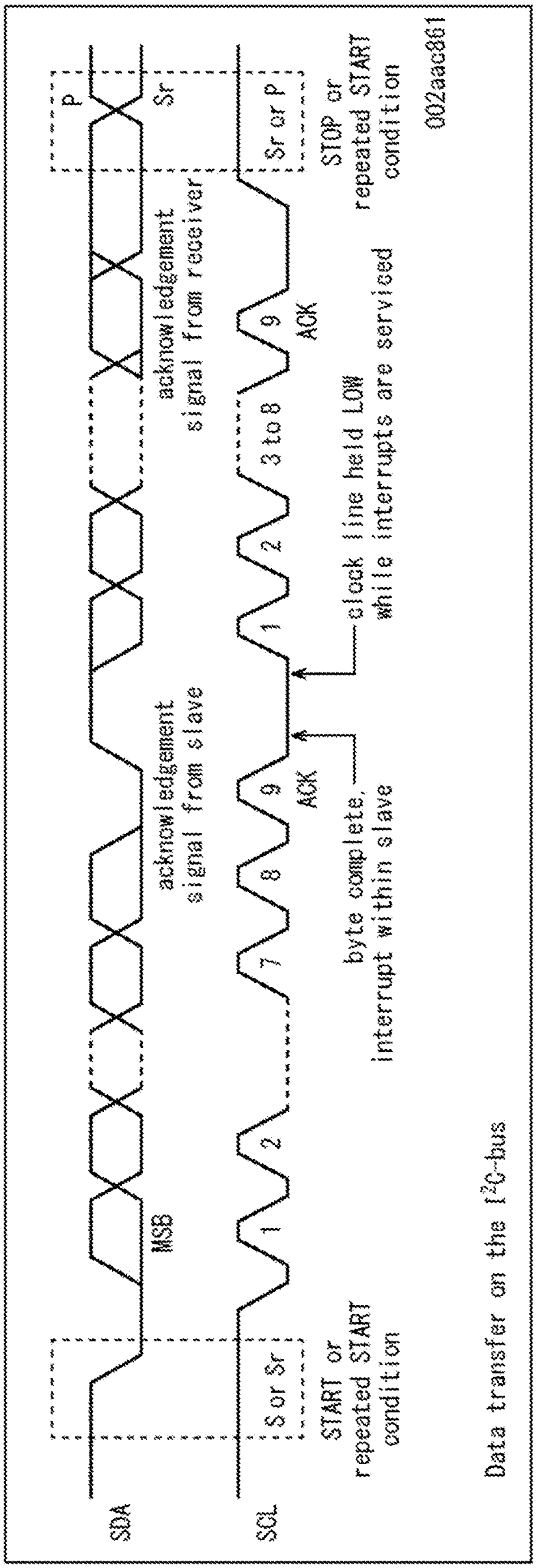
FIG. 62 is a diagram depicting one example of a waveform of a data transfer through an I2C bus.

In step S336, the slave-side SerDes device 612 executes a Sequence A_Read_Data (SerDes(Slave)) process which will be explained later with reference to FIG. 57. It is to be noted that, although FIG. 57 illustrates the Sequence A_Read_Data (AP) process which is executed in the application processor 614, the similar process can be executed by the corresponding blocks in the slave-side SerDes device 612 as well.

In step S337, from extended DT in the extended packet header ePH of the slave-side SerDes device 612, the A-PHY processing section 631 adds an A-PHY header and an A-PHY footer, and conducts an A-PHY transfer via the CSI2-FS processing section 633 and the CSIA processing section 632.

In step S339, the master-side SerDes device 613 executes a Sequence B (SerDes(Master)) process which will be explained later with reference to FIG. 56. It is to be noted that, although FIG. 56 illustrates the Sequence B (SerDes (Slave)) process that is executed in the slave-side SerDes device 612, the similar process can be executed by the corresponding blocks in the master-side SerDes device 613 as well.

In step S339, the application processor 614 executes a Sequence A_Read_Data (AP) process which will be explained later with reference to FIG. 57.

In step S340, the application processor 614 executes a Sequence B (AP) process which will be explained later with reference to FIG. 56. It is to be noted that, although FIG. 56 illustrates the Sequence B (SerDes(Slave)) process that is executed in the slave-side SerDes device 612, the similar process can be executed by the corresponding blocks in the application processor 614 as well.

In step S341, in the application processor 614, the CCI-FS processing section 653 stores the read data from the contents of the extended packet header ePH and the extended packet footer ePF into the address of the register 654.

In step S342, the above-mentioned read process, Error register check is conducted by the image sensor 611, the slave-side SerDes device 612, the master-side SerDes device 613, and the application processor 614.

In step S343, in the image sensor 611, the devices (the slave-side SerDes device 612, the master-side SerDes device 613, and the application processor 614) each determine whether or not the register value of the Error register in the respective CCI-FS processing section is 0.

In a case where it is determined, in step S343, that not all the register values in the CCI-FS processing sections are 0 (a register value being not 0 is included), the process proceeds to step S344.

In step S344, an Error-related register value in the CCI-FS processing section having a non-zero register value is checked, the Error register is cleared by 1-write, and a retransmission process is executed.

On the other hand, in a case where it is determined, in step S343, that all the register values of the CCI-FS processing sections are 0, or after the process in step S344, the process is finished.

Figure 53:
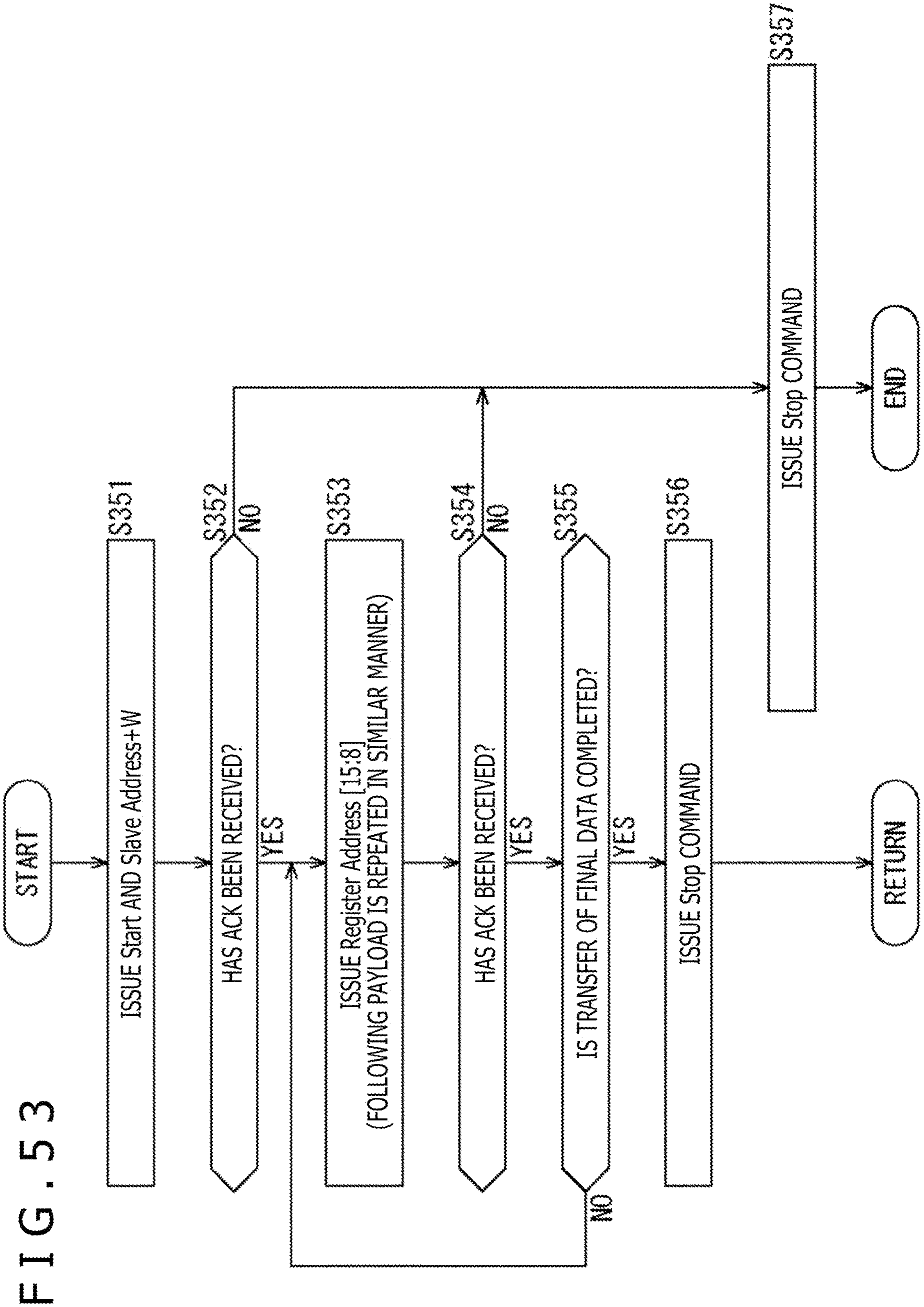
FIG. 53 is a flowchart for explaining a Sequence A_Write (AP) process.

FIG. 53 is a flowchart for explaining the Sequence A_Write (AP) process which is executed in step S321 in FIG. 51. It is to be noted that, although FIG. 53 illustrates a process which is executed in the application processor 614, the Sequence A_Write (SerDes(Slave)) process in step S325 in FIG. 51 is also executed in a similar manner.

In step S351, in the application processor 614, the I2C/I3C master 651 issues a start command and a slave address (Slave Address+W 8-bit depicted in FIG. 42).

In step S352, in the application processor 614, the I2C/I3C master 651 determines whether or not an ACK response has been received from the I2C/I3C slave 644 of the master-side SerDes device 613. In a case where it is determined, in step S352, that an ACK response has been received from the I2C/I3C slave 644 of the master-side SerDes device 613, the process proceeds to step S353.

In step S353, in the application processor 614, the I2C/I3C master 651 issues a register address (Register Address [15:8] depicted in FIG. 42). Here, each time the process in step S353 is repeated, a payload subsequent to this register address is transmitted, as illustrated in FIG. 42.

In step S354, the application processor 614 determines whether or not the I2C/I3C master 651 has received an ACK response from the I2C/I3C slave 644 of the master-side SerDes device 613. In a case where it is determined, in step S354, that the I2C/I3C master 651 has received an ACK response from the I2C/I3C slave 644 of the master-side SerDes device 613, the process proceeds to step S355.

In step S355, in the application processor 614, the I2C/I3C master 651 determines whether or not a transfer of the final data is completed. It is determined, in step S355, that a transfer of the final data is not completed, the process returns to step S353, and thereafter, the similar processes are repeated.

On the other hand, in a case where it is determined, in step S355, that a transfer of the final data is completed, the process proceeds to step S356. In step S356, in the application processor 614, the I2C/I3C master 651 issues a stop command. As a result, the Sequence A_Write (AP) process is finished, and the process returns to step S322 in FIG. 51.

On the other hand, in a case where it is determined, in step S352 or S354, that an ACK response has not been received from the I2C/I3C slave 644 of the master-side SerDes device 613, the process proceeds to step S357. In step S357, in the application processor 614, the I2C/I3C master 651 issues a stop command. In this case, the Sequence A_Write (AP) process is finished, and further, the communication process itself is finished.

Figure 54:
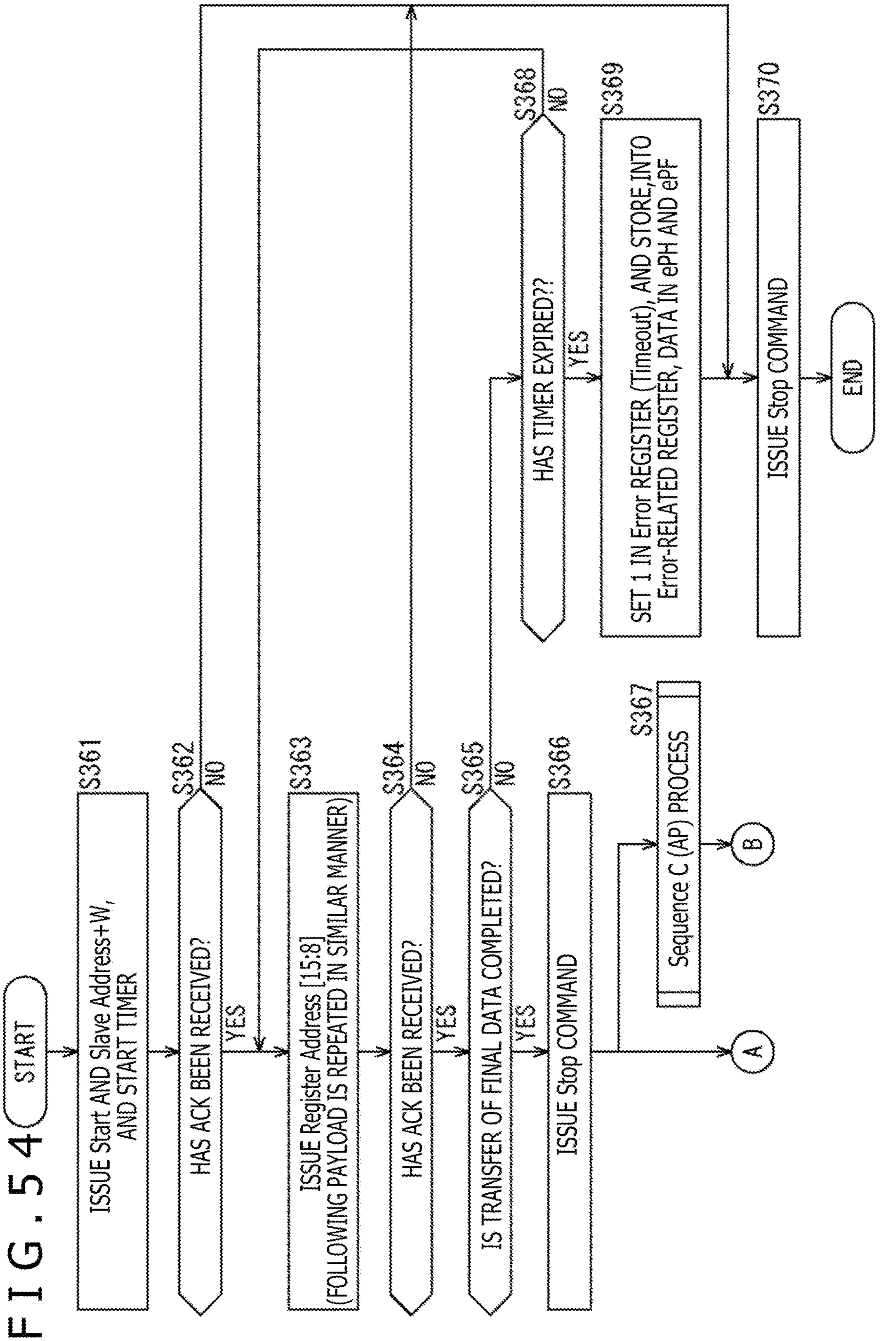
FIG. 54 is a flowchart for explaining a Sequence A_Read_CMD (AP) process.

FIG. 54 is a flowchart for explaining the Sequence A_Read_CMD (AP) process in step S331 in FIG. 52. It is to be noted that, although FIG. 54 illustrates a process that is executed in the application processor 614, the Sequence A_Read_CMD (SerDes(Slave)) process in step S335 in FIG. 52 is executed in a similar manner as well.

In step S361, in the application processor 614, the I2C/I3C master 651 issues a start command and a slave address (Slave Address+W 8-bit depicted in FIG. 42), and starts a timer.

In step S362, in the application processor 614, the I2C/I3C master 651 determines whether or not an ACK response has been received from the I2C/I3C slave 644 of the master-side SerDes device 613. In a case where it is determined, in step S362, that an ACK response has been received from the I2C/I3C slave 644 of the master-side SerDes device 613, the process proceeds to step S363.

In step S363, in the application processor 614, the I2C/I3C master 651 issues a register address (Register Address [15:8] depicted in FIG. 42). Here, each time the process in step S363 is repeated, transmission of a payload subsequent to this register address is transmitted, as illustrated in FIG. 42.

In step S364, in the application processor 614, the I2C/I3C master 651 determines whether or not an ACK response from the I2C/I3C slave 644 of the master-side SerDes device 613 has been received.

In a case where it is determined, in step S364, that an ACK response from the I2C/I3C slave 644 of the master-side SerDes device 613 has been received, the process proceeds to step S365.

In step S365, in the application processor 614, the I2C/I3C master 651 determines whether or not a transfer of the final data is completed.

In a case where it is determined, in step S365, that a transfer of the final data is completed, the process proceeds to step S366.

In step S366, in the application processor 614, the I2C/I3C master 651 issues a stop command. Thereafter, the process is divided into two branches. According to a branch A, the process proceeds to step S332 in FIG. 52. According to a branch B, the Sequence C (AP) process (see FIG. 55 which will be explained later) is executed in step S367, and then, the process proceeds to step S339 in FIG. 52.

On the other hand, in a case where it is determined, in step S365, a transfer of the final data is not completed, the process proceeds to step S369.

In step S368, in the application processor 614, the I2C/I3C master 651 determines whether or not the timer started in step S361 has expired. In a case where it is determined, in step S360, that the timer has not expired, the process returns to step S363, and thereafter, the similar processes are repeated.

On the other hand, in a case where it is determined, in step S368, that the timer has expired, the process proceeds to step S369.

In step S369, the application processor 614 sets 1 in the Error register (Timeout), and stores, into the Error-related register, data in the extended packet header ePH and the extended packet footer ePF.

After the process in step S369 is executed or in a case where it is determined, in step S362 or S364, that an ACK response has not been received from the I2C/I3C slave 644 of the master-side SerDes device 613, the process proceeds to step S370.

In step S370, in the application processor 614, the I2C/I3C master 651 issues a stop command. In this case, the Sequence A_Read_CMD (AP) process is finished, and further, the communication process itself is finished.

Figure 55:
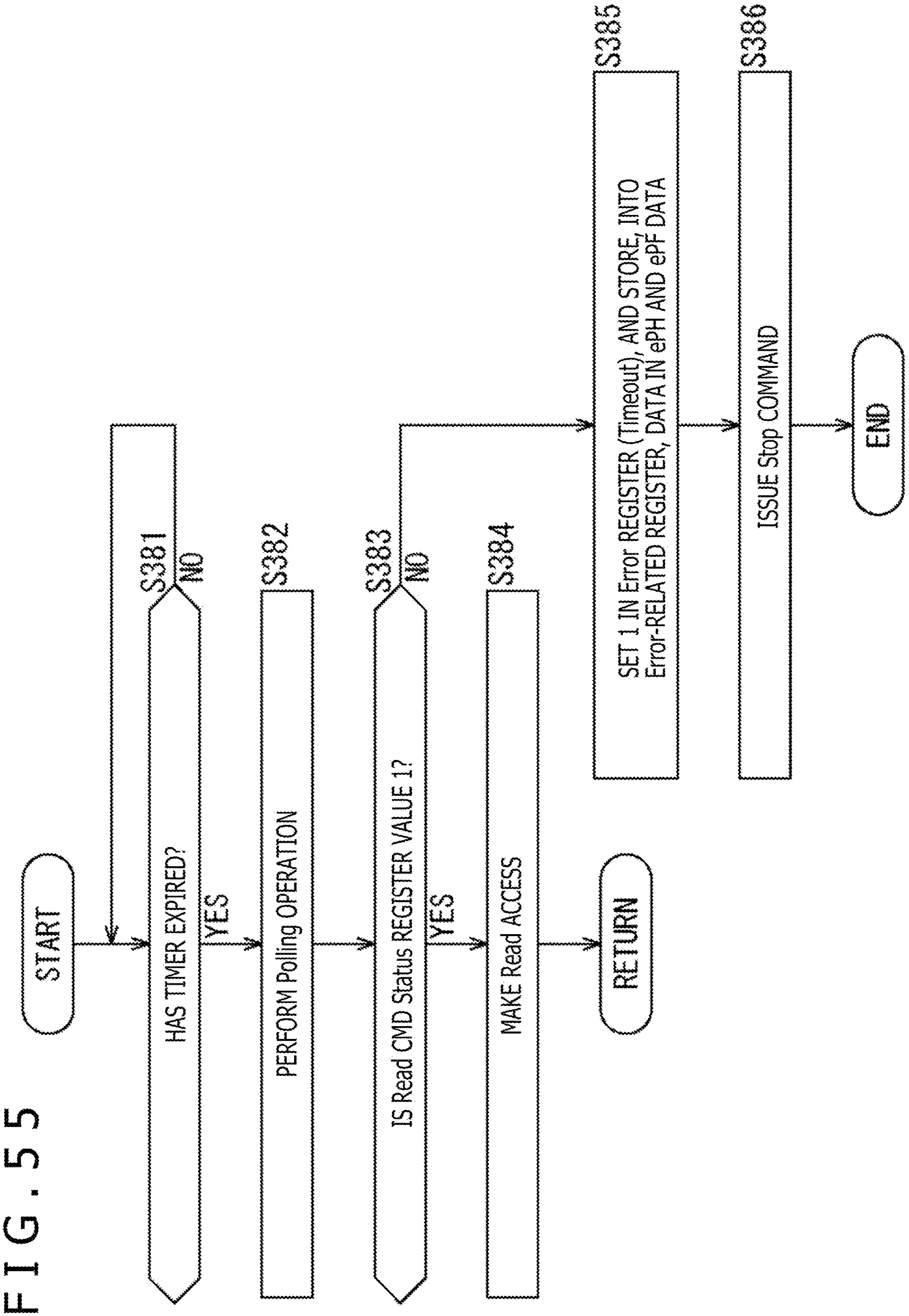
FIG. 55 is a flowchart for explaining a Sequence C (AP) process.

FIG. 55 is a flowchart for explaining a Sequence C (AP) process that is executed in step S367 in FIG. 54. It is to be noted that, although FIG. 55 illustrates the process that is executed in the application processor 614, the similar process can be executed in the slave-side SerDes device 612 as well.

In step S381, in the application processor 614, the I2C/I3C master 651 determines whether or not the timer started in step S361 in FIG. 54 has expired. The process is suspended until the I2C/I3C master 651 determines that the timer has expired. In a case where it is determined, in step S381, that the timer has expired, the process proceeds to step S382 in which, in the application processor 614, the I2C/I3C master 651 executes a polling operation.

In step S383, in the application processor 614, the I2C/I3C master 651 determines whether or not the Status register value in the read command is 1.

In a case where it is determined, in step S393, that the Status register value in the read command is 1, the process proceeds to step S384. In step S384, the application processor 614 makes a read access. Thereafter, the process returns to step S339 in FIG. 52.

On the other hand, in a case where it is determined, in step S383, that the Status register value in the read command is not 1 (a value other than 1), the process proceeds to step S385. In step S385, the application processor 614 sets 1 in the Error register (Timeout), and stores, into the Error-related register, data in the extended packet header ePH and the extended packet footer ePF.

In step S386, in the application processor 614, the I2C/I3C master 651 issues a stop command. In this case, the Sequence C (AP) process is finished, and further, the communication process itself is finished.

FIG. 56 is a flowchart for explaining the Sequence B (SerDes(Slave)) process that is executed in steps S324 and S334 in FIG. 51. It is to be noted that, although FIG. 56 illustrates the process that is executed in the slave-side SerDes device 612, the Sequence B (SerDes(Master)) process in step S322 in FIG. 51, the Sequence B (Image Sensor) process in step S326 in FIG. 51, and the Sequence B (SerDes(Master)) process in step S332 in FIG. 52 are executed in the similar manner as well.

In step S391, in the slave-side SerDes device 612, the CCI-FS processing section 636 checks the Source ID of the slave-side SerDes device 612 and a Destination SID in the extended packet header ePH.

In step S392, in the slave-side SerDes device 612, the CCI-FS processing section 636 determines whether or not the Source ID of the slave-side SerDes device 612 mismatches the Destination SID in the extended packet header ePH.

In a case where it is determined, in step S392, that the Source ID of the slave-side SerDes device 612 mismatches the Destination SID in the extended packet header ePH, the process proceeds to step S393.

In step S393, in the slave-side SerDes device 612, the CCI-FS processing section 636 checks the Destination SID of the slave-side SerDes device 612 and the Destination SID in the extended packet header ePH.

In step S394, in the slave-side SerDes device 612, the CCI-FS processing section 636 determines whether or not the Source ID of the slave-side SerDes device 612 matches the Destination SID in the extended packet header ePH.

In a case where it is determined, in step S394, that the Source ID of the slave-side SerDes device 612 matches the Destination SID in the extended packet header ePH, the process proceeds to step S395.

In step S395, in the slave-side SerDes device 612, the CCI-FS processing section 636 checks a Message Counter from the contents of the extended packet header ePH.

In step S396, in the slave-side SerDes device 612, the CCI-FS processing section 636 determines whether or not a Message Counter of the slave-side SerDes device 612 matches the Message Counter reception value checked from the contents of the extended packet header ePH.

In a case where it is determined, in step S396, that the Message Counter of the slave-side SerDes device 612 matches the Message Counter reception value checked from the contents of the extended packet header ePH, the process proceeds to step S397.

In step S397, in the slave-side SerDes device 612, the CCI-FS processing section 636 checks a CRC calculation result obtained by the slave-side SerDes device 612 on the basis of the extended packet header ePH, and checks a reception value (ePF0) in the extended packet footer ePF.

In step S399, whether or not the reception value (ePF0) in the extended packet footer ePF matches the CRC calculation result is determined. In a case where it is determined that the reception value (ePF0) matches the CRC calculation result, the process returns to step S325 in FIG. 51.

On the other hand, in a case where it is determined, in step S392, that the Source ID of the slave-side SerDes device 612 does not mismatch (matches) the Destination SID in the extended packet header ePH, the process proceeds to step S399.

In steps S399 to S402, the processes similar to those in steps 3395 to S398 are executed.

In a case where it is determined, in step S402, that the reception value (ePF0) in the extended packet footer ePF matches the CRC calculation result, the process proceeds to step S403. In step S403, a write access to the register 637 of the slave-side SerDes device 612 is made.

In a case where it is determined, in step S394, the Source ID of the slave-side SerDes device 612 does not match the Destination SID in the extended packet header ePH, the process proceeds to step S404. In step S404, in the slave-side SerDes device 612, the CCI-FS processing section 636 sets 1 in Error register [2] (Routing), and stores, into the Error-related register, data in the extended packet header ePH and the extended packet footer ePF.

In a case where it is determined, in step S399 or S402, that the reception value (ePF0) in the extended packet footer ePF does not match the CPC calculation result, the process proceeds to step S405. In step S405, in the slave-side SerDes device 612, the CCI-FS processing section 636 sets 1 in the Error register (CRC), and stores, into the Error-related register, data in the extended packet header ePH and the extended packet footer ePF.

In a case where it is determined, in step S396 or S400, that the Message Counter of the slave-side SerDes device 612 does not match the reception value in the Message Counter checked from the contents of the extended packet header ePH, the process proceeds to step S406. In step S406, in the slave-side SerDes device 612, the CCI-FS processing section 636 sets 1 in the Error register (MC), and stores, into the Error-related register, data in the extended packet header ePH and the extended packet footer ePF.

After the processes in steps S403 to S406, the Sequence B (SerDes(Slave)) process is finished, and further, the communication process itself is finished.

It is to be noted that combinations of a feature in which CRC calculation may be conducted only on E2E Protection, a feature in which error detection is conducted by each of the devices, and a feature in which a packet is discarded/is not discarded can be considered.

FIG. 57 is a flowchart for explaining the Sequence A_Read_Data (AP) process that is executed in step S339 in FIG. 52. It is to be noted that, although FIG. 57 illustrates the process that is executed in the application processor 614, the Sequence A_Read_Data (SerDes(Slave)) process in step S336 in FIG. 52 is executed in the similar manner as well.

In step S411, in the application processor 614, the I2C/I3C master 651 issues a start command and a slave address (Slave Address+W 8-bit illustrated in FIG. 48).

In step S412, in the application processor 614, the I2C/I3C master 651 determines whether or not an ACK response has been received from the I2C/I3C slave 644 of the master-side SerDes device 613. In a case where it is determined, in step S412, that an ACK response has been received from the I2C/I3C slave 644 of the master-side SerDes device 613, the process proceeds to step S413.

In step S413, in the application processor 614, the I2C/I3C master 651 issues a start command and a slave address (Slave Address+P 8-bit illustrated in FIG. 48), and starts a timer.

In step S414, in the application processor 614, the I2C/I3C master 651 determines whether or not an ACK response has been received from the I2C/I3C slave 644 of the master-side SerDes device 613. In a case where it is determined, in step S414, that an ACK response has been received from the I2C/I3C slave 644 of the master-side SerDes device 613, the process proceeds to step S415.

In step S415, in the application processor 614, the I2C/I3C master 651 acquires read data from the I2C/I3C slave 644 which is the application processor 614-side counterpart.

In step S416, weather or not ACK transmission has been conducted by the I2C/I3C master 651 of the application processor 614 and ACK reception has been conducted by the I2C/I3C slave 644 which is the application processor 614-side counterpart is determined.

In a case where it is determined, in step S416, that ACK transmission has been conducted by the I2C/I3C master 651 of the application processor 614 and ACK reception has been conducted by the I2C/I3C slave 644 which is the application processor 614-side counterpart, the process proceeds to step S417.

In step S417, whether or not the I2C/I3C master 651 of the application processor 614 has conducted HACK transmission according to completion of a transfer of final data is determined.

In a case where it is determined, in step S417, that HACK transmission has been conducted, the process proceeds to step S418. In step S418, in the application processor 614, the I2C/I3C master 651 issues a stop command. Accordingly, the Sequence A_Read_Data (AP) process is finished, and the process returns to step S340 in FIG. 52.

On the other hand, in a case where it is determined, in step S417, that NACK transmission has not been conducted, the process proceeds to step S419.

In step S419, in the application processor 614, the I2C/I3C master 651 determines whether or not the timer started in step S413 has expired. In a case where it is determined, in step S419, that the timer has not expired, the process returns to step S415. Thereafter, the similar processes are repeated.

On the other hand, in a case where it is determined, in step S419, that the timer has expired, the process proceeds to step S420.

In step S420, the application processor 614 sets 1 in the Error register (Timeout), and stores, into the Error-related register, data in the extended packet header ePH and the extended packet footer ePF.

After the process in step S420 is executed or in a case where it is determined, in step S414, that an ACK response has not been received from the I2C/I3C slave 644 of the master-side SerDes device 613, the process proceeds to step S421. Similarly, in a case where it is determined, in step S416, that the I2C/I3C master 651 of the application processor 614 has not conducted ACK transmission or that the I2C/I3C slave 644 which is the application processor 614-side counterpart has not conducted ACK reception, the process proceeds to step S421.

In step S421, in the application processor 614, the I2C/I3C master 651 issues a stop command. In this case, the Sequence A_Read_Data (AP) process is finished, and further, the communication process itself is finished.

Here, regarding a timing of an access from the I2C/I3C master 634 to the I2C/I3C slave 621 when the I2C/I3C slave 621 performs output (see FIG. 46) and a timing of an access from the I2C/I3C master 651 to the I2C/I3C slave 644 when the I2C/I3C slave 644 of the master-side SerDes device 613 performs an output (see FIG. 48), there are three combinations as follows.

In a first access timing, polling is performed until the read data is acquired, a preparation for read data reading is completed, and then, an I2C/I3C master starts a read process.

In a second access timing, an I2C/I3C master starts a read process after elapse of a certain period of time.

In a third access timing, an I2C/I3C master starts a read process after elapse of a certain period of time by using Clock Stretch (see FIG. 72 which will be explained later). In this case, one set of the read data is collectively transmitted, or sets of the read data are separately transmitted (Clock Stretch Mode signal is asserted).

<Configuration Examples of Extended Packet Header ePH>

FIGS. 58 to 60 are diagrams each depicting a configuration example of an extended packet header ePH.

FIG. 58 depicts a detailed configuration example of the extended packet header ePH0, the extended packet header ePH1, and the extended packet header ePH2. Such addition of the extended packet header ePH as depicted in FIG. 58 is defined for CCI-FS by applying an ePH structure in C-PHY and D-PHY to the contents of the extended packet header ePH.

FIG. 59 depicts a detailed configuration example of the extended packet header ePH3. In such addition of the extended packet header ePH as depicted in FIG. 59, the contents of the extended packet header ePH is defined for CCI-FS.

FIG. 60 illustrates a detailed configuration example of extended DT in the extended packet header ePH. For CCI-FS, "0xC0:For I2C" and "0xC1:For I3C" are added to a data type in the extended packet header ePH, for example.

<Configuration Example of I2C Circuit>

FIG. 51 depicts a hardware configuration example of a conventional I2C. For example, an I2C configuration example in a case of a bus connection configuration on the upper layer side in hardware implementation is depicted. The slave side may have a configuration of being capable of receiving AKC/NACK from the upper side. The depicted one is an example, and the upper bus configuration does not necessarily match the depicted one.

FIG. 52 illustrates a waveform of a data transfer through an I2C bus. It is to be noted that the I2C bus standard is assumed to be equivalent to CCI (I2C).

Figure 27:
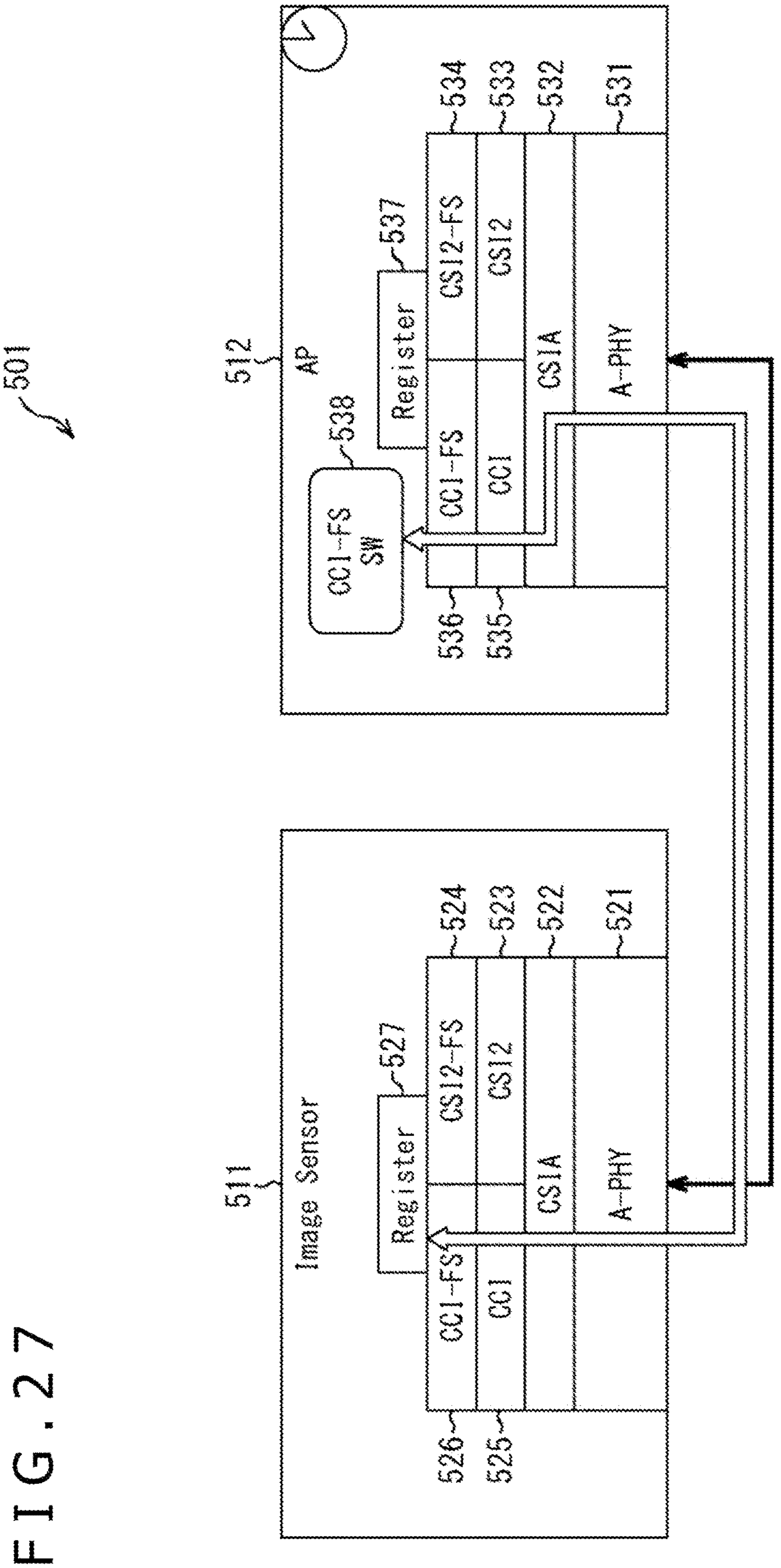
FIG. 27 is a block diagram depicting a configuration example of a communication system in which the image sensor and the application processor are directly connected to each other.
Figure 63:
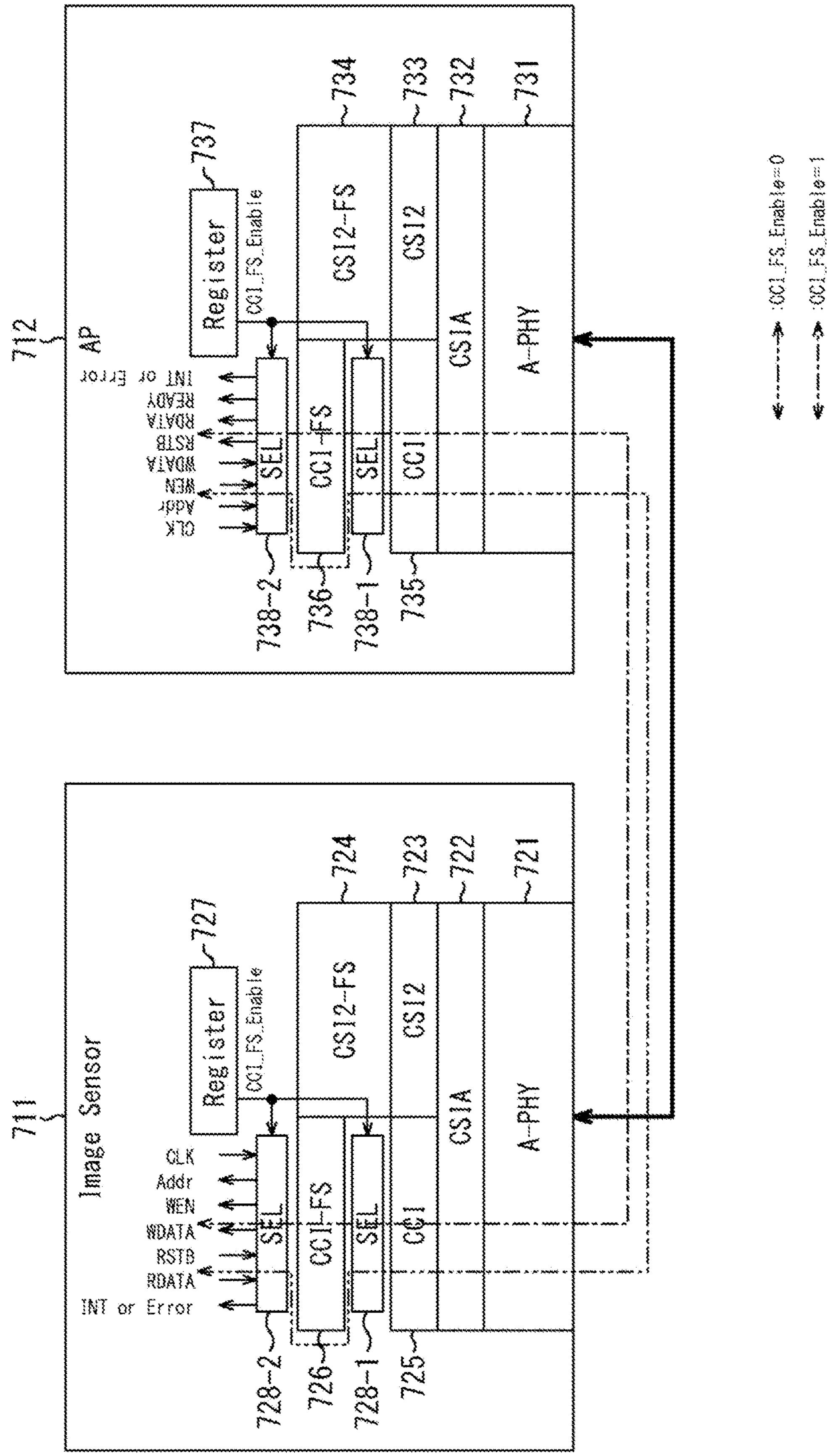
FIG. 63 is a block diagram depicting a CCI-related configuration example of a communication system having an A-PHY direct connection configuration.

FIG. 63 is a block diagram depicting a CCI-related configuration example of a communication system 701 having an A-PHY direct connection configuration which is similar to the communication system 501 depicted in FIG. 27.

In the communication system 701, an image sensor 711 and an application processor 712 are directly connected to each other through A-PHY as depicted in FIG. 63.

The image sensor 711 includes an A-PHY processing section 721, a CSIA processing section 722, a CSI2 processing section 523, a CSI2-FS processing section 724, a CCI processing section 725, a CCI-FS processing section 726, a register 727, and selectors 728-1 and 728-2. As depicted in FIG. 63, the selectors 728-1 and 728-2 are disposed with the CCI-FS processing section 726 interposed therebetween, and can switch enabling/disabling the CCI-FS processing section 726 according to a CCI_FS_Enable signal from the register 727.

The application processor 712 includes an A-PHY processing section 731, a CSIA processing section 732, a CSI2 processing section 733, a CSI2-FS processing section 734, a CCI processing section 735, a CCI-FS processing section 736, a register 737, and selectors 738-1 and 738-2. As depicted in FIG. 63, the selectors 738-1 and 738-2 are disposed with the CCI-FS processing section 736 interposed therebetween, and can switch enabling/disabling the CCI-FS processing section 736 according to a CCI_FS_Enable signal from the register 737.

For example, in a case where the CCI_FS_Enable signal indicates that CCI-FS is enabled (CCI_FS_Enable=1), data is transmitted and received via the CCI-FS processing section 726 and the CCI-FS processing section 736, as indicated by a dashed-and-dotted line arrow. On the other hand, in a case where the CCI_FS_Enable indicates that CCI-FS is disabled (CCI_FS_Enable=0), data is transmitted and received not via the CCI-FS processing section 726 and the CCI-FS processing section 736, as indicated by a dashed-and-double-dotted line arrow.

<Topology of Network>

Figure 64:
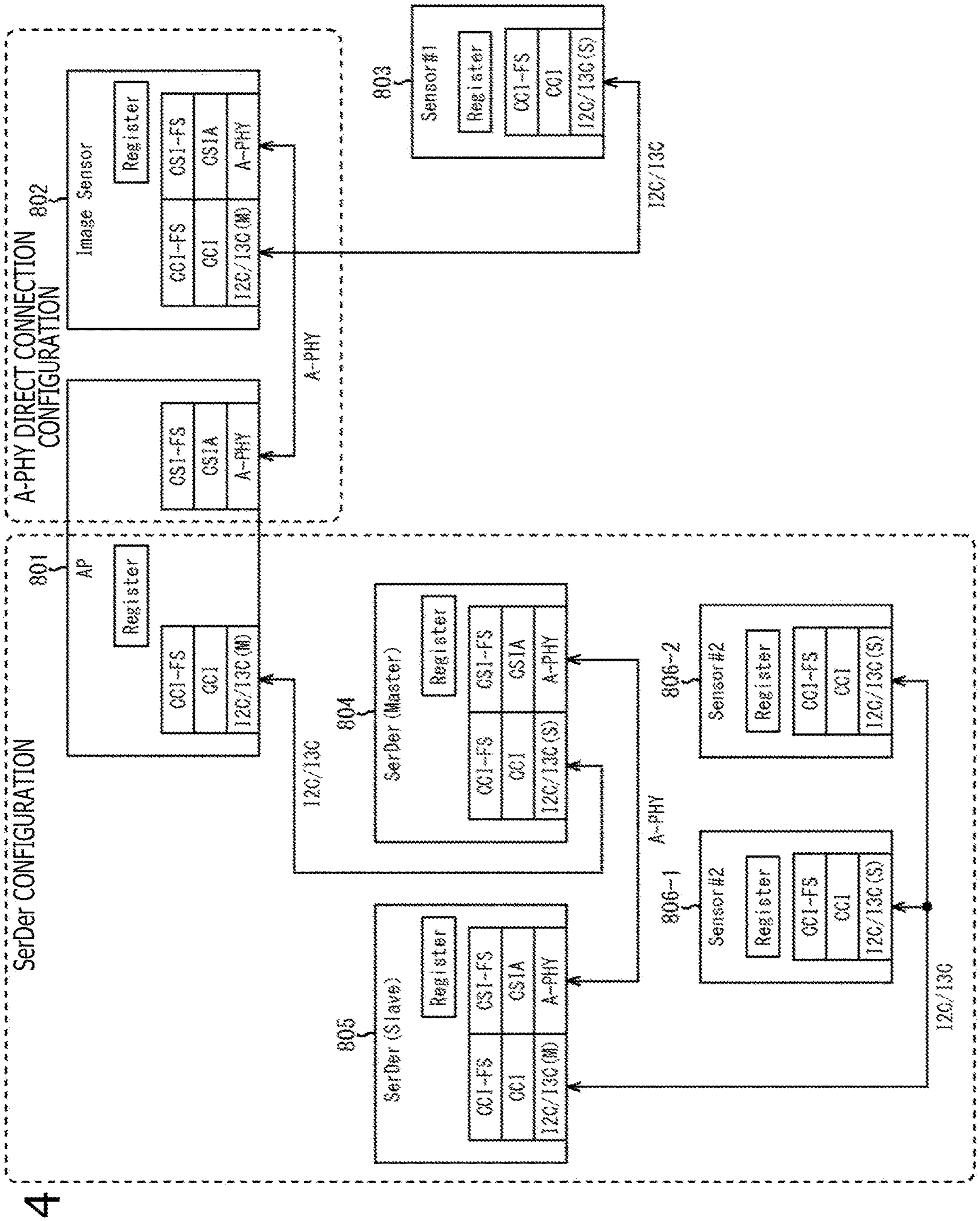
FIG. 64 is a diagram depicting one example of a network connection form.

FIG. 64 depicts one example of the topology of a network having an A-PHY direct connection configuration and a SerDes connection configuration.

A connection form in which an application processor 801 is connected directly to an image sensor 802 through A-PHY and in which the image sensor 802 is connected to a sensor 803 through I2C/I3C can be achieved.

The application processor 801 is connected to a master-side SerDes device 804 through I2C/I3C, and the master-side SerDes device 804 and a slave-side SerDes device 805 are connected to each other through A-PHY. A connection form in which the slave-side SerDes device 805 is connected to two sensors 806-1 and 806-2 through I2C/I3C can be achieved.

<Circuit Configuration of CCI-FS Processing Section>

Figure 65:
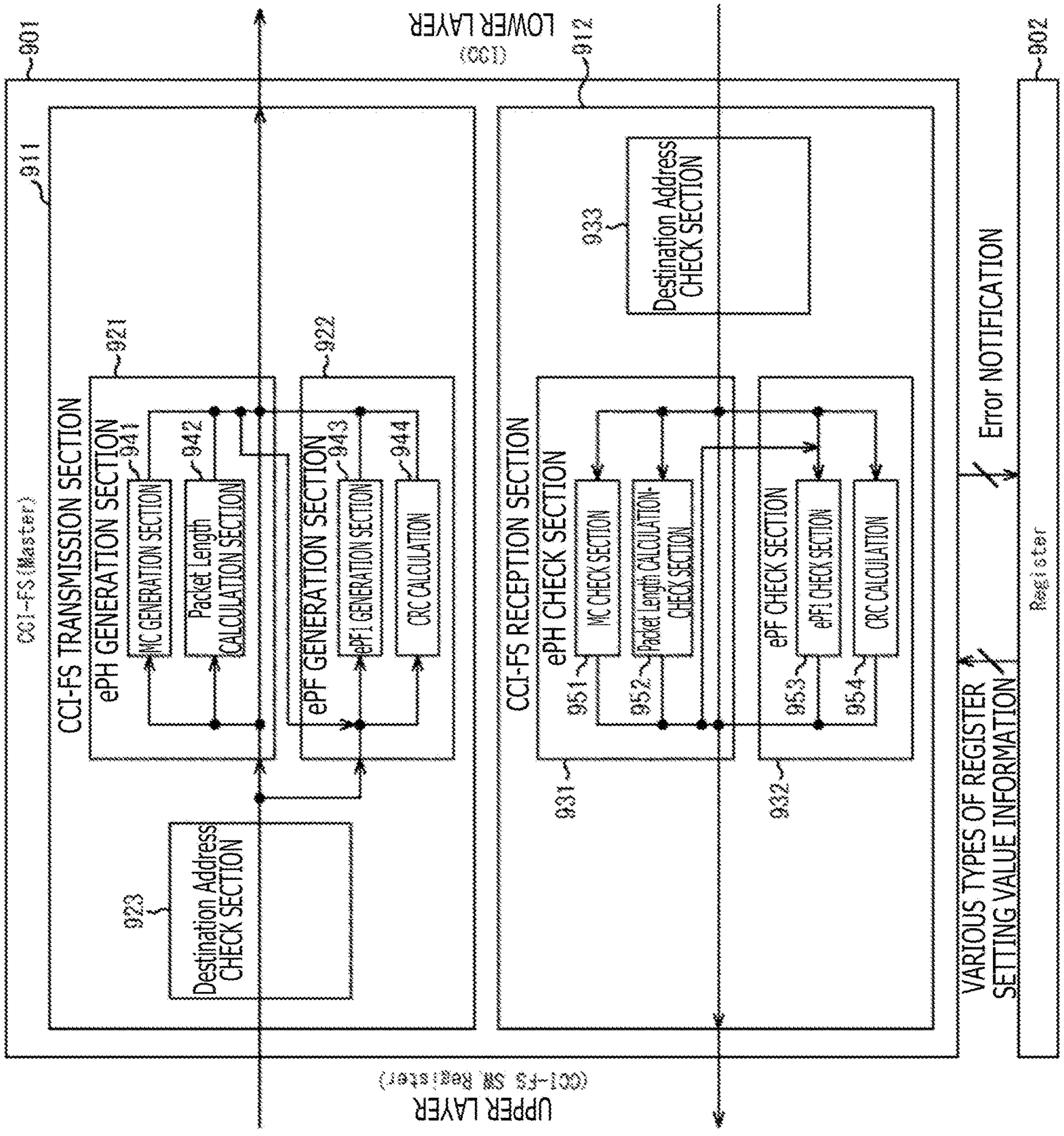
FIG. 65 is a block diagram depicting one example of a circuit configuration of a CCI-FS processing section.

FIG. 65 is a block diagram depicting one example of a circuit configuration of the CCI-FS processing section. A CCI-FS processing section 901 and a register 902 depicted in FIG. 65 have the common configuration to that of the CCI-FS processing sections and the registers included in each of the above-mentioned devices.

As depicted in FIG. 65, CCI-FS switches and registers are provided in the upper layer of the CCI-FS processing section 901, CCI processing sections are provided in the lower layer of the CCI-FS processing section 901. The CCI-FS processing section 901 includes a CCI-FS transmission section 911 and a CCI-FS reception section 912. Various types of register set value information are supplied from the register 902 to the CCI-FS processing section 901. An Error notification is supplied from the CCI-FS processing section 901 to the register 902.

The CCI-FS transmission section 911 includes an extended packet header ePH generation section 921, an extended packet footer ePF generation section 922, and a Destination Address check section 923.

The extended packet header ePH generation section 921 includes a MC generation section 941 that generates a Message Counter and a Packet Length calculation section 942 that calculates a packet length. The extended packet footer ePF generation section 922 includes an extended packet footer ePF1 generation section 943 that generates the extended packet footer ePF1 and a CRC calculation section 944 that calculates CRC to be stored in the extended packet footer ePF0.

The CCI-FS reception section 912 includes an extended packet header ePH check section 931, an extended packet footer ePF check section 932, and a Destination Address check section 933.

The extended packet header ePH check section 931 includes a MC check section 951 that checks a Message Counter and a Packet Length calculation-check section 952 that calculates and checks a packet length. The extended packet footer ePF check section 932 includes an extended packet footer ePF1 check section 953 that checks the extended packet footer ePF1 and a CRC calculation section 954 that calculates CRC to be stored in the extended packet footer ePF0.

The CCI-FS processing section 901 can check, by the CCI-FS transmission section 911, a Destination Address of data supplied from the upper layer, generate an extended packet header ePH and an extended packet footer ePF, add them to the data, and supply the data to the lower layer. The CCI-FS processing section 901 can check, by the CCI-FS reception section 912, the Destination Address of data supplied from the lower layer, check the extended packet header ePH and the extended packet footer ePF, and supply the data to the upper layer.

Here, an operation of CCI-FS processing sections of the devices constituting the communication system 601 in the configuration example of the SerDes connection configuration depicted in FIG. 40 will be explained.

The application processor 614 has a Source ID indicating the application processor 614 in the extended packet header ePH in the application processor 614. Further, the CCI-FS processing section 653 adds the above-mentioned information and information having a Destination ID indicating a device to which a target access is made.

The slave-side SerDes device 612 and the master-side SerDes device 613 have preset Source IDs respectively indicating the slave-side SerDes device 612 and the master-side SerDes device 613, or have a Source ID as respective unique values. The CCI-FS processing section 636 and the CCI-FS processing section 646 presets the above-mentioned information and information having Destination IDs indicating a connected device and a target device.

In addition, the CCI-FS processing section 636 and the CCI-FS processing section 646 compare Destination ID in a received extended packet header ePH with the ID (Source ID) of the CCI-FS processing section 636 and the CCI-FS processing section 646, respectively, and determine whether the packet is for accessing the CCI-FS processing section 636 and the CCI-FS processing section 646, respectively, or the Destination ID is (Destination ID) indicating a target device. For example, when Destination ID in the received extended packet header ePH matches the ID (Source ID) of the CCI-FS processing section 636 and/or the CCI-FS processing section 646, a register access is made as an access to an intermediate device (SerDes device). On the other hand, when Destination ID in the received extended packet header ePH does not match the ID (Source ID) of the CCI-FS processing section 636 and/or the CCI-FS processing section 646, a data transfer to a connected device (Destination ID) is conducted as an access to a device on the later stage.

As explained above, a data transfer is conducted on the basis of a Source ID and a Destination ID embedded in the extended packet header ePH, a Source ID that is preset for an intermediate device (SerDes device) or a target device or that is a unique value therefor, and information regarding a preset connection destination, whereby an access to the target device is made.

The CSI2-FS processing section 623 of the image sensor 611 makes, as an access to the image sensor 611, an access to a register in the CSI2-FS processing section 623 itself when a Destination ID in the received extended packet header ePH matches the ID (Source ID) of the CSI2-FS processing section 623 itself.

As described above, a value unique to each device, a value preset for the device, or a combination thereof can be used as a Source ID of each device.

FIGS. 66 to 69 each illustrate a detailed configuration example of the register 902.

FIG. 66 illustrates the details of an address 0x000 to an address 0x109 in the register 902. FIG. 67 illustrates a configuration example when Bridge is configured, as the details of an address 0x110 to an address 0x125 in the register 902.

FIG. 68 illustrates an Error-related register as the details of an address 0x200 in the register 902. FIG. 68 illustrates an Error-related register (debug) as the details of an address 0x300 and an address 0x400 in the register 902. FIG. 68 illustrates an Error Injection-related register (debug) as the details of an address 0x800 in the register 902.

<Modifications of Extended Packet Header ePH>

Modifications of the extended packet header ePH will be explained with reference to FIGS. 69 and 70.

Figure 69:
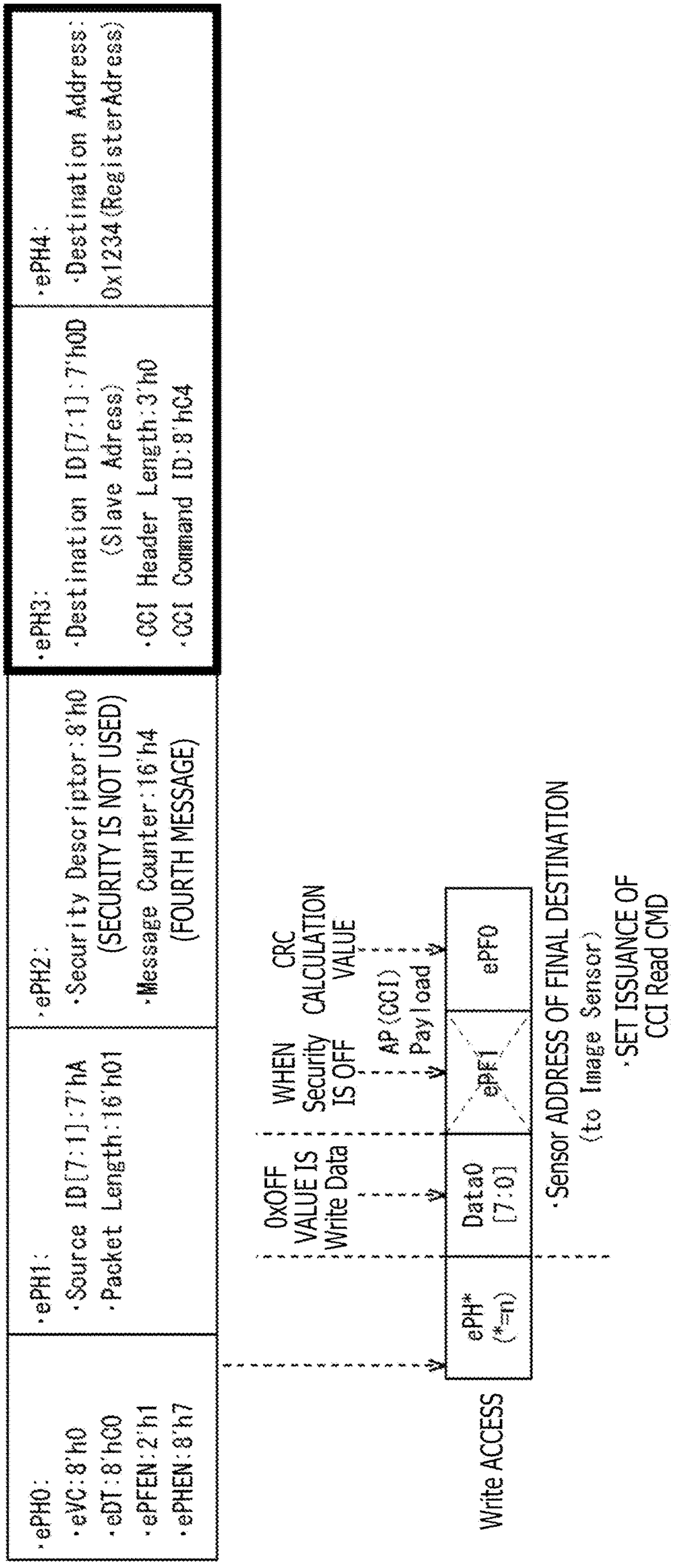
FIG. 69 is a diagram depicting a modification of an extended packet header ePH in a packet configuration of write data generated by the application processor side.

FIG. 69 depicts a modification of the extended packet header ePH in the packet configuration of write data generated by the CCI-FS processing section 536 of the application processor 512 when a write access is made, as previously explained with reference to FIG. 33. The extended packet header ePH depicted in FIG. 69 is different in the configurations of the extended packet header ePH3 and the extended packet header ePH4 from those of the configuration example depicted in FIG. 33.

Figure 70:
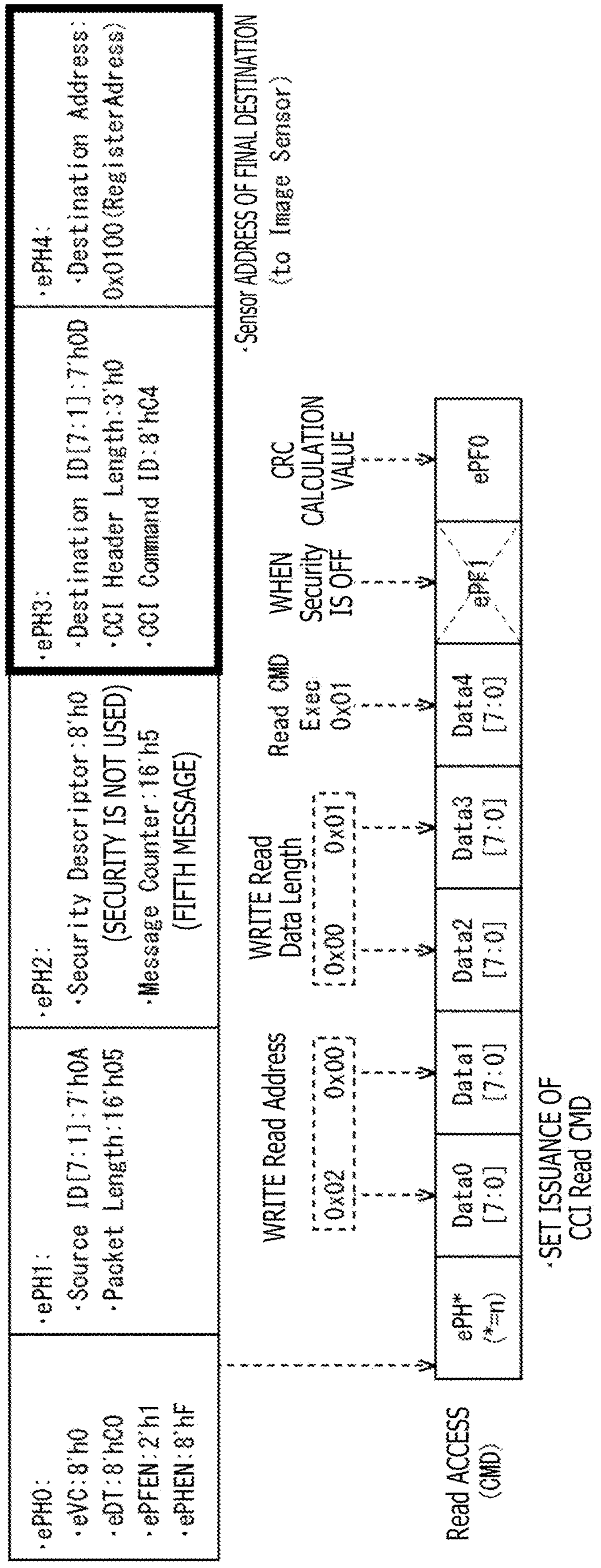
FIG. 70 is a diagram depicting a modification of an extended packet header ePH in a packet configuration of a read command generated by the application processor side.

FIG. 70 depicts a modification of the extended packet header ePH in the packet configuration of write data generated by the CCI-FS processing section 536 of the application processor 512 when a read access is made, as previously explained with reference to FIG. 28. The extended packet header ePH depicted in FIG. 70 is different in the configurations of the extended packet header ePH3 and the extended packet header ePH4 from those of the configuration example depicted in FIG. 28.

For example, the extended packet header ePH depicted in FIGS. 69 and 70 depends on implementation. The following combinations are assumed.

Read address information may be stored in the extended packet header ePH, or may be stored in the AP (CCI) payload. Length information may be stored in the extended packet header ePH, or may be stored in the AP (CCI) payload. CMD information may be stored in CCI Command ID in the extended packet header ePH. On the basis of CCI Command ID, reference to information regarding starting, resuming, and finishing the command is made. With use of a CCI Header Length, CCI information (e.g., Slaves Address) may be stored in the AP (CCI) payload. The CCI Header Length is information indicates a head length of CCI protocol (I2C).

Figure 71:
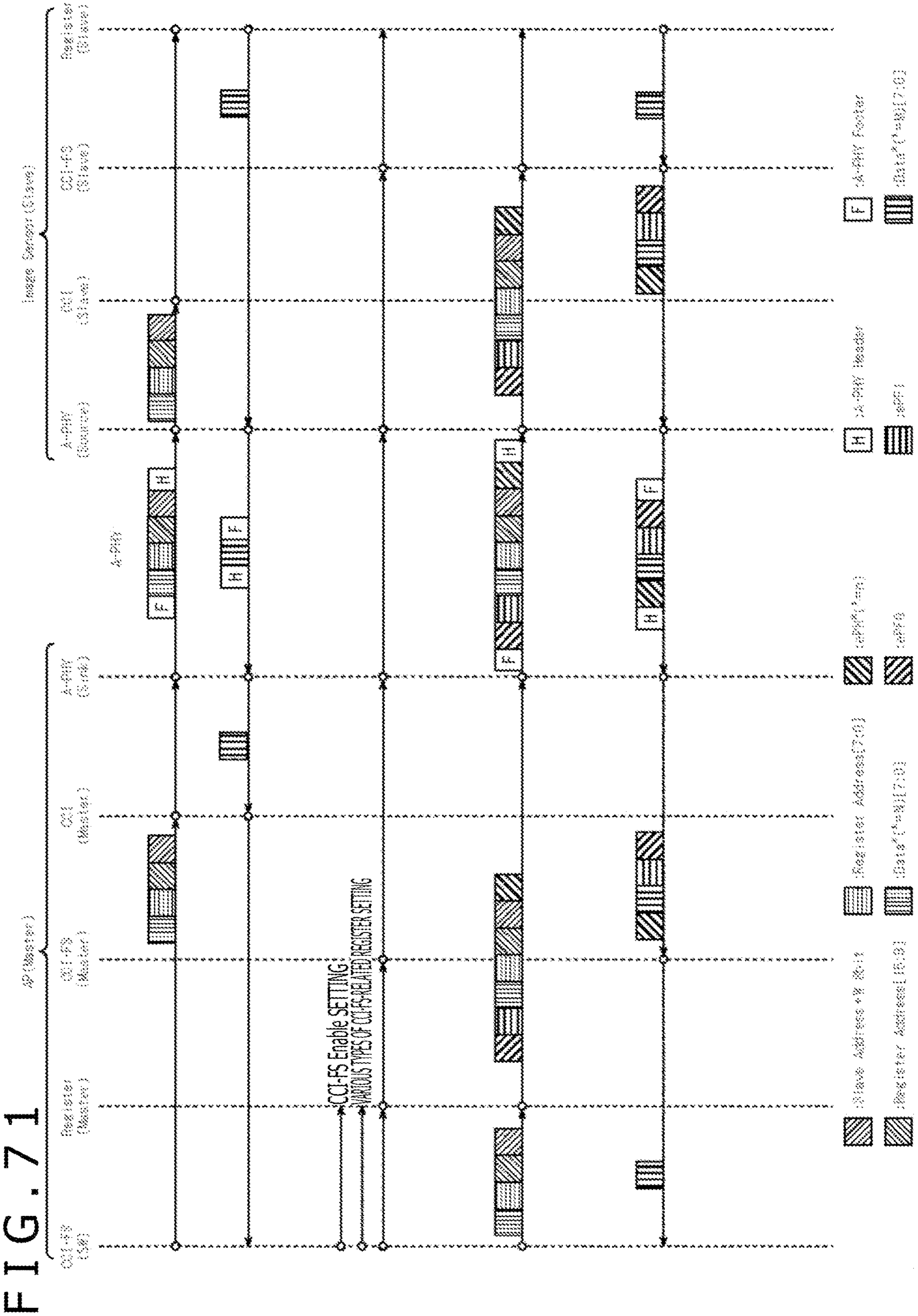
FIG. 71 is a diagram for explaining a flow of the application processor and the image sensor in the A-PHY direct connection configuration.

FIG. 71 is a diagram for explaining a flow between the image sensor 511 and the application processor 512 in such an A-PHY direct connection configuration as that depicted in FIG. 27.

In the application processor 512, the CCI-FS switch 538 issues a read command and a write command. The CCI-FS switch 538 supplies a slave address (Slave Address+W 8 bit), a register address (Register Address[15:8], Register Address[7:0]), and data (Data*(*=N)[7:0]) to the CCI processing section 535. The CCI processing section 535 transforms the addresses and the data to an AP (CCI) payload, and supplies the AP (CCI) payload to the A-PHY processing section 531. The A-PHY processing section 531 adds an A-PHY header and an A-PHY footer to the AP (CCI) payload, and conducts an A-PHY transfer of the resultant AP (CCI) payload to the image sensor 511.

In the image sensor 511, the A-PHY processing section 521 removes the A-PHY header and the A-PHY footer, and supplies the resultant AP (CCI) payload to the CCI processing section 525. The CCI processing section 525 transforms the AP (CCI) payload, and writes data into the register 527 according to a write command, and reads the data from the register 527 according to a read command, on the basis of the contents of the AP (CCI) payload.

At this time, initial setting of CCI-FS Enable is performed by the CCI processing section 525, and bus conversion of a register interface or an AHB bus is performed. Further, CCI-FS Enable setting is checked via the CCI processing section 525 or the CCI-FS processing section 526.

The CCI processing section 525 transforms read data (Data*(*=M)[7:0]) read from the register 527 in response to a read command, to an AP (CCI) payload, and supplies the AP (CCI) payload to the A-PHY processing section 521. The A-PHY processing section 521 adds an A-PHY header and an A-PHY footer to the AP (CCI) payload, and conducts an A-PHY transfer of the resultant AP (CCI) payload to the application processor 512.

In the application processor 512, the A-PHY processing section 531 removes the A-PHY header and the A-PHY footer, and supplies the resultant AP (CCI) payload to the CCI processing section 535. The CCI processing section 535 transforms the AP (CCI) payload, and supplies read data (Data*(*=M)[7:0]) to the CCI-FS switch 538.

The CCI-FS switch 538 performs CCI-FS Enable setting and various types of CCI-FS-related register setting on the register 537. At this time, the register access depends on implementation. The CCI-FS switch 539 performs various types of CCI-FS-related register setting on the register 527 via the register 537, the CCI-FS processing section 536, the A-PHY processing section 531, the A-PHY processing section 521, and the CCI-FS processing section 526.

In the application processor 512, the CCI-FS switch 538 issues a read command. The CCI-FS switch 538 supplies a slave address (Slave Address+W 8 bit), a register address (Register Address[15:8], Register Address[7:0]), and data (Data*(*=N)[7:0]) to the register 537. The CCI-FS processing section 536 transforms the addresses and the data to an AP (CCI) payload, adds an extended packet header ePH* (*=n), an extended packet footer ePF1, and an extended packet footer ePF0 to the AP (CCI) payload, and supplies the resultant AP (CCI) payload to the A-PHY processing section 531. The A-PHY processing section 531 adds an A-PHY header and an A-PHY footer to the AP (CCI) payload, and conducts an A-PHY transfer of the AP (CCI) payload to the image sensor 511.

In the image sensor 511, the A-PHY processing section 521 removes the A-PHY header and the A-PHY footer, and supplies the extended packet header ePH*(*=n), the AP (CCI) payload, the extended packet footer ePF1, and the extended packet footer ePF0 to the CCI-FS processing section 526. The CCI-FS processing section 526 transforms the AP (CCI) payload, and reads data from the register 527 according to a read command on the basis of the contents of AP (CCI) payload. At this time, the register access depends on implementation, and bus conversion of a register interface, an AHB bus, or a CCI interface is performed.

The CCI-FS processing section 526 transforms read data (Data*(*=M)[7:0]) read from the register 527 in response to the read command, to an AP (CCI) payload, adds an extended packet header ePH*(*=n), an extended packet footer ePF1, and an extended packet footer ePF0 to the AP (CCI) payload, and supplies the resultant AP (CCI) payload to the A-PHY processing section 521. The A-PHY processing section 521 adds an A-PHY header and an A-PHY footer to the payload, and conducts an A-PHY transfer of the resultant AP (CCI) payload to the application processor 512.

In the application processor 512, the A-PHY processing section 531 removes the A-PHY header and the A-PHY footer, and supplies the extended packet header ePH*(*=n), the AP (CCI) payload, the extended packet footer ePF1, and the extended packet footer ePF0 to the CCI-FS processing section 536. The CCI-FS processing section 536 transforms the AP (CCI) payload, and supplies the read data (Data* (*=M)[7:0]) to the CCI-FS switch 538.

It is to be noted that, although the explanation of the above-mentioned flow is based on I2C/I3C command generation in hardware, the following combinations may be adopted in addition to the example described above.

In a case of software, as software I2C/I3C generation, generation (like GPIO control, for example) of a Slave Address, a Register address, a Payload, ACK response reception and transmission, and a variety of control codes (S, Sr, ACK, NACK, P) is performed. As software I2C/I3C command generation, a Slave Address, a Register address, and a Payload are issued by a CPU in response to ACK reception in CPU bus setting.

In a case of hardware, as hardware I2C/I3C generation, transfer setting to I2C/I3C HW IP and data setting are performed. A variety of control codes make automatic responses by hardware. As hardware I2C/I3C command generation, data setting is performed by transfer setting to I2C/I3C HW IP, and the data is transmitted by a command. A variety of control codes make automatic responses by hardware.

Figure 72:
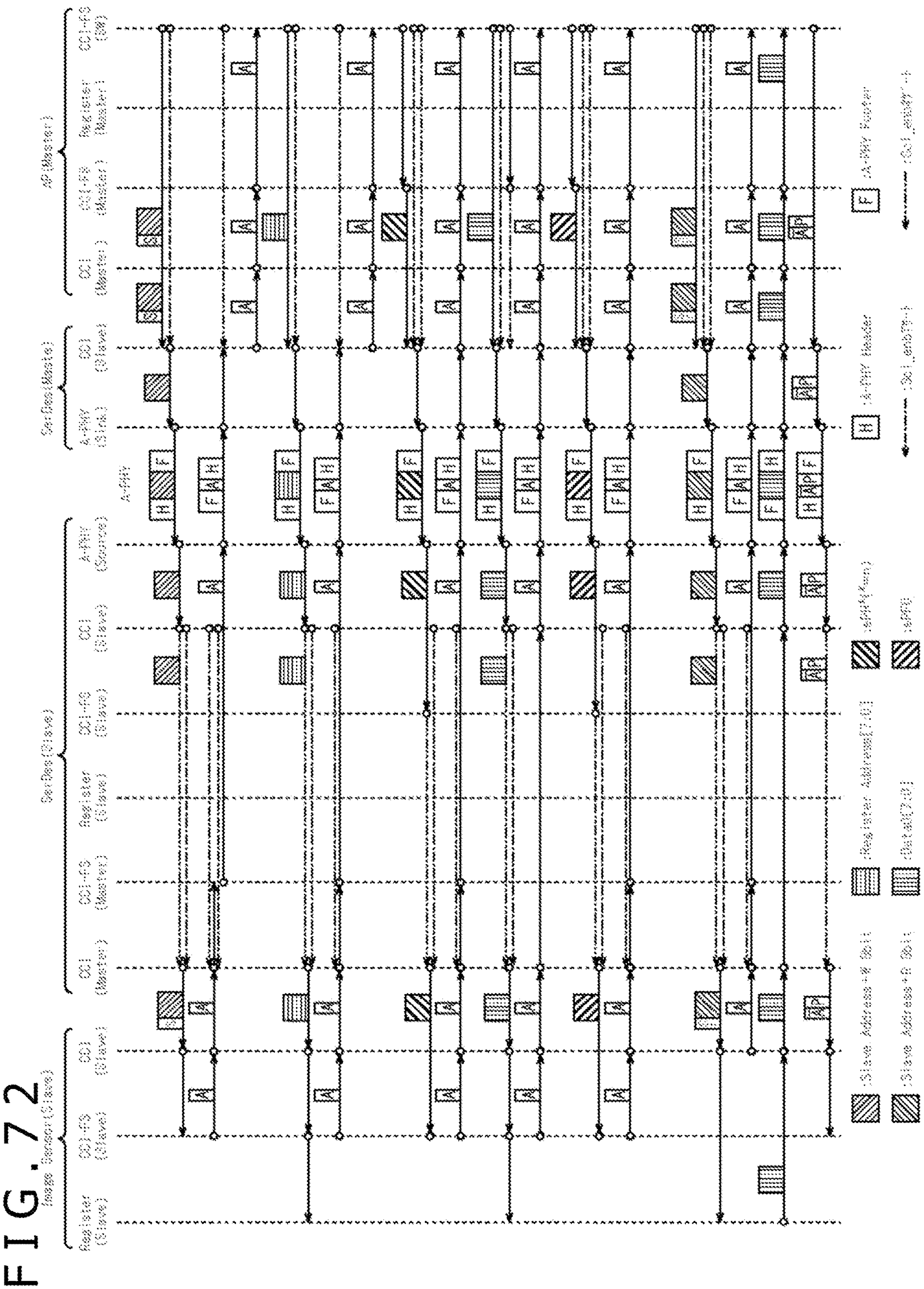
FIG. 72 is a diagram for explaining a flow using Clock Stretch.

FIG. 72 is a diagram for explaining a flow using Clock Stretch when Write access and Read access are made between the image sensor 611 and the application processor 614 in such a SerDes connection configuration as that depicted in FIG. 40.

The CCI-FS switch 655 of the application processor 614 supplies a start command and a write command (Slave Address+W 8 bit) to the CCI processing section 645 of the master-side SerDes device 613, and asserts a Scl_enb signal. In the master-side SerDes device 613, the CCI processing section 645 supplies the write command to the A-PHY processing section 641, and the A-PHY processing section 641 adds an A-PHY header and an A-PHY footer to the write command, and conducts an A-PHY transfer of the resultant write command to the slave-side SerDes device 612.

In the slave-side SerDes device 612, the A-PHY processing section 631 removes the A-PHY header and the A-PHY footer, and supplies the resultant write command to the CCI processing section 635 (Slave). The CCI processing section 635 (Slave) negates the Scl_enb signal, and further, supplies the write command to the CCI processing section 635 (Master). Here, the CCI processing section 635 that communicates with the master-side SerDes device 613 side and functions as a slave is referred to as a CCI processing section 635 (Slave), and the CCI processing section 635 that communicates with the image sensor 611 side and functions as a master is referred to as a CCI processing section 635 (Master).

The CCI processing section 635 (Master) transmits a start command and a write command to the image sensor 611.

In the image sensor 611, the CCI processing section 622 receives the start command and the write command, and supplies the start command and the write command to the CSI2-FS processing section 623. The CSI2-FS processing section 623 supplies, to the CCI processing section 622, an ACK response indicating that the start command and the write command have been successfully received. The CCI processing section 622 transmits the ACK response to the slave-side SerDes device 612.

In the slave-side SerDes device 612, the CCI processing section 635 (Master) receives the ACK response, and the ACK response is supplied to the CCI-FS processing section 636 when a Scl_enb signal is negated by the CCI processing section 635 (Slave). Subsequently, the CCI processing section 635 (Slave) asserts the Scl_enb signal with respect to the CCI processing section 635 (Master).

The CCI-FS processing section 636 supplies the ACK response to the A-PHY processing section 631. The A-PHY processing section 631 adds an A-PHY header and an A-PHY footer to the ACK response, and conducts an A-PHY transfer of the resultant ACK response to the master-side SerDes device 613.

In the master-side SerDes device 613, the A-PHY processing section 641 removes the A-PHY header and the A-PHY footer, and supplies the resultant ACK response to the CCI processing section 645. When the CCI-FS switch 655 of the application processor 614 negates the Scl_enb signal with respect to the CCI processing section 645, the CCI processing section 645 transmits an ACK response to the application processor 614.

In the application processor 614, the CCI processing section 652 receives the ACK response, and supplies the ACK response to the CCI-FS switch 655 via the CCI-FS processing section 653.

The CCI-FS switch 655 of the application processor 614 supplies a register address (Register Address [7:0]) to the CCI processing section 645 of the master-side SerDes device 613, and asserts the Scl_enb signal. In the master-side SerDes device 613, the CCI processing section 645 supplies the register address to the A-PHY processing section 641, and the A-PHY processing section 641 adds an A-PHY header and an A-PHY footer to the register address, and conducts an A-PHY transfer of the register address to the slave-side SerDes device 612.

In the slave-side SerDes device 612, the A-PHY processing section 631 removes the A-PHY header and the A-PHY footer, and supplies the resultant register address to the CCI processing section 635 (Slave). The CCI processing section 635 (Slave) negates the Scl_enb signal, and further, supplies the register address to the CCI processing section 635 (Master). The CCI processing section 635 (Master) transmits the register address to the image sensor 611. Subsequently, the CCI processing section 635 (Slave) asserts the Scl_enb signal with respect to the CCI processing section 635 (Master).

In the image sensor 611, the CCI processing section 622 receives the register address, and supplies the register address to the CSI2-FS processing section 623. The CSI2-FS processing section 623 supplies, to the CCI processing section 622, an ACK response indicating that the register address has been successfully received. The CCI processing section 622 transmits the ACK response to the slave-side SerDes device 612.

Thereafter, the ACK response is supplied to the CCI-FS switch 655 in a manner similar to that in the above-mentioned process.

In the application processor 614, the CCI-FS processing section 653 transmits the extended packet header ePH*(*=n) to the master-side SerDes device 613 under control of the CCI-FS switch 655.

In the master-side SerDes device 613, the CCI processing section 645 receives the extended packet header ePH*(*=n), and the extended packet header ePH*(*=n) is supplied to the A-PHY processing section 641 when the Scl_enb signal is asserted by the CCI-FS switch 655. Subsequently, the CCI-FS switch 655 negates the Scl_enb signal with respect to the CCI processing section 645. The A-PHY processing section 641 adds an A-PHY header and an A-PHY footer to the extended packet header ePH*(*=n), and conducts an A-PHY transfer of the resultant extended packet header ePH*(*=n) to the slave-side SerDes device 612.

In the slave-side SerDes device 612, the A-PHY processing section 631 removes the A-PHY header and the A-PHY footer, and supplies the resultant extended packet header ePH*(*=n) to the CCI-FS processing section 636. The CCI-FS processing section 636 negates the Scl_enb signal, and further, supplies the extended packet header ePH*(*=n) to the CCI processing section 635 (Master). The CCI processing section 635 (Master) transmits the extended packet header ePH*(*=n) to the image sensor 611. Subsequently, the CCI processing section 635 (Slave) asserts the Scl_enb signal with respect to the CCI processing section 635 (Master).

In the image sensor 611, the CSI2-FS processing section 623 receives the extended packet header ePH*(*=n). The CSI2-FS processing section 623 supplies, to the CCI processing section 622, an ACK response indicating that the extended packet header ePH*(*=n) has been successfully received. The CCI processing section 622 transmits the ACK response to the slave-side SerDes device 612.

Subsequently, the ACK response is supplied to the CCI-FS switch 655 in a manner similar to that in the above-mentioned process.

The CCI-FS switch 655 of the application processor 614 supplies write data (Dara0 [7:0]) to the CCI processing section 645 of the master-side SerDes device 613, and asserts the Scl_enb signal. In the master-side SerDes device 613, the CCI processing section 645 supplies the write data to the A-PHY processing section 641, and the A-PHY processing section 641 adds an A-PHY header and an A-PHY footer to the write data, and conducts an A-PHY transfer of the resultant write data to the slave-side SerDes device 612.

In the master-side SerDes device 613, the CCI processing section 645 receives the write data, and the write data is supplied to the A-PHY processing section 641 when the Scl_enb signal is asserted by the CCI-FS switch 655. Subsequently, the CSI2-FS processing section 653 negates the Scl_enb signal with respect to the CCI processing section 645 under control of the CCI-FS switch 655. The A-PHY processing section 641 adds an A-PHY header and an A-PHY footer to the write data, and conducts an A-PHY transfer of the resultant write data to the slave-side SerDes device 612.

In the slave-side SerDes device 612, the A-PHY processing section 631 removes the A-PHY header and the A-PHY footer, and supplies the resultant write data to the CCI processing section 635. The CCI processing section 635 negates the Scl_enb signal, and further, supplies the write data to the CCI processing section 635 (Master). The CCI processing section 635 (Master) transmits the write data to the image sensor 611. Subsequently, the CCI processing section 635 (Slave) asserts the Scl_enb signal with respect to the CCI processing section 635 (Master).

In the image sensor 611, the CCI processing section 622 receives the write data, and supplies the write data to the CSI2-FS processing section 623, and the CSI2-FS processing section 623 writes the write data into the register 624. The CSI2-FS processing section 623 supplies, to the CCI processing section 622, an ACK response indicating that the write data has been successfully written. The CCI processing section 622 transmits the ACK response to the slave-side SerDes device 612.

Thereafter, the ACK response is supplied to the CCI-FS switch 655 in a manner similar to that in the above-mentioned process.

In the application processor 614, the CCI-FS processing section 653 transmits the extended packet footer ePF0 to the master-side SerDes device 613 under control of the CCI-FS switch 655.

In the master-side SerDes device 613, the CCI processing section 645 receives the extended packet footer ePF0, and the extended packet footer ePF0 is supplied to the A-PHY processing section 641 when the Scl_enb signal is asserted by the CCI-FS switch 655. Subsequently, the CCI-FS switch 655 negates the Scl_enb signal with respect to the CCI processing section 645. The A-PHY processing section 641 adds an A-PHY header and an A-PHY footer to the extended packet footer ePF0, and conducts an A-PHY transfer of the resultant extended packet footer ePF0 to the slave-side SerDes device 612.

In the slave-side SerDes device 612, the A-PHY processing section 631 removes the A-PHY header and the A-PHY footer, and supplies the resultant extended packet footer ePF0 to the CCI-FS processing section 636. The CCI-FS processing section 636 negates the Scl_enb signal, and further, supplies the extended packet footer ePF0 to the CCI processing section 635 (Master). The CCI processing section 635 (Master) transmits the extended packet footer ePF0 to the image sensor 611. Subsequently, the CCI processing section 635 (Slave) asserts the Scl_enb signal with respect to the CCI processing section 635 (Master).

In the image sensor 611, the CSI2-FS processing section 623 receives the extended packet footer ePF0. The CSI2-FS processing section 623 supplies, to the CCI processing section 622, an ACK response indicating that the extended packet footer ePF0 has been successfully received. The CCI processing section 622 transmits the ACK response to the slave-side SerDes device 612.

Thereafter, the ACK response is supplied to the CCI-FS switch 655 in a manner similar to that in the above-mentioned process.

The CCI-FS switch 655 of the application processor 614 supplies a repeat start command and a read command (Slave Address+R 8 bit) to the CCI processing section 645 of the master-side SerDes device 613, and asserts the Scl_enb signal. In the master-side SerDes device 613, the CCI processing section 645 supplies the read command to the A-PHY processing section 641, and the A-PHY processing section 641 adds an A-PHY header and an A-PHY footer to the read command, and conducts an A-PHY transfer of the resultant read command to the slave-side SerDes device 612.

In the slave-side SerDes device 612, the A-PHY processing section 631 removes the A-PHY header and the A-PHY footer, and supplies the resultant read command to the CCI processing section 635 (Slave). The CCI processing section 635 (Slave) negates the Scl_enb signal, and further, supplies the read command to the CCI processing section 635 (Master). The CCI processing section 635 (Master) transmits a repeat start command and the read command to the image sensor 611.

In the image sensor 611, the CCI processing section 622 receives the repeat start command and the read command, and makes an access to the register 624. The CCI processing section 622 transmits, to the slave-side SerDes device 612, an ACK response indicating that the commands have been successfully received.

Subsequently, the ACK response is supplied to the CCI-FS switch 655 in a manner similar to that in the above-mentioned process.

In the image sensor 611, the CCI processing section 622 reads read data (Data0[7:0]) from the register 624, and transmits the read data to the slave-side SerDes device 612.

In the slave-side SerDes device 612, the CCI processing section 635 (Master) receives the read data, and supplies the read data to the CCI processing section 635 (Slave), and the CCI processing section 635 (Slave) supplies the read data to the A-PHY processing section 631. The A-PHY processing section 631 adds an A-PHY header and an A-PHY footer to the read data, and conducts an A-PHY transfer of the resultant read data to the master-side SerDes device 613.

In the master-side SerDes device 613, the A-PHY processing section 641 removes the A-PHY header and the A-PHY footer, and supplies the resultant read data to the CCI processing section 645, and the CCI processing section 645 transmits the read data to the application processor 614.

In the application processor 614, the CCI processing section 652 receives the read data, and supplies the read data to the CCI-FS switch 655 via the CCI-FS processing section 653.

The CCI-FS switch 655 transmits a NACK response and a stop command to the CCI processing section 645. The CCI processing section 645 supplies the NACK response and the stop command to the A-PHY processing section 641. The A-PHY processing section 641 adds an A-PHY header and an A-PHY footer to the RACK response and the stop command, and conducts an A-PHY transfer of the resultant NACK response and the resultant stop command to the slave-side SerDes device 612.

In the slave-side SerDes device 612, the A-PHY processing section 631 removes the A-PHY header and the A-PHY footer, and supplies the NACK response and the stop command to the CCI processing section 635 (Slave). The CCI processing section 635 (Slave) supplies the NACK response and the stop command to the CCI processing section 635 (Master). The CCI processing section 635 (Master) transmits the NACK response and the stop command to the image sensor 611.

In the image sensor 611, the CCI processing section 622 receives the NACK response and the stop command, and supplies the NACK response and the stop command to the CSI2-FS processing section 623.

It is to be noted that, in the flow previously explained with reference to FIG. 72, an I2C control command for start, repeat start, ACK response, NACK response, and stop, sets 1 in Control Code Indicator in the extended packet header ePH0, and indicates each code allocated to 1-Byte Payload.

<Detailed Configuration Examples of Image Sensor and Application Processor>

Figure 73:
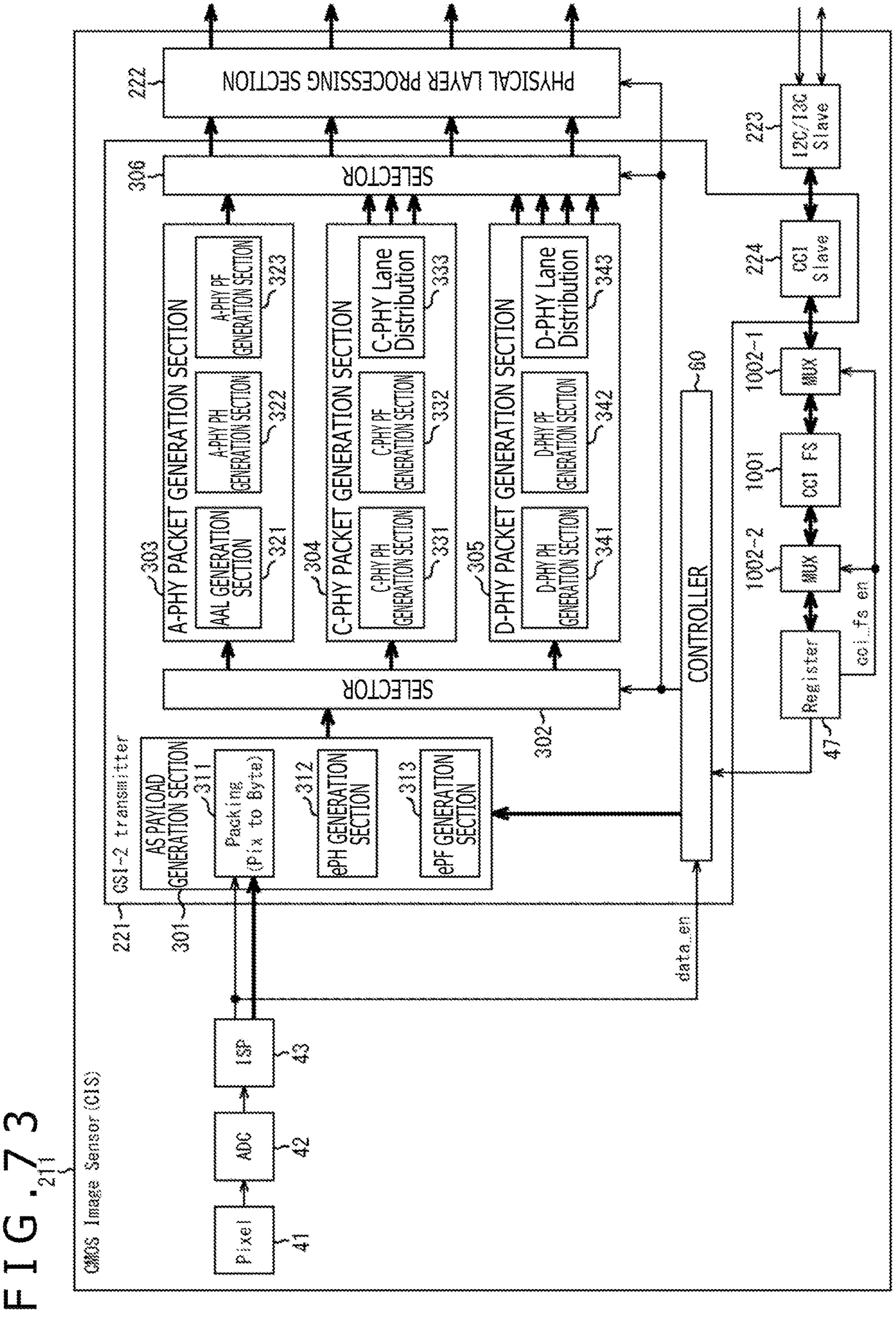
FIG. 73 is a block diagram depicting a detailed configuration example of an image sensor including a CCI-FS processing section.

FIG. 73 is a block diagram depicting a configuration example in which the above-mentioned image sensor 211 depicted in FIG. 25 includes a CCI-FS processing section 1001. It is to be noted that the constituent components of the image sensor 211 in FIG. 73 that are common to those in the image sensor 211 in FIG. 25 are denoted by the same reference signs, and an explanation thereof will be omitted.

As depicted in FIG. 73, the CCI-FS processing section 1001 is disposed between the CCI slave 224 and the register 47. MUX sections 1002-1 and 1002-2 are disposed with the CCI-FS processing section 1001 interposed therebetween. The MUX sections 1002-1 and 1002-2 transmit and receive data to and from each other via the CCI-FS processing section 1001 in a case where the CCI-FS processing section 1001 is enabled according to a cci_fs_en signal supplied from the register 47. On the other hand, the MUX sections 1002-1 and 1002-2 transmit and receive data to and from each other not via the CCI-FS processing section 1001 in a case where the CCI-FS processing section 1001 is disabled according to a cci_fs_en signal supplied from the register 47.

Figure 74:
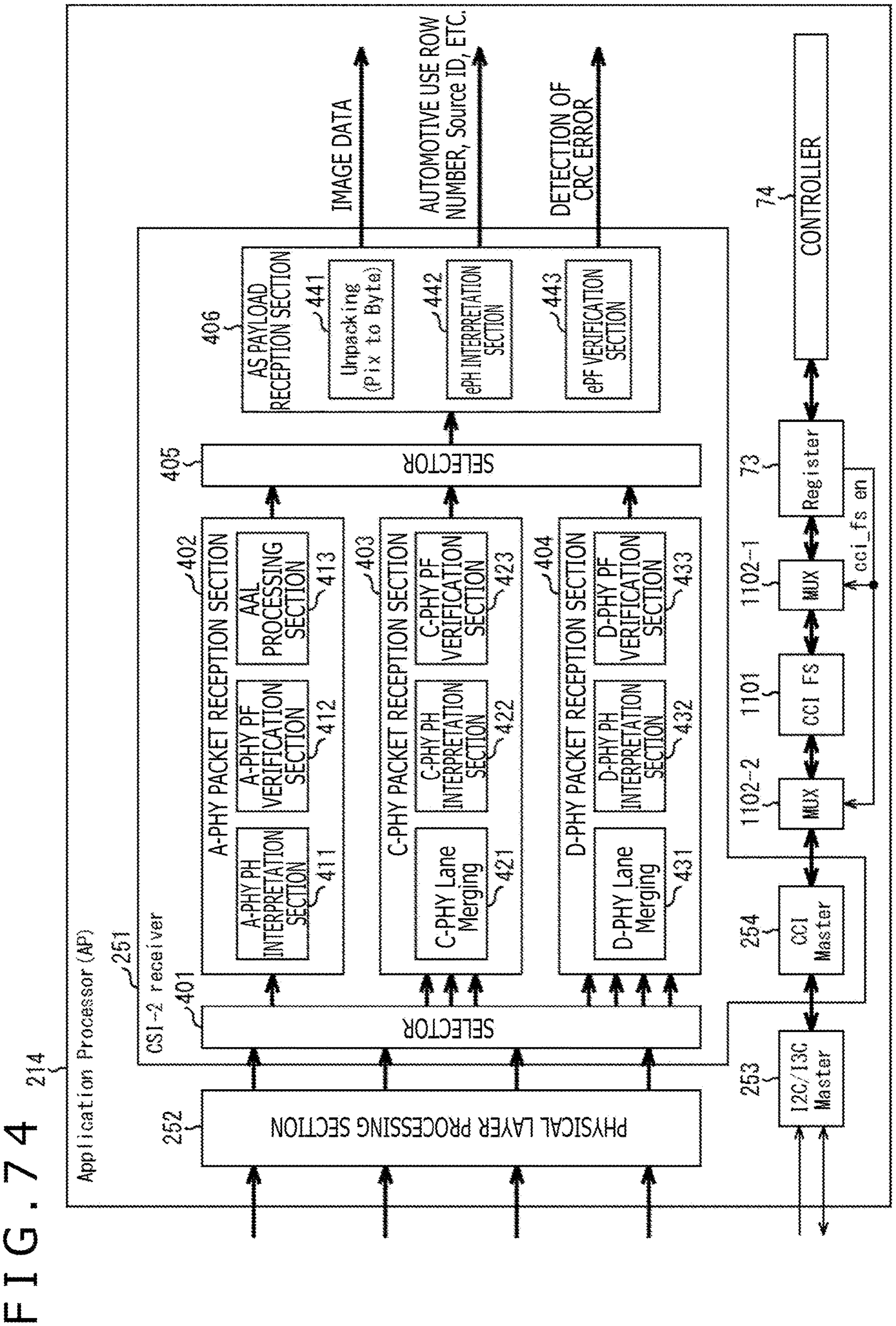
FIG. 74 is a block diagram depicting a detailed configuration example of an application processor including a CCI-FS processing section.

FIG. 74 is a block diagram depicting a configuration example in which the above-mentioned application processor 214 in FIG. 26 includes the CCI-FS processing section 1101. It is to be noted that the constituent components of the application processor 214 in FIG. 74 that are common to those in the application processor 214 in FIG. 26 are denoted by the same reference signs, and an explanation thereof will be omitted.

As depicted in FIG. 74, the CCI-FS processing section 1101 is disposed between the CCI master 254 and the register 73, and MUX sections 1102-1 and 1102-2 are disposed with the CCI-FS processing section 1101 interposed therebetween. In a case where the CCI-FS processing section 1101 is enabled according to the cci_fs_en signal supplied from the register 73, the MUX sections 1102-1 and 1102-2 transmit and receive data to and from each other via the CCI-FS processing section 1101. On the other hand, in a case where the CCI-FS processing section 1101 is disabled according to the cci_fs_en signal supplied from the register 73, the MUX sections 1102-1 and 1102-2 transmit and receive data to and from each other not via the CCI-FS processing section 1101.

It is to be noted that, regarding a method of implementing fields in the configuration of the extended packet header ePH, the following configurations may be adopted.

Extended VC is unused in Safe CCI (the similar configuration is adopted in order to obtain consistency in Header fields with the MIPI extended header related)

Extended DT may be embedded in information related to a command of a bus from an upper layer, or may have an implementation configuration of a setting of a signal line from register setting.

Protocol is described by I2C, but this similarly applies to an SDR mode of I3C.

<Configuration Examples of Computer>

Next, the above-mentioned series of processes (communication method) can be executed by hardware, or can be executed by software. In a case where the series of processes is executed by software, a program implementing the software is installed into a general-purpose computer, for example.

Figure 75:
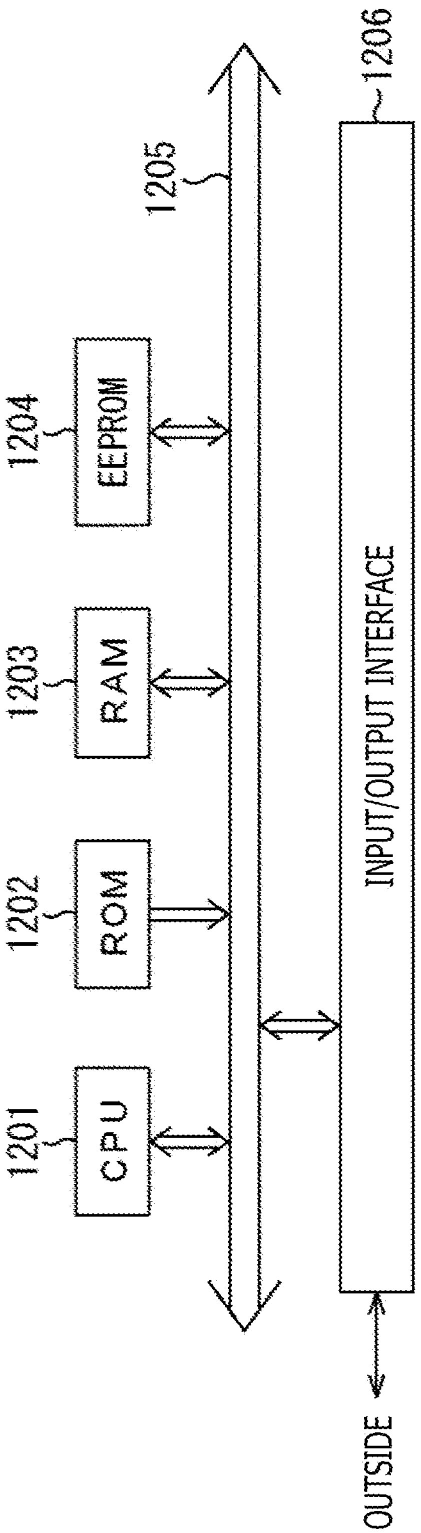
FIG. 75 is a block diagram depicting a configuration example of one embodiment of a computer to which the present technology is applied.

FIG. 75 is a block diagram depicting a hardware configuration example of a computer that executes the above-mentioned series of processes according to a program.

In the computer, a CPU (Central Processing Unit) 1201, a ROM (Read Only Memory) 1202, a RAM (Random Access Memory) 1203, and an EEPROM (Electronically Erasable and Programmable Read Only Memory) 1204 are mutually connected via a bus 1205. Also, an input/output interface 1206 is connected to the bus 1205, and the input/output interface 1206 is connected to the outside.

In the computer having the above-mentioned configuration, the CPU 1201 loads programs stored in the ROM 1202 and the EEPROM 1204, for example, into the RAM 1203 via the bus 1205, and executes the programs. Accordingly, the above-mentioned series of processes is executed. In addition, a program to be executed by the computer (CPU 1201) may be previously written in the ROM 1202, or may be installed into the EEPROM 1204 from the outside, or be updated via the input/output interface 1206.

Here, the processes which are executed herein by the computer according to a program are not necessarily executed in time series according to the order designated by the flowcharts. In other words, the processes which are executed by the computer according to a program include processes that are executed in parallel or are executed independently (e.g., parallel processes, or processes by objects).

In addition, the program may be processed by one computer (processor), or may be distributively processed by multiple computers. Further, the program may be executed after being transferred to a remote computer.

Moreover, the term "system" in the present description means a set of multiple constituent components (devices, modules (components), etc.), and whether or not all the constituent components are included in the same casing does not matter. Therefore, a set of multiple devices that are housed in different casings and are connected to each other over a network is a system, and further, a single device having multiple modules housed in a single casing is also a system.

In addition, for example, a configuration explained as one device (or processing section) may be divided into multiple devices (or processing sections). In contrast, a configuration explained above as multiple devices (or processing sections) may be integrated into one device (or processing section). Also, needless to say, a configuration other than the above-mentioned configurations may be added to a configuration of each device (or each processing section). Further, as long as the configuration or the operation of an entire system is substantially the same, a partial configuration of a certain device (or processing section) may be included into the configuration of another device (or another processing section).

In addition, for example, the present technology can be configured as cloud computing in which one function is shared and cooperatively processed by multiple devices over a network.

In addition, for example, the above-mentioned program can be executed at any device. In this case, it is sufficient if the device has a necessary function (e.g., functional block) to be able to obtain necessary information.

In addition, steps explained with reference to the above-mentioned flowcharts may be executed by one device, or may be cooperatively executed by multiple devices. Further, in a case where multiple processes are included in one step, the multiple processes included in the one step may be executed by one device, or may be cooperatively executed by multiple devices. In other words, multiple processes included in one step may be executed as processes in multiple steps. Alternatively, processes explained as multiple steps may be collectively executed as one step.

It is to be noted that the program which is executed by the computer may be configured in such a manner that processes in steps written in the program are executed in the time-series order explained herein, or are separately executed at respective necessary timings such as a timing when a call is made. That is, these steps may be executed according to an order different from the above-mentioned ones as long as there is no inconsistency. Moreover, the processes in the steps written in the program may be executed in parallel with processes in steps in another program, or may be executed in combination with processes in steps in another program.

It is to be noted that multiple aspects of the present technology explained herein can be implemented independently and singly as long as there is no inconsistency. It goes without saying that any aspects of the present technology can be implemented in combination. For example, a part or the entirety of the present technology explained in any one of the embodiments can be implemented in combination with a part or the entirety of the present technology explained in another one of the embodiments. In addition, any part or the entirety of the above-mentioned present technology can be implemented in combination with another technology which has not been explained previously.

<Combination Examples of Configurations>

It is to be noted that the present technique can also have the following configurations.

(1)

A communication device including:

a physical layer that, with a CCI (Camera Control Interface) protocol implemented as an upper layer, transmits and receives data including an extended header and an extended footer to and from another communication device; and a CCI-FS processing section that compares a Destination ID included in the extended header with an ID (Source ID) given to the communication device and determines whether or not the data is for accessing the communication device.

(2)

The communication device according to (1), in which a header size of the extended header is changeable by a field value in the extended header.

(3)

The communication device according to (1) or (2), in which the extended header includes, in a field value in the extended header, information indicating a place of a bucket.

(4)

The communication device according to any one of (1) to (3), in which the extended header includes, in a field value in the extended header, information indicating a CCI protocol (I2C), and the information is used to perform a routing process.

(5)

The communication device according to any one of (1) to (4), in which the extended header includes, in a field value in the extended header, information indicating a transmission source of a CCI protocol (I2C), and a response process is performed on the basis of the information.

(6)

The communication device according to any one of (1) to (5), in which the extended header includes, in a field value in the extended header, information indicating a data length.

(7)

The communication device according to any one of (1) to (6), in which the extended header includes, in a field value in the extended header, information indicating a header length of a CCI protocol (I2C).

(9)

The communication device according to any one of (1) to (7), in which the extended header includes, in a field value in the extended header, ID information regarding a CCI protocol (I2C) such that reference to information regarding starting, resuming, and finishing a command is able to be made on the basis of the ID information.

(9)

The communication device according to any one of (1) to (8), in which the extended header includes, in a field value in the extended header, information indicating a transmission destination of a CCI protocol (I2C), and routing is performed and reference to a communication path is made on the basis of the information.

(10)

The communication device according to any one of (1) to (9), in which a size of the extended footer is changeable by a field value in the extended footer.

(11)

The communication device according to any one of (1) to (10), in which the extended footer includes security data.

(12)

The communication device according to (11), in which the security data includes a hash calculation value.

(13)

The communication device according to (1) to (12), in which the physical layer has an asymmetrical upper layer of a point-to-point topology, and is designed to allow high-speed data transmission, control data, and electric power to share one physical wire.

(14)

The communication device according to (13), in which the physical layer includes MIPI (Mobile Industry Processor Interface) A-PHY.

(15)

A communication method including:

causing a communication device to transmit and receive data including an extended header and an extended footer to and from another communication device through a physical layer with a CCI (Camera Control Interface) protocol implemented as an upper layer; and causing the communication device to compare a Destination ID included in the extended header with an ID (Source ID) given to the communication device and determine whether or not the data is for accessing the communication device.

(16)

A program for causing a computer in a communication device to execute a process including:

transmitting and receiving data including an extended header and an extended footer to and from another communication device through a physical layer with a CCI (Camera Control Interface) protocol implemented as an upper layer; and comparing a Destination ID included in the extended header with an ID (Source ID) given to the communication device and determining whether or not the data is for accessing the communication device.

It is to be noted that the embodiments of the present invention are not limited to the above-mentioned embodiments, and various changes can be made within the scope of the gist of the present disclosure. In addition, the effects described in the present description are just examples, and thus, are not limited to any effect. Any other effect may be provided.

REFERENCE SIGNS LIST

11: Communication system
21: Image sensor
22: Application processor
23, 24: Bus
25: SerDes device
26: SerDes device
27: Bus
31: Extension mode-capable CSI-2 transmission circuit
32: Extension mode-capable CSI-2 reception circuit
33: CSI-2 reception circuit
34: SerDes transmission circuit

35: SerDes reception circuit
36: CSI-2 transmission circuit
41: Pixel
42: AD converter
43: Image processing section
44: Pixel CRC computation section
45: Physical layer processing section
46: I2C/I3C slave
47: Register
51: Packing section
52: Packet header generation section
53: Extended packet header generation section
54: Extended packet footer generation section
55, 56: Selection section
57: CRC Computation section
58: Lane distribution section
59: CCI slave
60: Controller
71: Physical layer processing section
72: I2C/I3C master
73: Register
74: Controller
81: Packet header detection section
82: Lane merging section
83: Interpretation section
84, 85: Selection section
86: CRC computation section
87: Unpacking section
88: CCI master

The invention claimed is:

1. A communication device comprising:

a physical layer that, with a CCI (Camera Control Interface) according to an Inter-Integrated Circuit (I2C) protocol implemented as an upper layer, transmits and receives data including an extended header and an extended footer to and from another communication device; and a CCI processing section that compares a destination identifier (Destination ID) included in the extended header with a source identifier (Source ID) given to the communication device and determines whether or not the data is for accessing the communication device.

2. The communication device according to claim 1, wherein a header size of the extended header is changeable by a field value in the extended header.

3. The communication device according to claim 1, wherein the extended header includes, in a field value in the extended header, information indicating a place of a bucket.

4. The communication device according to claim 1, wherein the extended header includes, in a field value in the extended header, information indicating the CCI according to the I2C protocol, and the information is used to perform a routing process.

5. The communication device according to claim 1, wherein the extended header includes, in a field value in the extended header, information indicating a transmission source of the CCI according to the I2C protocol, and a response process is performed on a basis of the information.

6. The communication device according to claim 1, wherein the extended header includes, in a field value in the extended header, information indicating a data length.

7. The communication device according to claim 1, wherein the extended header includes, in a field value in the extended header, information indicating a header length of the CCI according to the I2C protocol.

8. The communication device according to claim 1, wherein the extended header includes, in a field value in the extended header, ID information regarding the CCI according to the I2C protocol such that reference to information regarding starting, resuming, and finishing a command is able to be made on a basis of the ID information.

9. The communication device according to claim 1, wherein the extended header includes, in a field value in the extended header, information indicating a transmission destination of the CCI according to the I2C protocol, and routing is performed and reference to a communication path is made on a basis of the information.

10. The communication device according to claim 1, wherein a size of the extended footer is changeable by a field value in the extended footer.

11. The communication device according to claim 1, wherein the extended footer includes security data.

12. The communication device according to claim 11, wherein the security data includes a hash calculation value.

13. The communication device according to claim 1, wherein the physical layer has an asymmetrical upper layer of a point-to-point topology, and is designed to allow high-speed data transmission, control data, and electric power to share one physical wire.

14. The communication device according to claim 13, wherein the physical layer is a MIPI physical layer (Mobile Industry Processor Interface A-PHY).

15. A communication method comprising:

causing a communication device to transmit and receive data including an extended header and an extended footer to and from another communication device through a physical layer with a CCI (Camera Control Interface) according to an Inter-Integrated Circuit (I2C) protocol implemented as an upper layer; and causing the communication device to compare a destination identifier (Destination ID) included in the extended header with a source identifier (Source ID) given to the communication device and determine whether or not the data is for accessing the communication device.

16. A non-transitory computer readable medium storing a program for controlling a communication device, the program being executable by a processor to perform operations comprising:

transmitting and receiving data including an extended header and an extended footer to and from another communication device through a physical layer with a CCI (Camera Control Interface) according to an Inter-Integrated Circuit (I2C) protocol implemented as an upper layer; and comparing a destination identifier (Destination ID) included in the extended header with a source identifier (Source ID) given to the communication device and determining whether or not the data is for accessing the communication device.

17. The non-transitory computer readable medium according to claim 16, wherein the extended header includes, in a field value in the extended header, information indicating the CCI according to the I2C protocol, and the information is used to perform a routing process.

18. The non-transitory computer readable medium according to claim 16, wherein the physical layer has an asymmetrical upper layer of a point-to-point topology, and is designed to allow high-speed data transmission, control data, and electric power to share one physical wire.

19. The communication method according to claim 15, wherein the extended header includes, in a field value in the extended header, information indicating the CCI according to the I2C protocol, and the information is used to perform a routing process.

20. The communication method according to claim 15, wherein the physical layer has an asymmetrical upper layer of a point-to-point topology, and is designed to allow high-speed data transmission, control data, and electric power to share one physical wire.

* * * * *